United States Patent
Shin et al.

(10) Patent No.: US 10,925,021 B2
(45) Date of Patent: Feb. 16, 2021

(54) METHOD FOR TRANSMITTING/RECEIVING SYNCHRONIZATION SIGNAL IN WIRELESS COMMUNICATION SYSTEM AND APPARATUS THEREFOR

(71) Applicant: LG Electronics Inc., Seoul (KR)

(72) Inventors: Seokmin Shin, Seoul (KR); Changhwan Park, Seoul (KR); Joonkui Ahn, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/711,024

(22) Filed: Dec. 11, 2019

(65) Prior Publication Data

US 2020/0196256 A1 Jun. 18, 2020

Related U.S. Application Data

(63) Continuation of application No. PCT/KR2018/007039, filed on Jun. 21, 2018.
(Continued)

(51) Int. Cl.
*H04W 56/00* (2009.01)
*H04J 11/00* (2006.01)
*H04L 5/14* (2006.01)

(52) U.S. Cl.
CPC ....... *H04W 56/001* (2013.01); *H04J 11/0073* (2013.01); *H04L 5/14* (2013.01)

(58) Field of Classification Search
CPC . H04W 56/001; H04W 56/0015; H04W 4/70; H04W 72/0406; H04J 11/0073;
(Continued)

(56) References Cited

U.S. PATENT DOCUMENTS

2017/0373900 A1* 12/2017 Adhikary .......... H04W 56/0015
2018/0227148 A1* 8/2018 Chatterjee ............ H04L 25/022
(Continued)

FOREIGN PATENT DOCUMENTS

CN  103703709  4/2014
CN  106160916  11/2016
(Continued)

OTHER PUBLICATIONS

MCC TF160, "NB-IoT—System Information Scheduling," R5w160307, 3GPP TSG-RAN WG5—SS Vendors / MCC TF160 Workshop-IoT #1, Sophia-Antipolis, France, dated Sep. 27, 2016, 7 pages.
(Continued)

*Primary Examiner* — Kibrom T Hailu
(74) *Attorney, Agent, or Firm* — Fish & Richardson P.C.

(57) ABSTRACT

Disclosed are a method for transmitting and receiving a synchronization signal in a wireless communication system supporting NarrowBand-Internet of Things (NB-IoT) and an apparatus therefor. Specifically, the method for transmitting and receiving a synchronization signal may include: receiving, from a base station, a narrowband synchronization signal; and performing a cell search procedure for the base station based on the narrowband synchronization signal, in which the narrowband synchronization signal may include a narrowband primary synchronization signal and a narrowband secondary synchronization signal, the narrowband primary synchronization signal and the narrowband secondary synchronization signal may be transmitted in different subframe, and the subframe in which the narrowband secondary synchronization signal is transmitted may be configured differently according to a type of a radio frame structure.

16 Claims, 40 Drawing Sheets

Related U.S. Application Data

(60) Provisional application No. 62/554,513, filed on Sep. 5, 2017, provisional application No. 62/536,972, filed on Jul. 25, 2017, provisional application No. 62/523,219, filed on Jun. 21, 2017.

(58) Field of Classification Search
CPC ... H04L 5/14; H04L 27/2613; H04L 27/2656; H04L 5/0053; H04L 67/12
See application file for complete search history.

(56) References Cited

U.S. PATENT DOCUMENTS

| 2018/0279257 | A1* | 9/2018 | Dai | H04W 72/082 |
|---|---|---|---|---|
| 2019/0013984 | A1* | 1/2019 | Liang | H04L 5/00 |
| 2019/0215815 | A1* | 7/2019 | Blankenship | H04W 72/005 |

FOREIGN PATENT DOCUMENTS

| KR | 20170012150 | 2/2017 |
|---|---|---|
| WO | WO2017014613 | 1/2017 |
| WO | WO2017048105 | 3/2017 |
| WO | WO2017069470 | 4/2017 |
| WO | WO2017078802 | 5/2017 |

OTHER PUBLICATIONS

Nokia Networks, "On the synchronization signal design for NB-IoT," R1-157274, 3GPP TSG-RAN WG1 Meeting #83, Anaheim, USA, dated Nov. 15-22, 2016, 9 pages.

Nokia Networks, Alcatel-Lucent, Alcatel-Lucent Shanghai Bell, "Synchronization signal design for NB-IoT," R1-160449, 3GPP TSG RAN1 meeting #84, St Julian's, Malta, dated Feb. 15-19, 2016, 7 pages.

Nokia Networks, Alcatel-Lucent, Alcatel-Lucent Shanghai Bell, "Synchronization signal design for NB-IoT," R1-161104, 3GPP TSG RAN1 meeting #84, St Julian's, Malta, dated Feb. 15-19, 2016, 7 pages.

Sony, "NB IoT UL Transmission Gaps," R4-78AH-0117, 3GPP RAN WG4 Meeting #78-NB-IoT, Kista, Sweden, dated May 3-4, 2016, 6 pages.

WI rapporteur (Ericsson), "RAN1 agreements for Rel-13 NB-IoT," R1-165977, 3GPP TSG-RAN WG1 Meeting #85, Nanjing, China, dated May 22-26, 2016, 33 pages.

Chinese Office Action in Chinese Application No. 201880040970.0, dated Sep. 2, 2020, 10 pages (with English translation).

Extended European Search Report in European Application No. 18820238.6, dated Nov. 11, 2020, 10 pages.

Huawei, HiSilicon, "Synchronization Signal Design," R1-160311, 3GPP TSG RAN WG1 Meeting #84, St Julian's, Malta, dated Feb. 15-19, 2016, 5 pages.

Nokia, Alcatel-Lucent Shanghai Bell, "Existing Downlink Signals for OTDOA Positioning in NB-IoT," R1-160881, 3GPP TSG RAN WG1 Meeting #86bis, Lisbon, Portugal, dated Oct. 10-14, 2016, 3 pages.

ZTE, "NB-PSS and NB-SSS design for NB-IoT," R1-160049, 3GPP TSG RAN WG1 Nb-IoT Ad-Hoc Meeting, Budapest, Hungary, dated Jan. 18-20, 2016, 10 pages.

\* cited by examiner

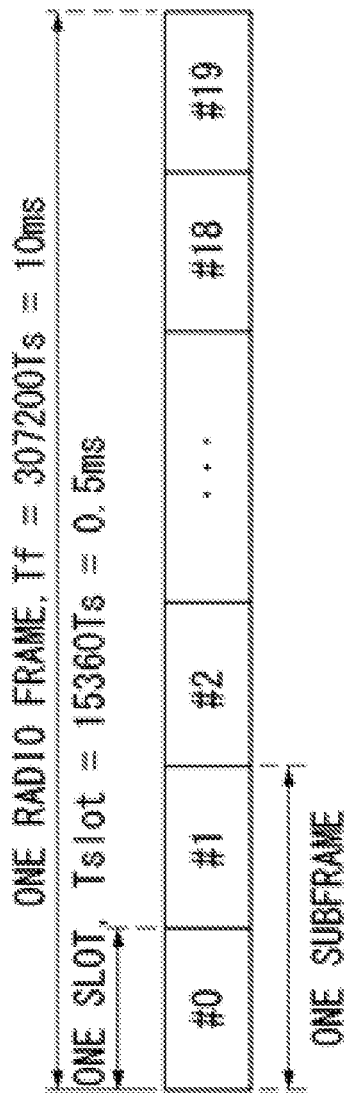
[FIG. 1a]

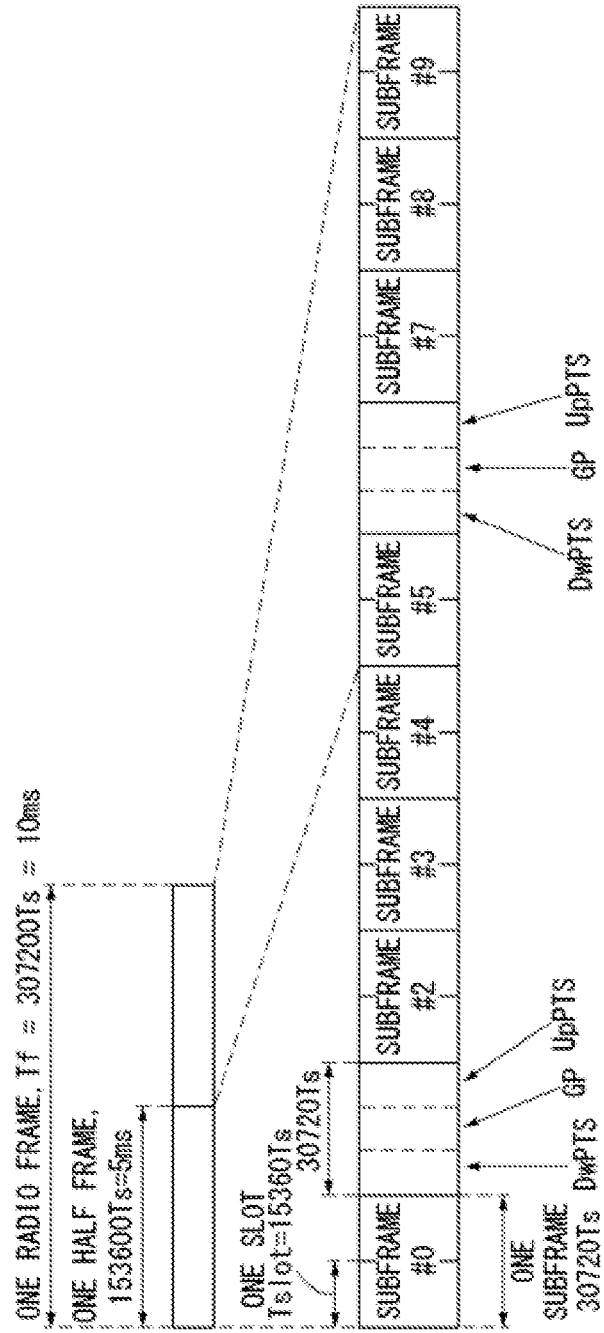

[FIG. 2]
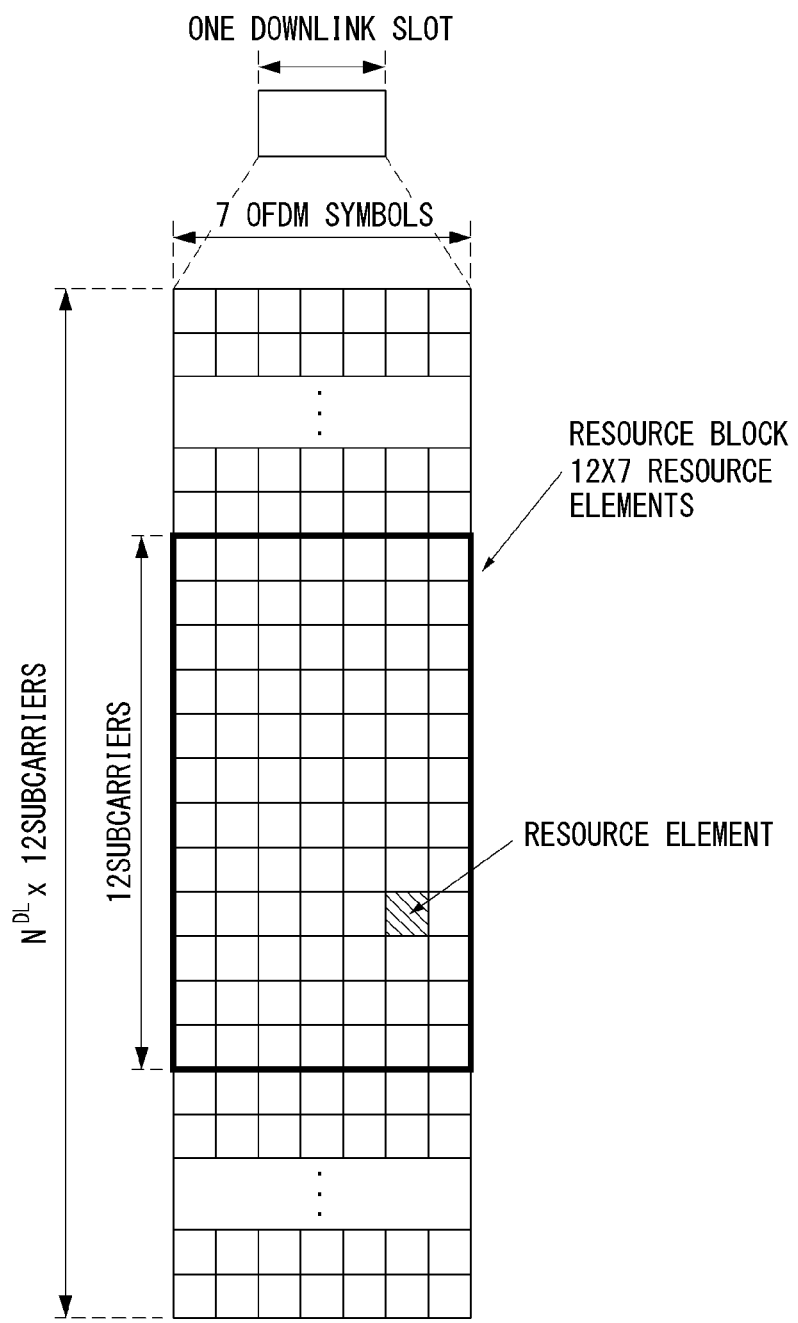

[FIG. 3]
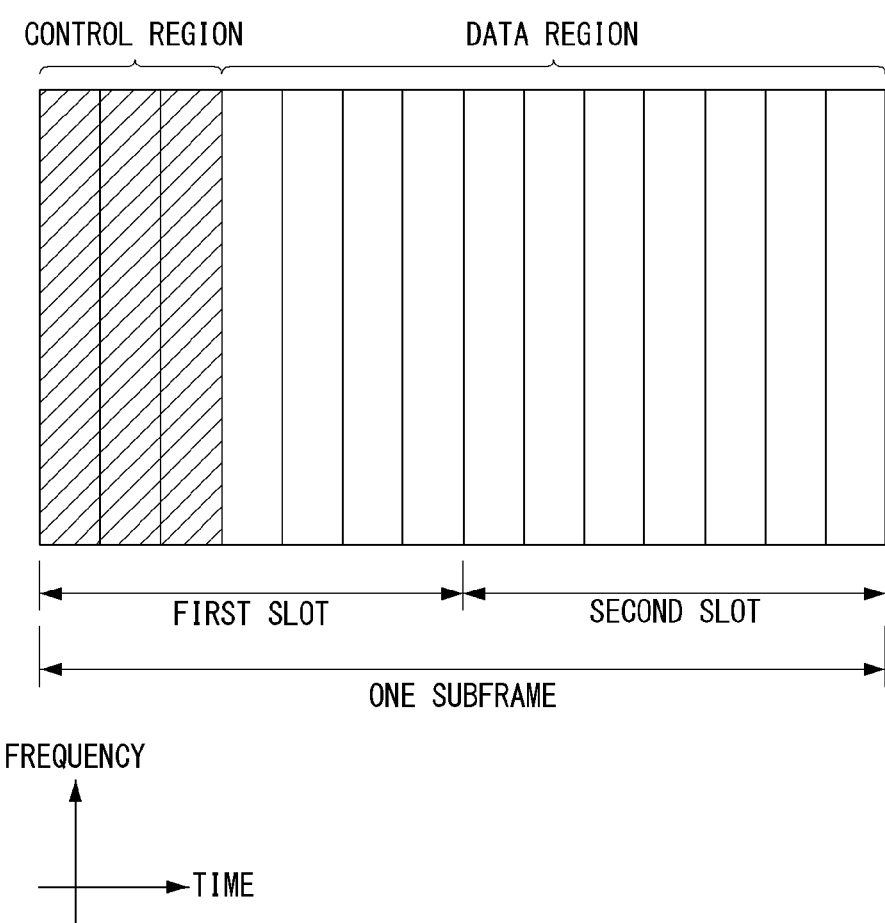

[FIG. 4]
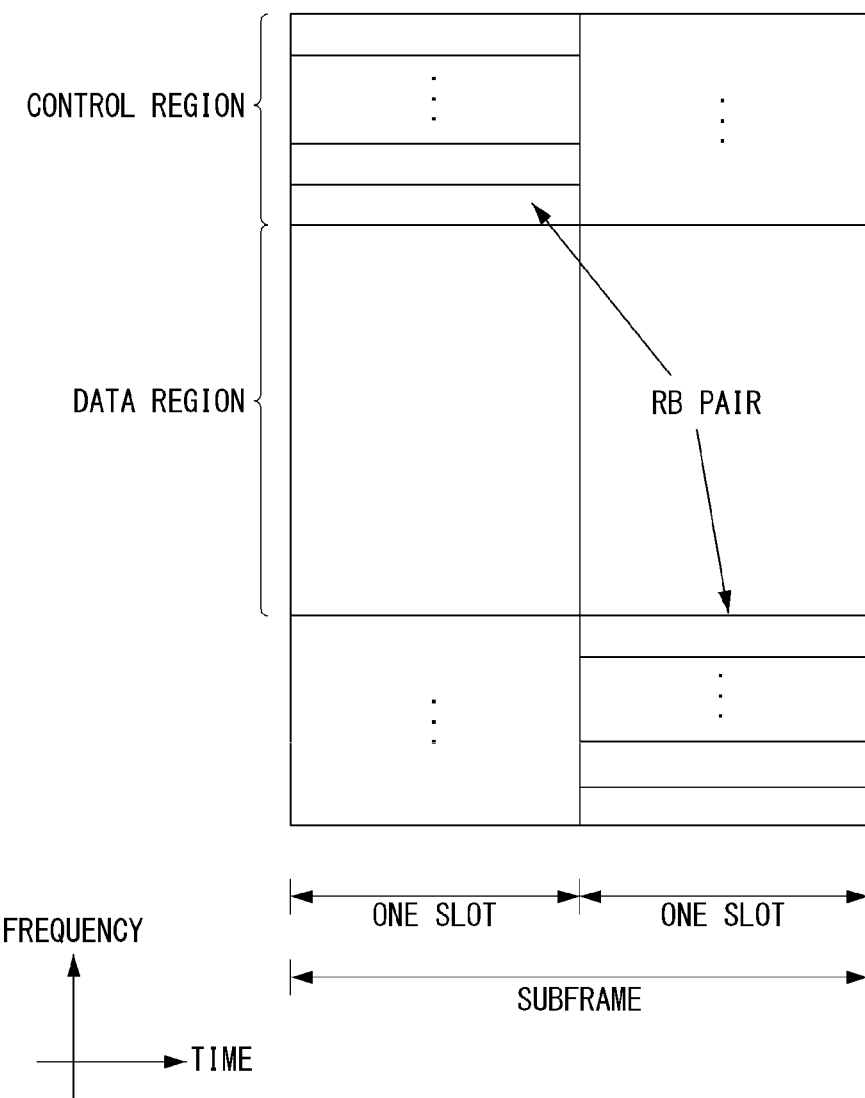

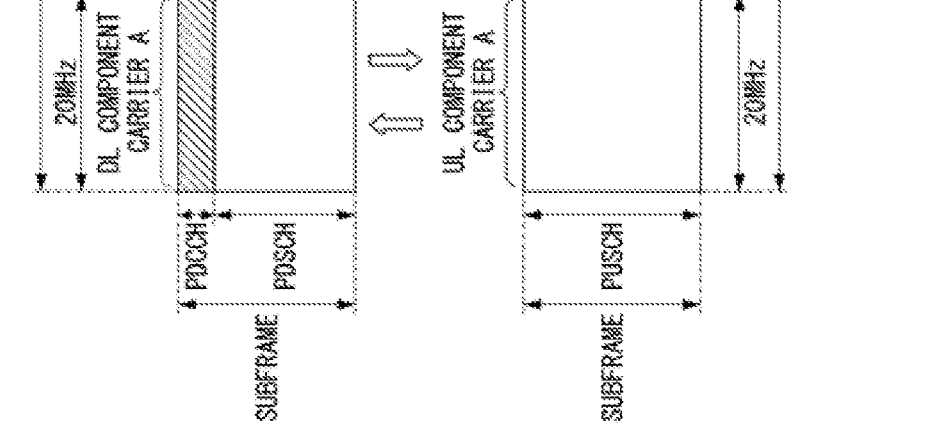
[FIG. 5b]
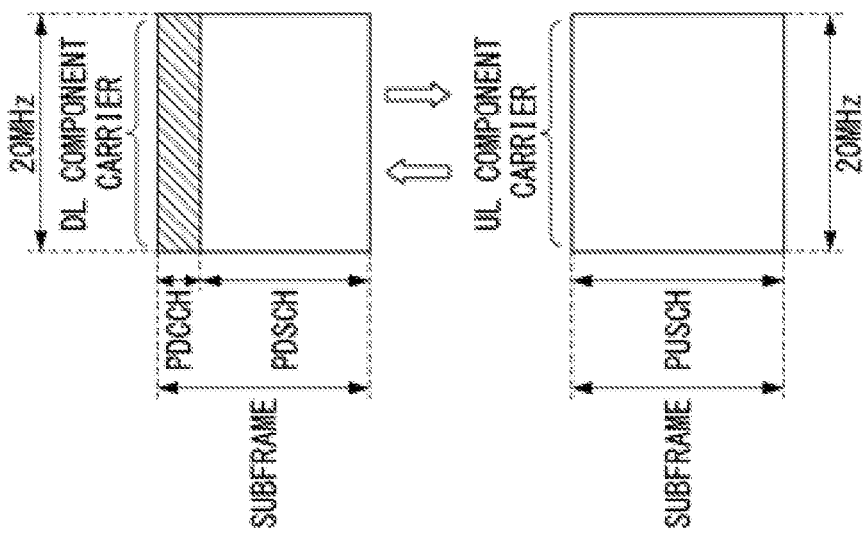
[FIG. 5a]

[FIG. 6]
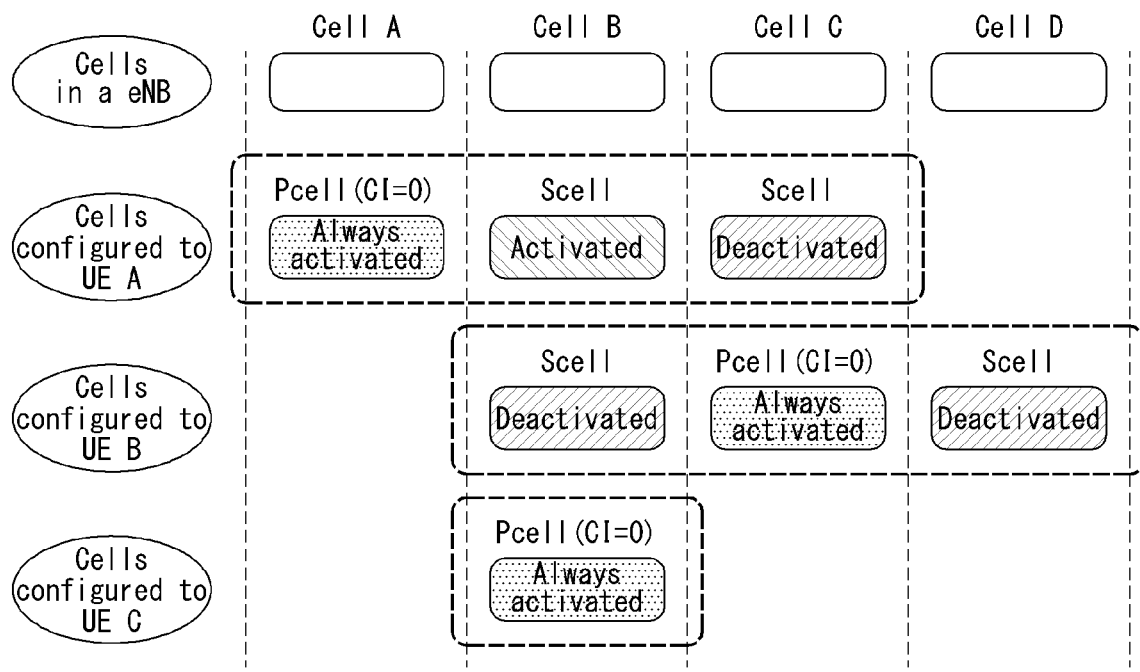

[FIG. 7a]
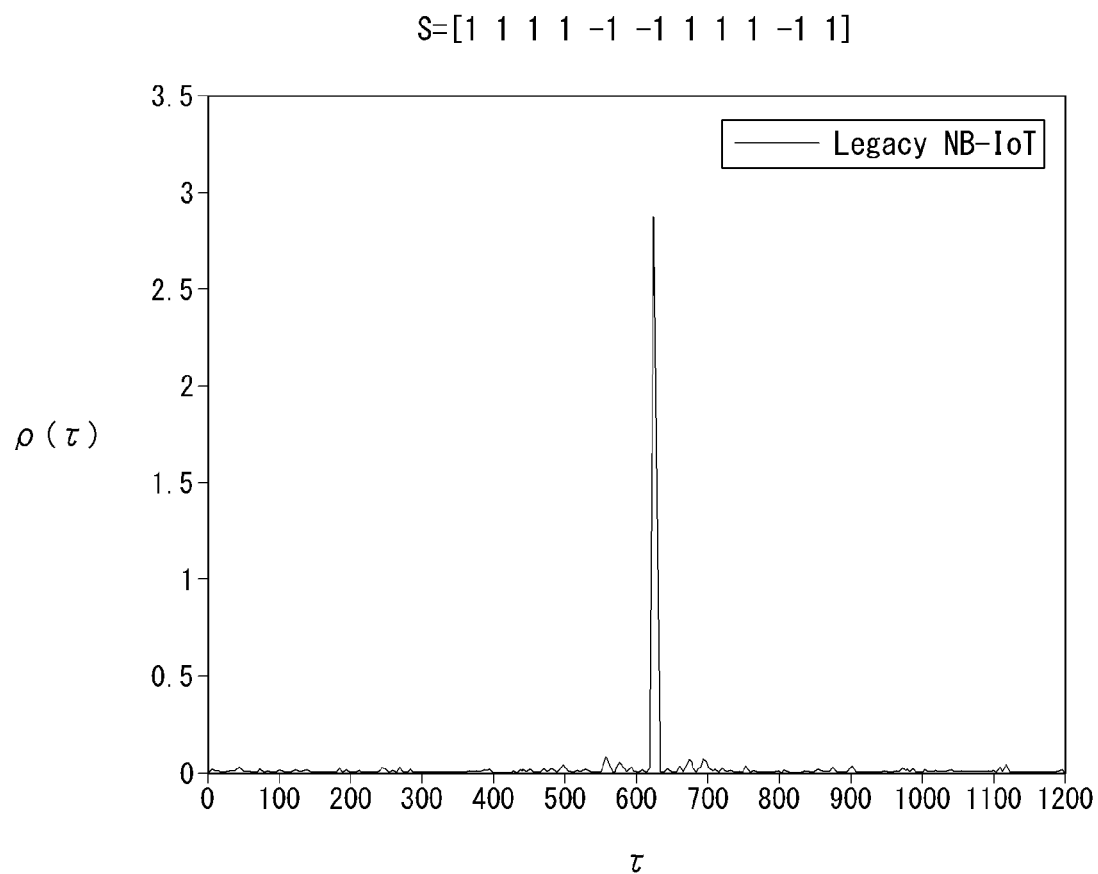

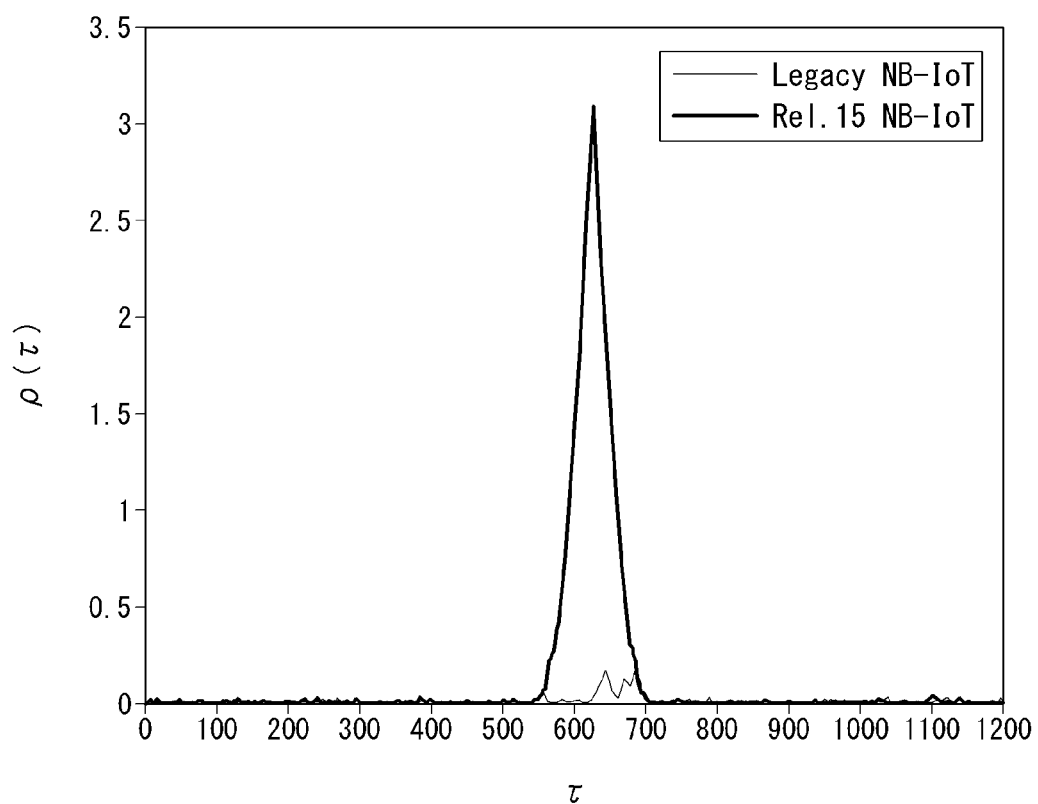

[FIG. 7c]
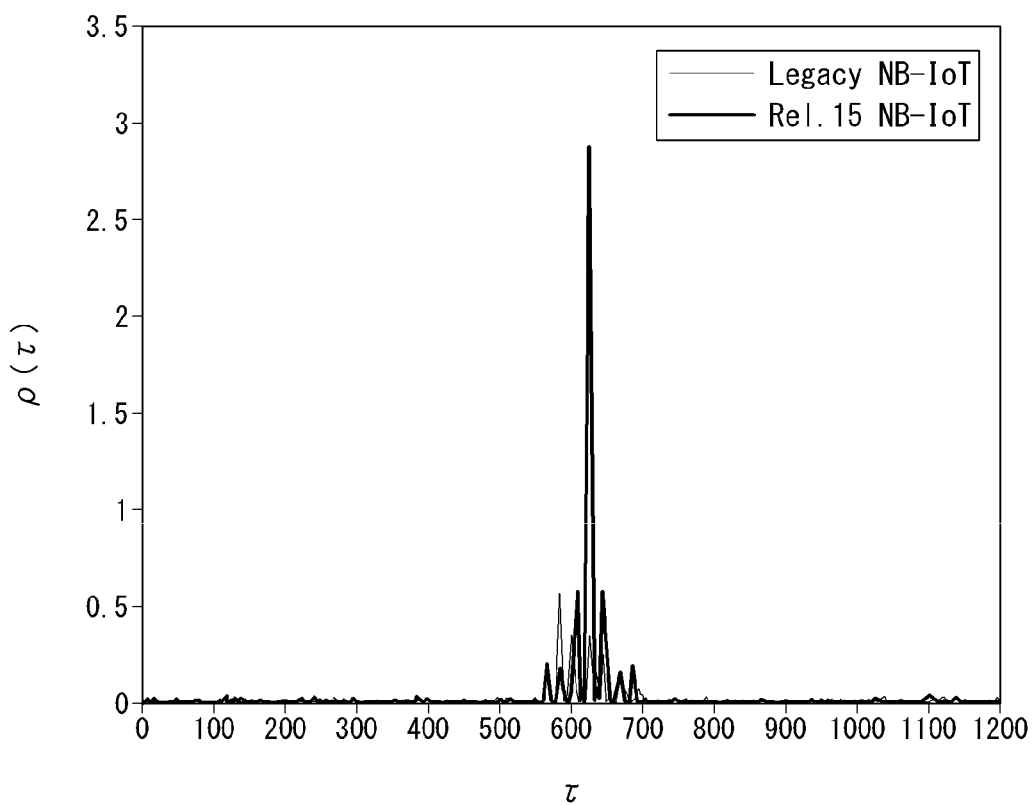

[FIG. 7d]
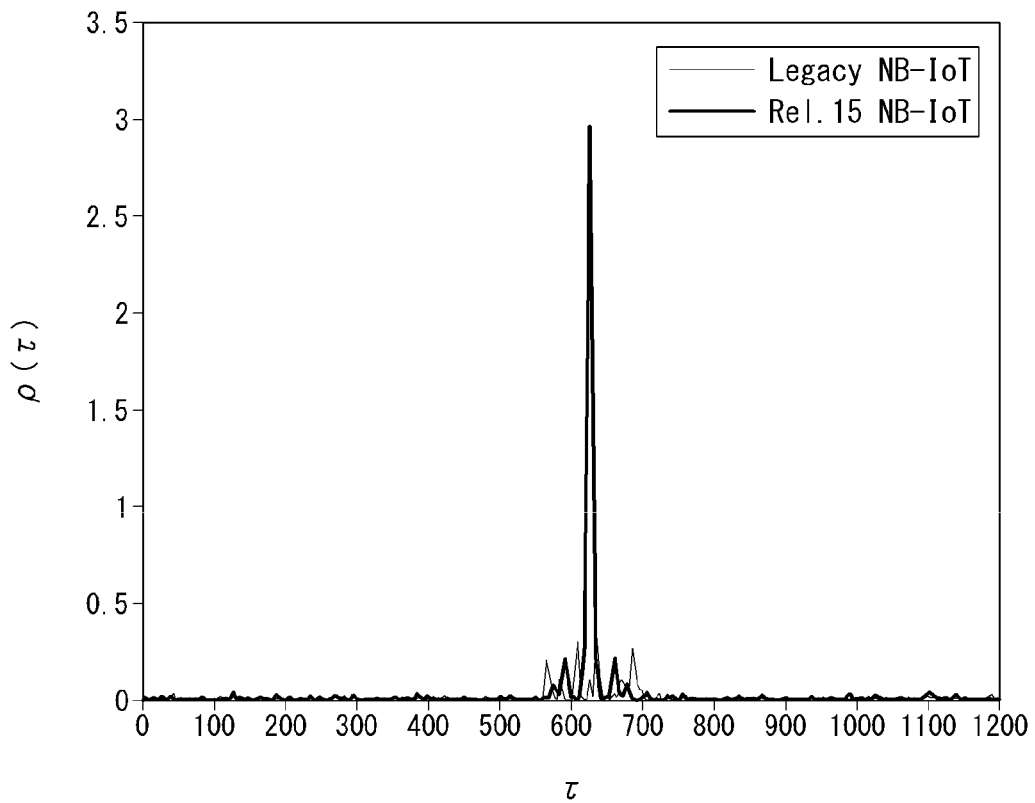

[FIG. 8]
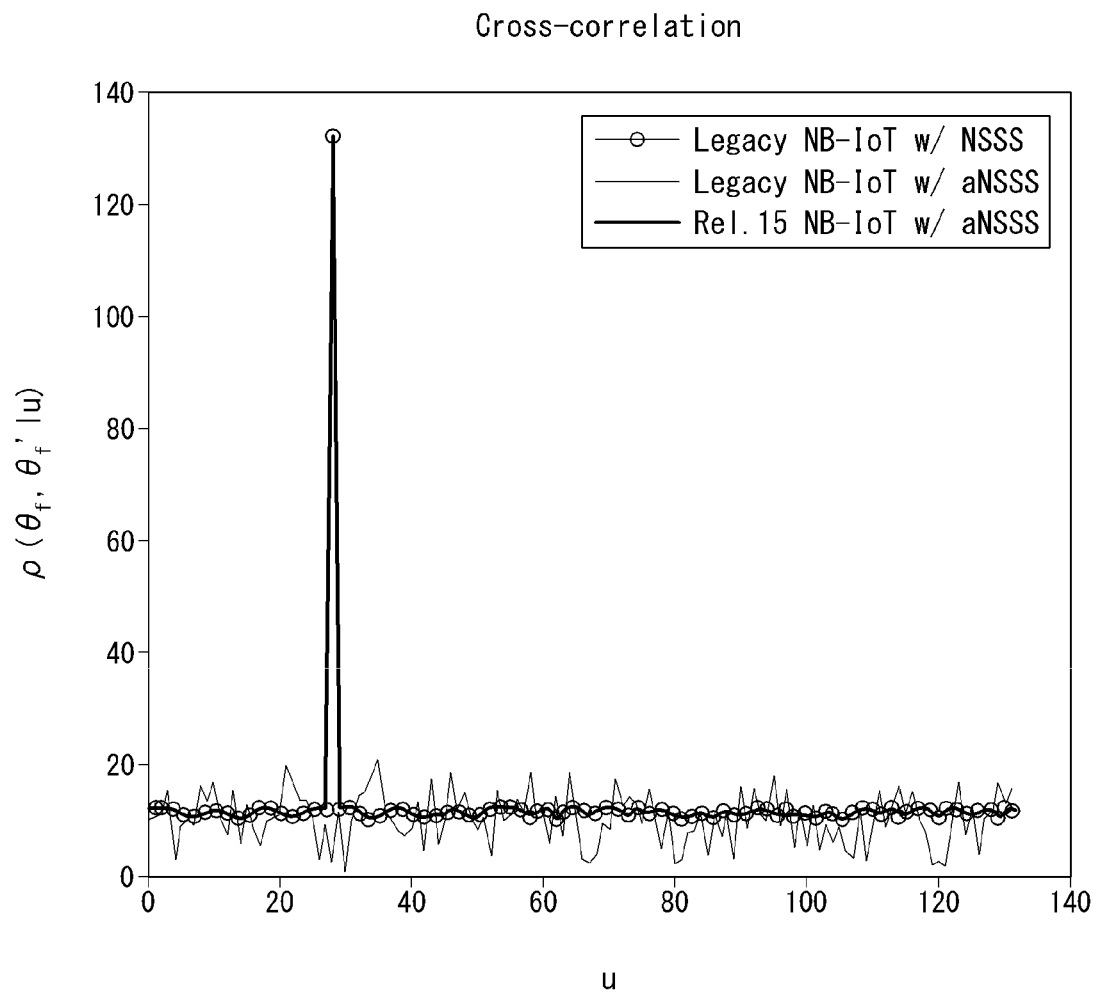

[FIG. 9a]
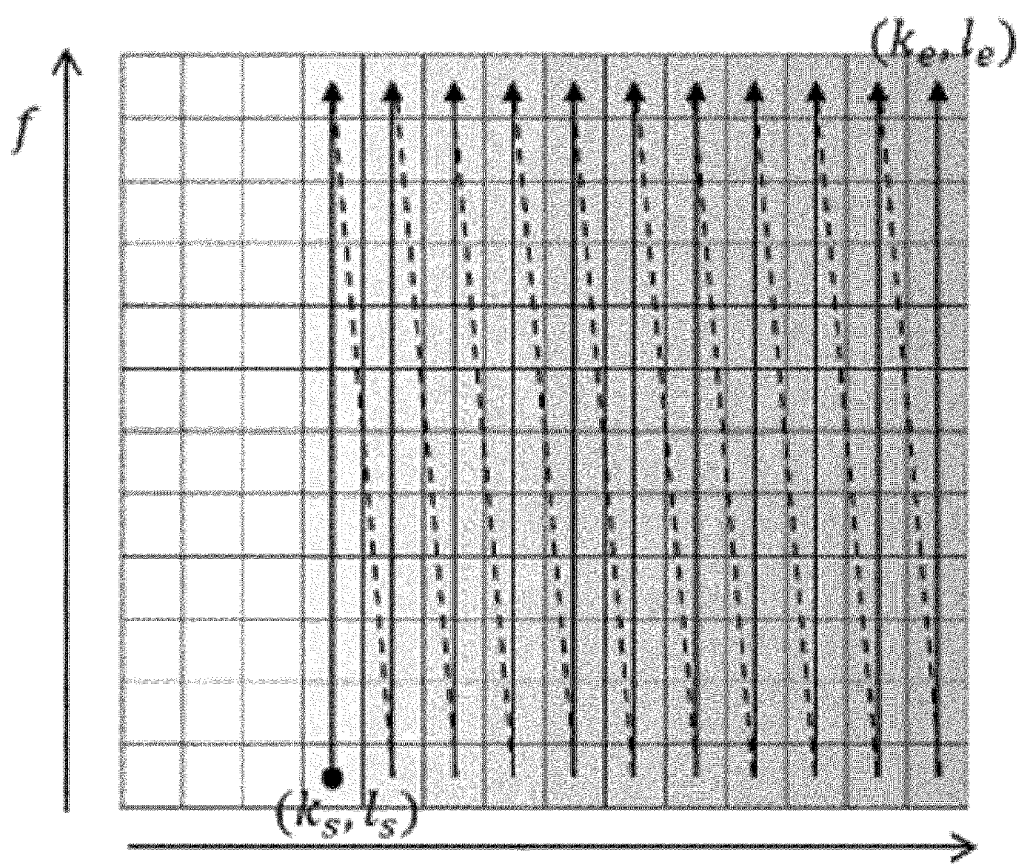

[FIG. 9b]
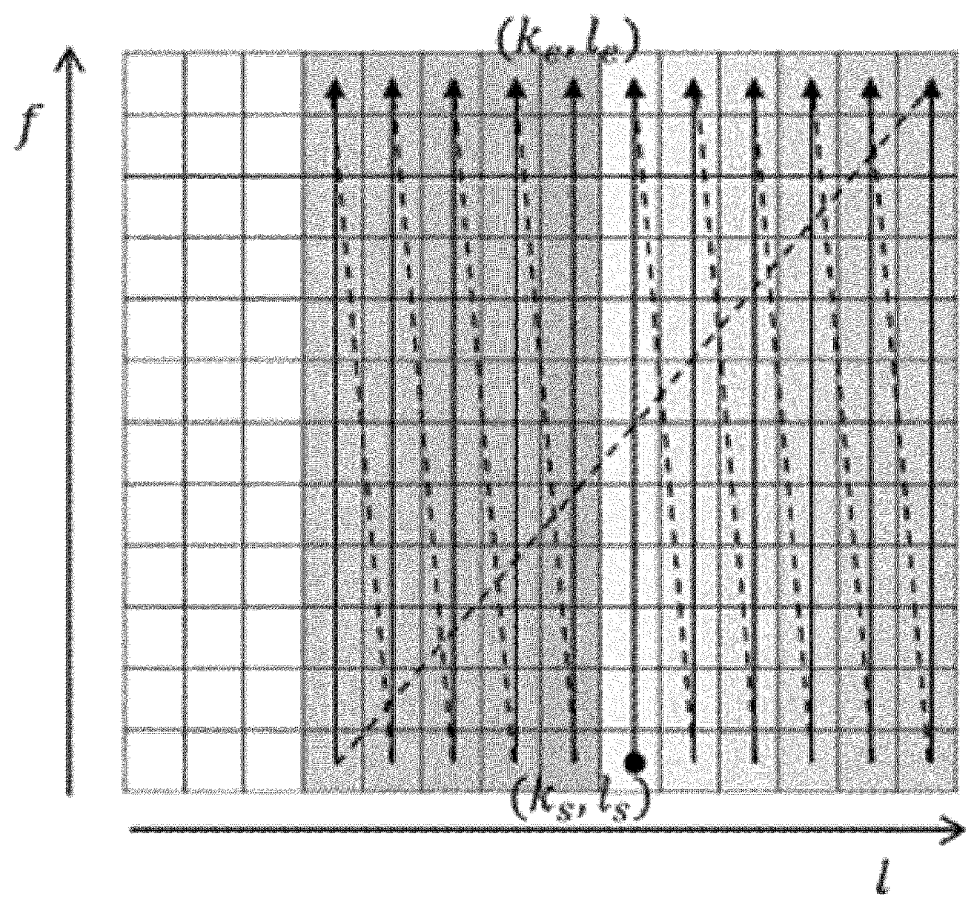

[FIG. 9c]
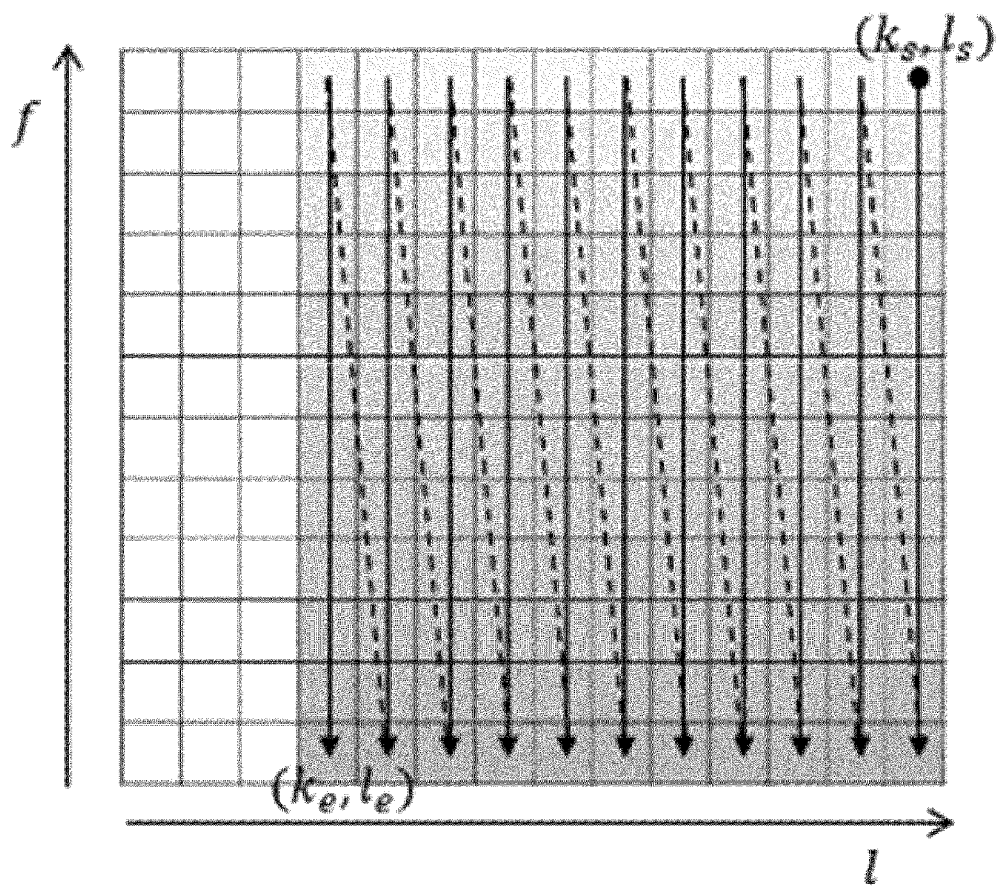

[FIG. 9d]
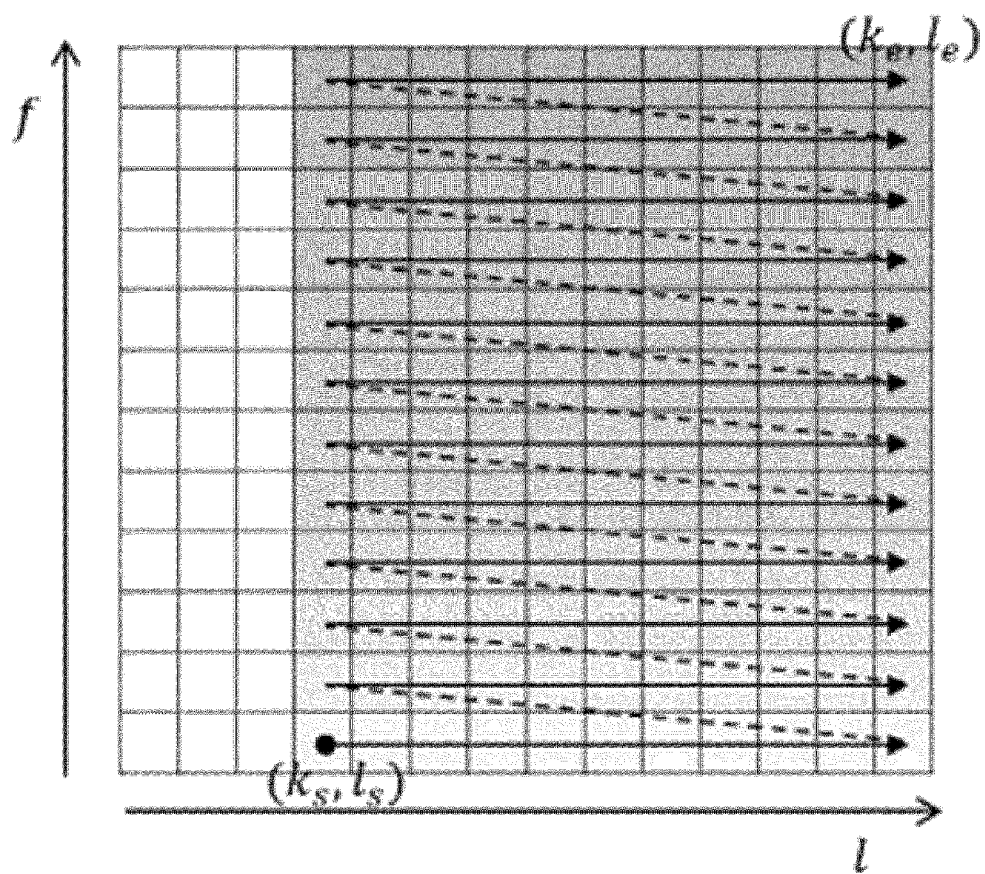

[FIG. 10a]
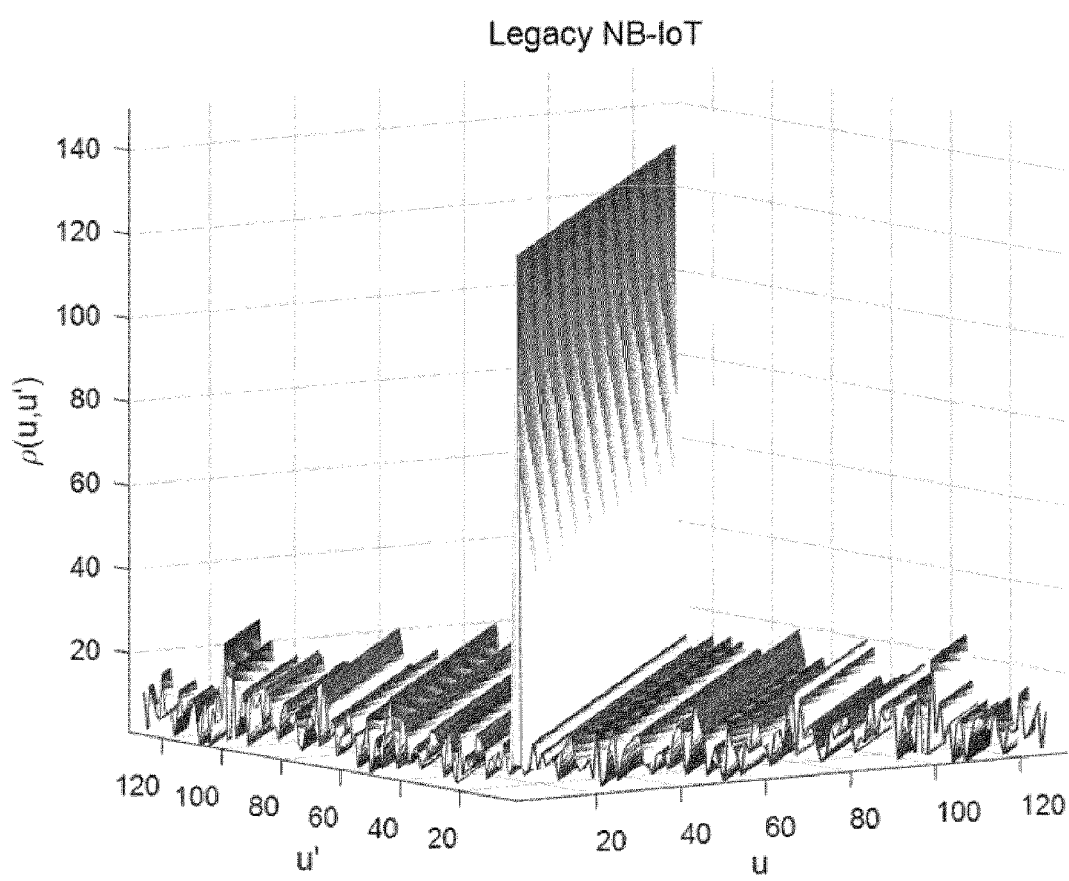

[FIG. 10b]
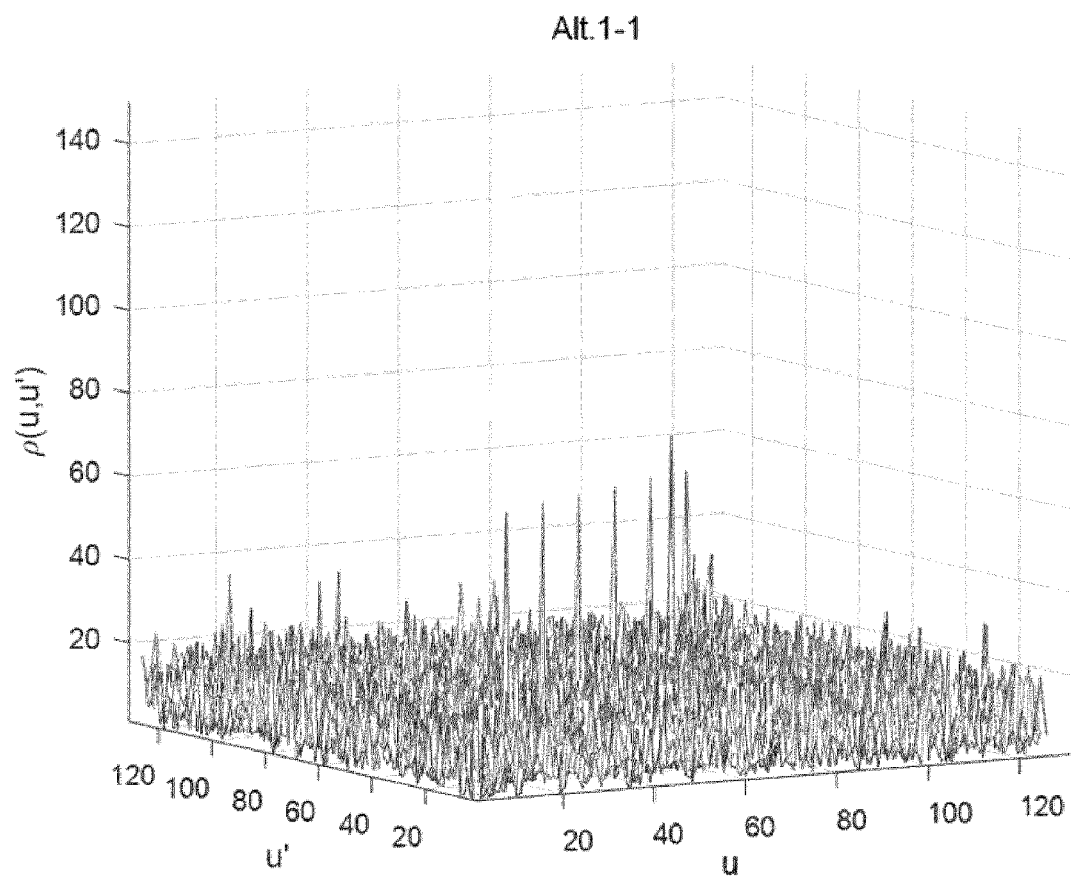

[FIG. 10c]
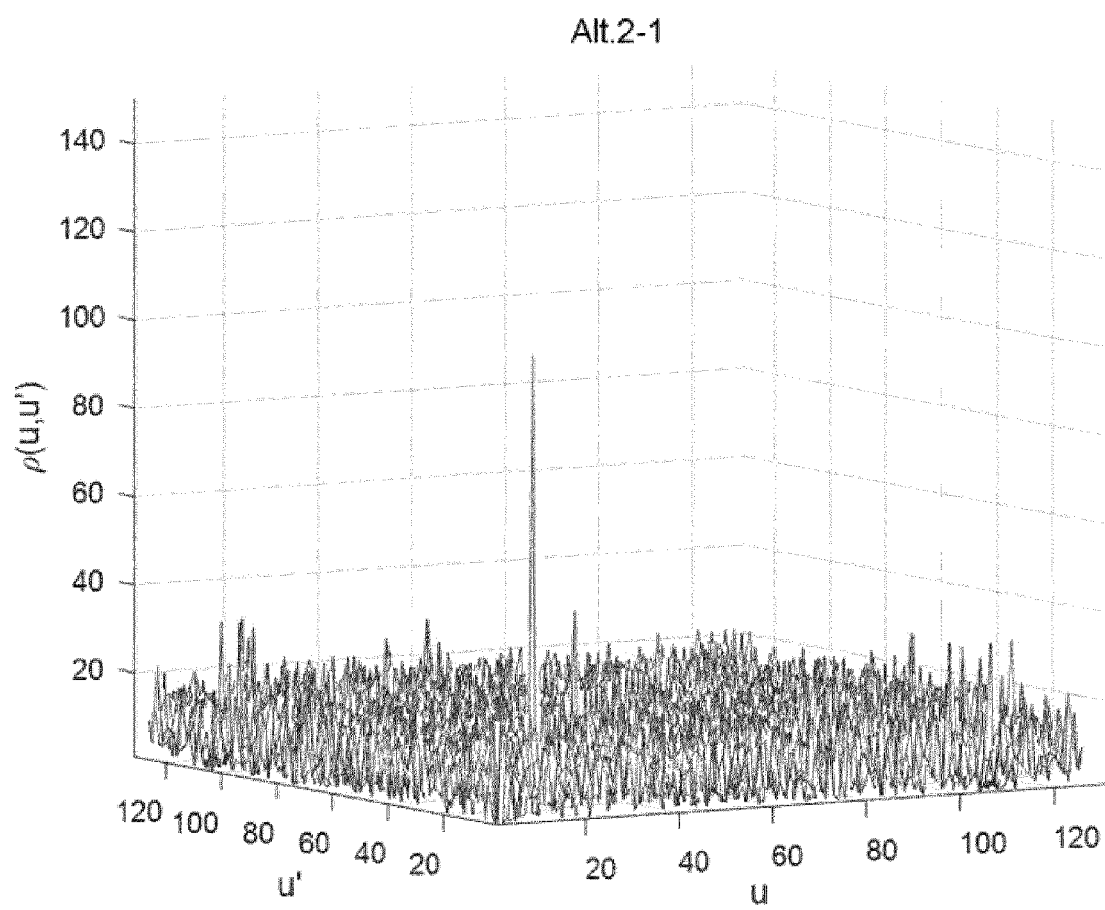

[FIG. 10d]
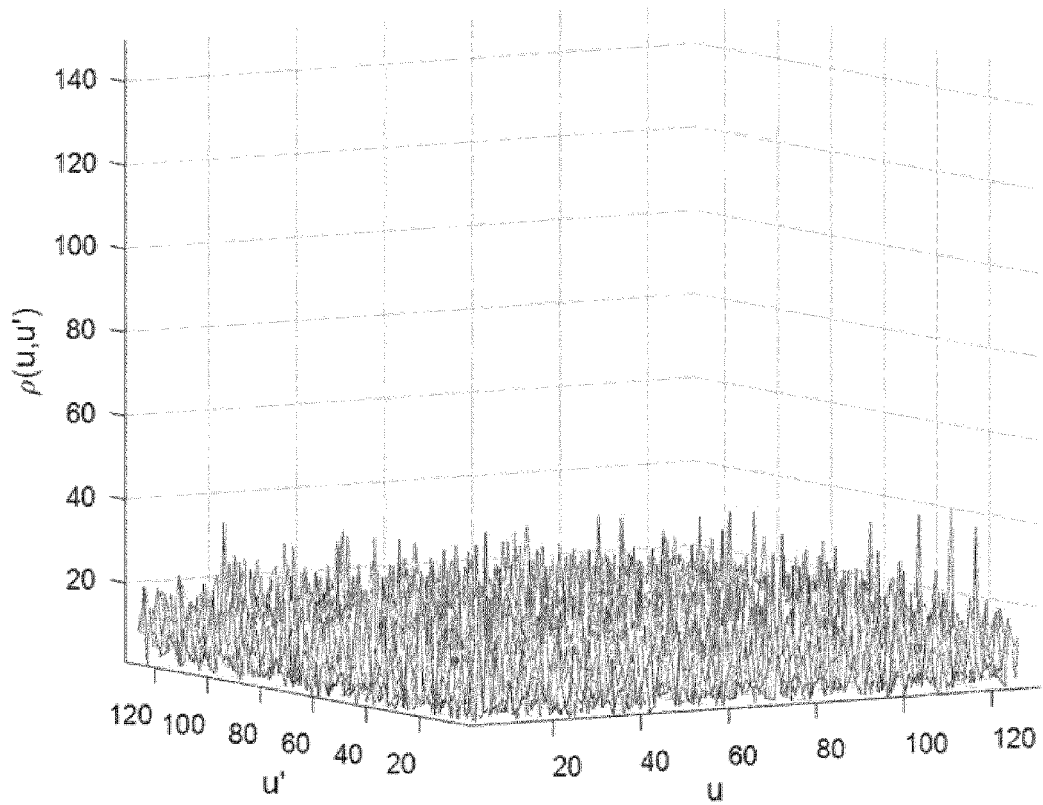

[FIG. 11a]
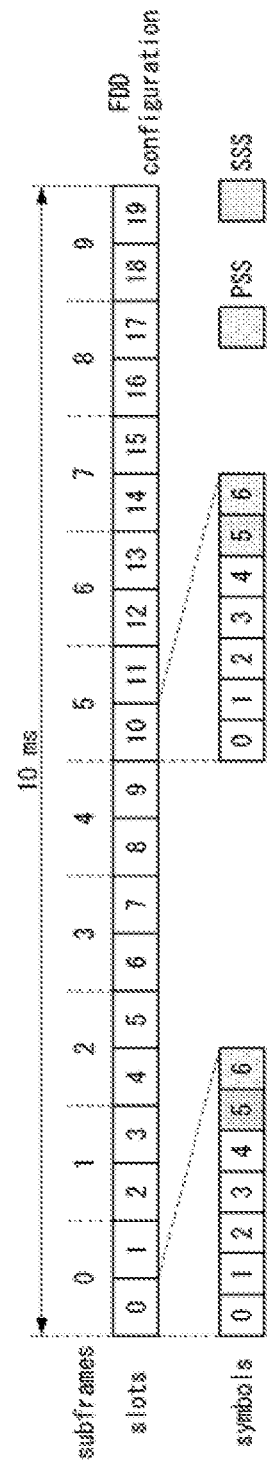
[FIG. 11b]
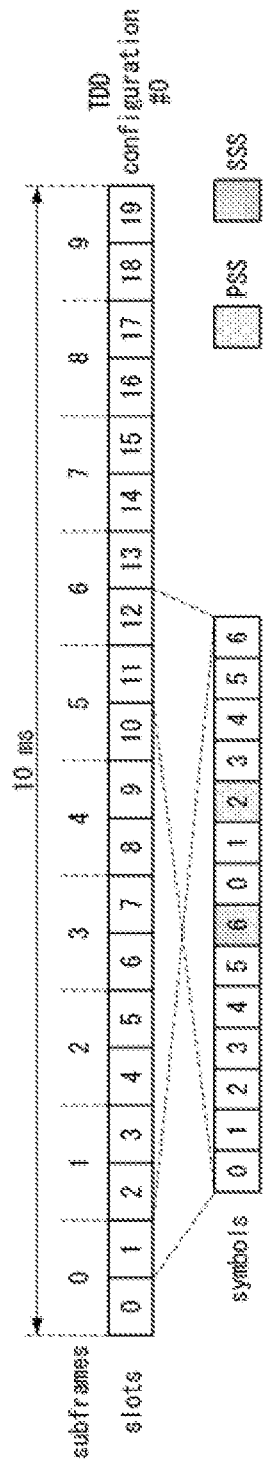

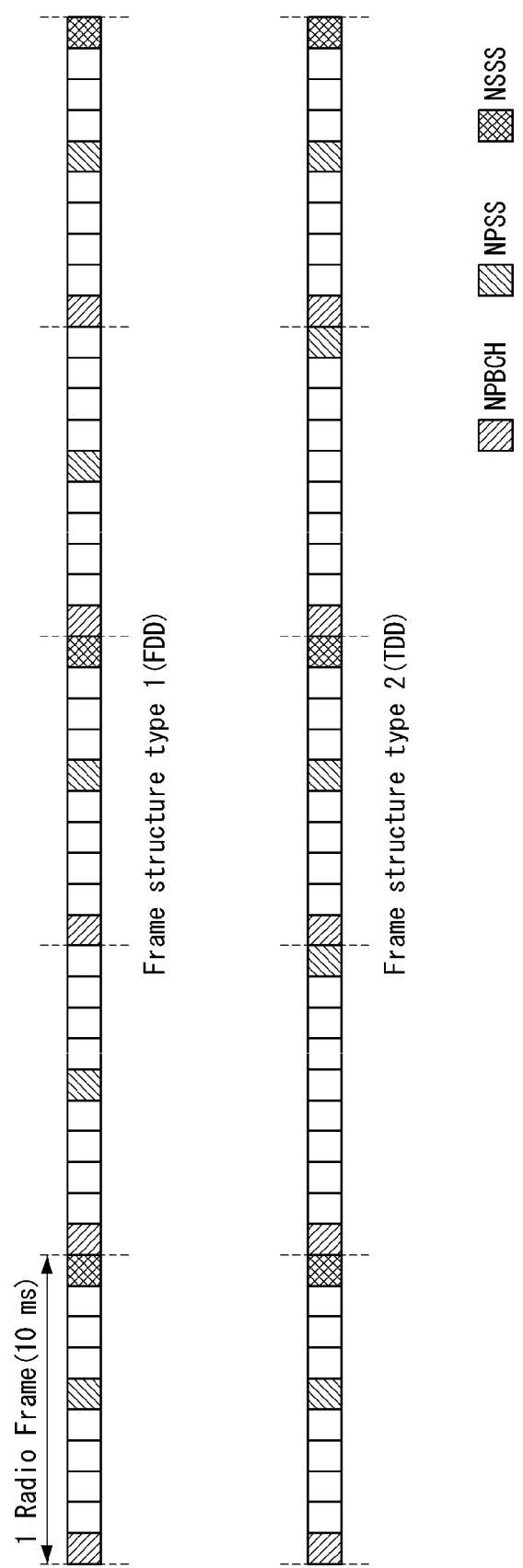
[FIG. 12]

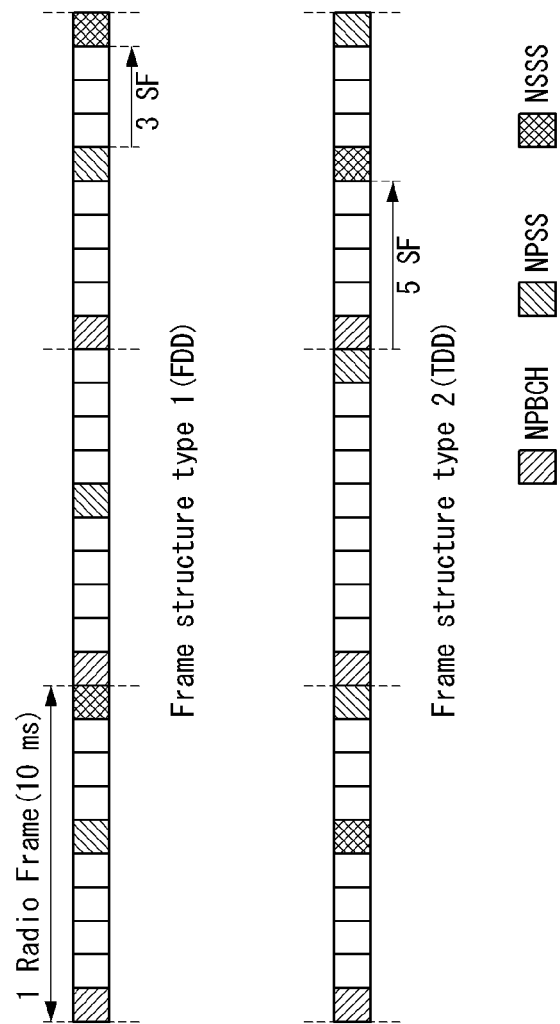
[FIG. 13]

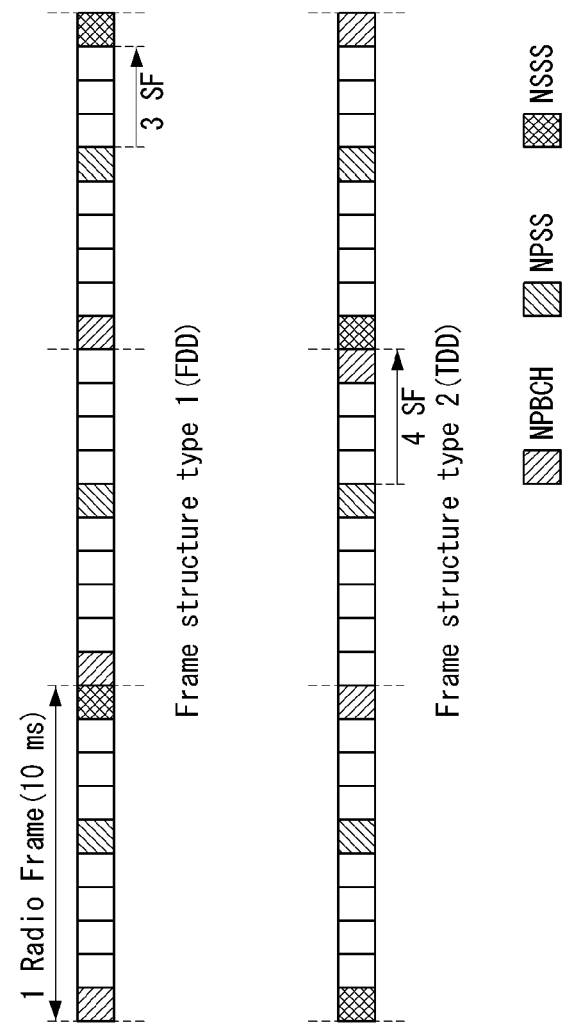
[FIG. 14]

[FIG. 15a]
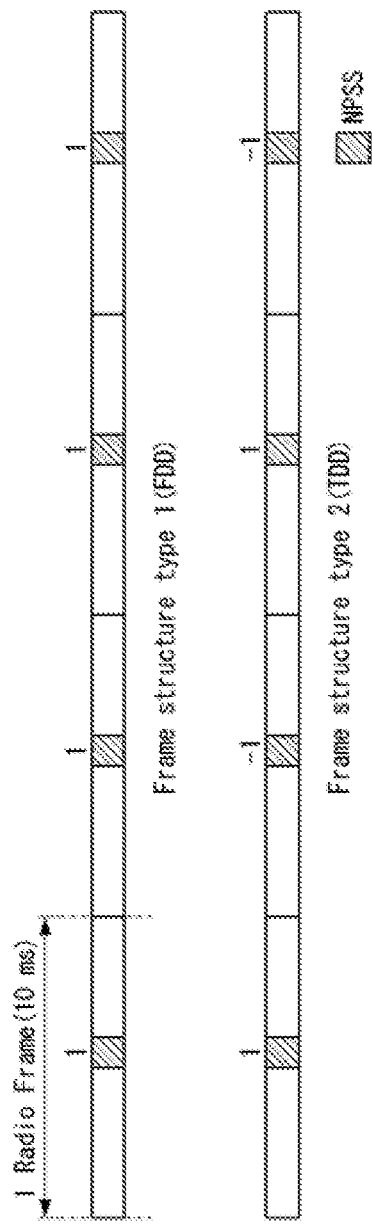
[FIG. 15b]
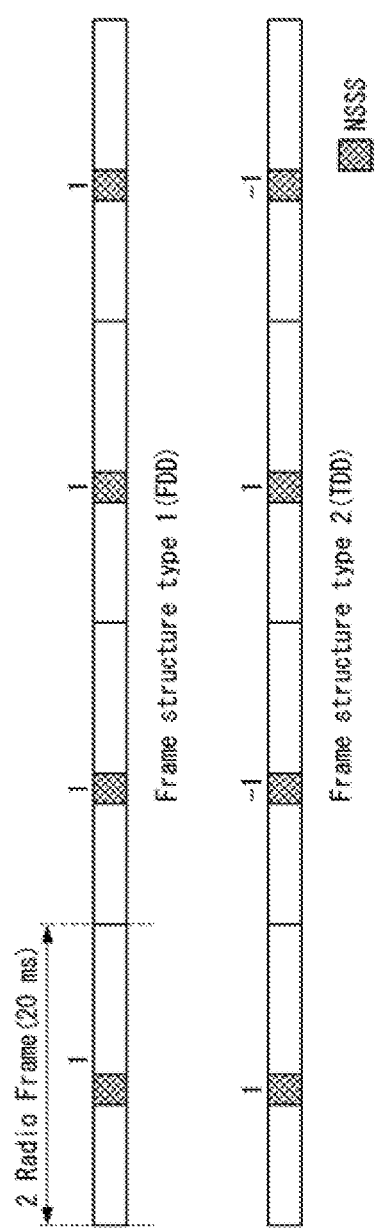

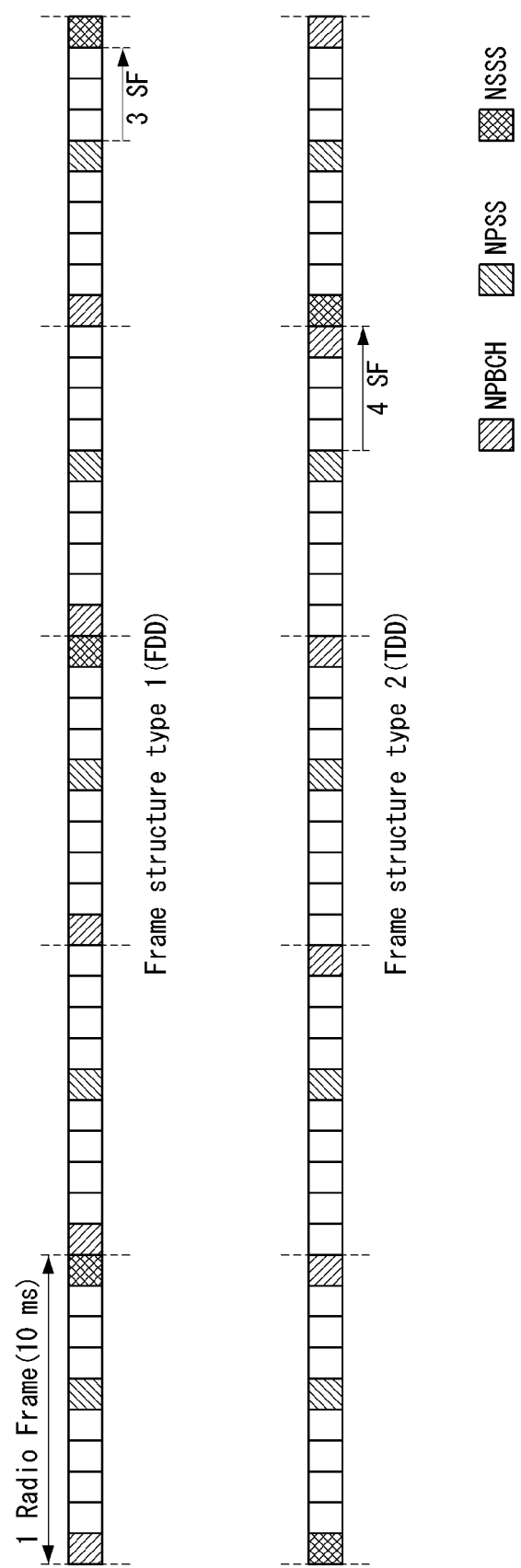
[FIG. 16]

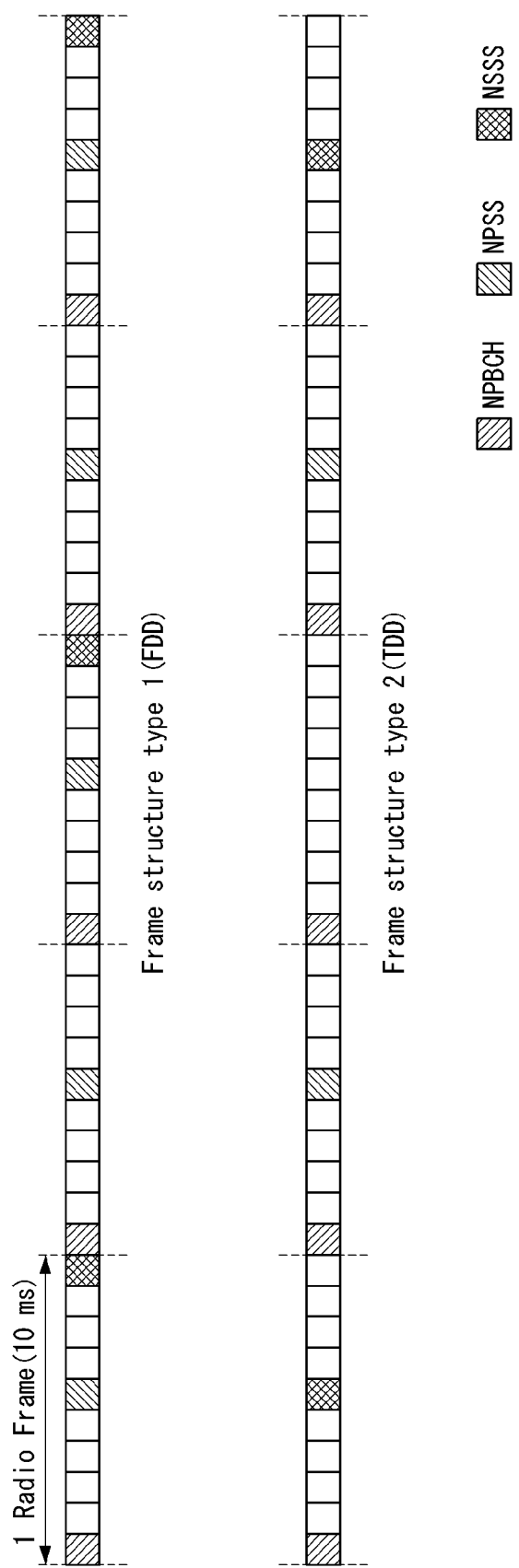

[FIG. 18]
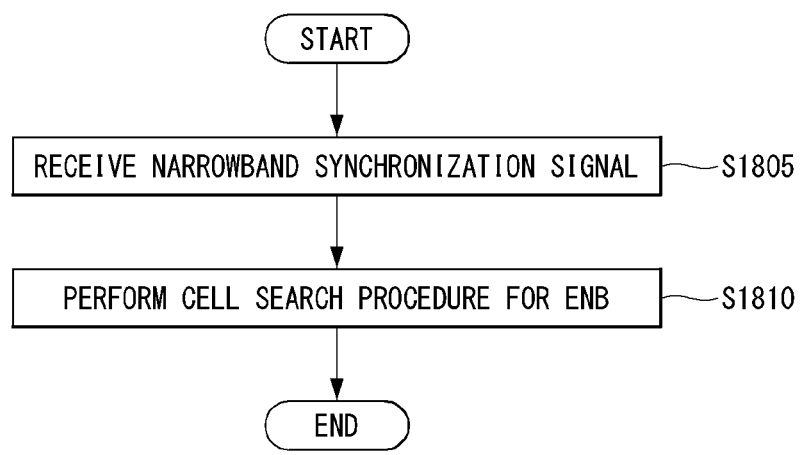

[FIG. 19]
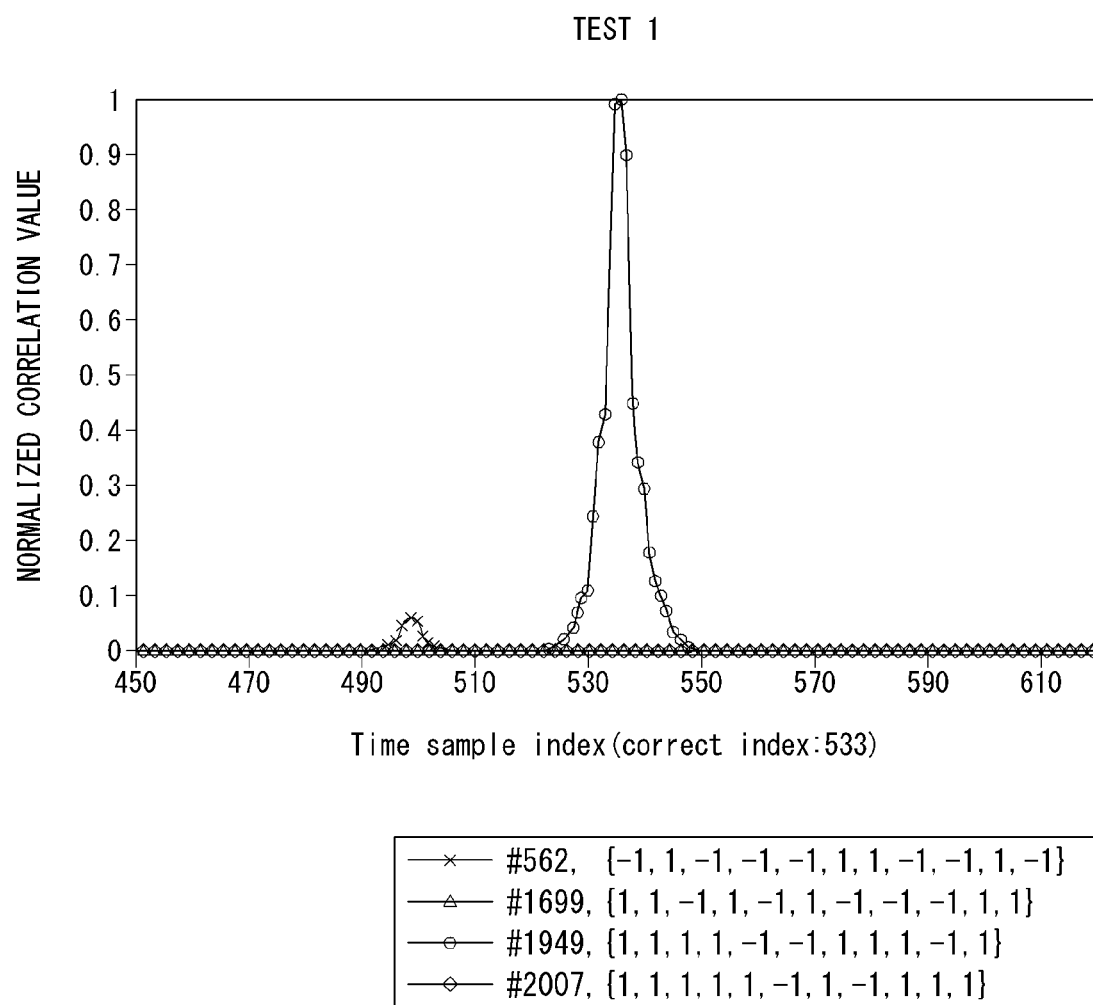

[FIG. 20]
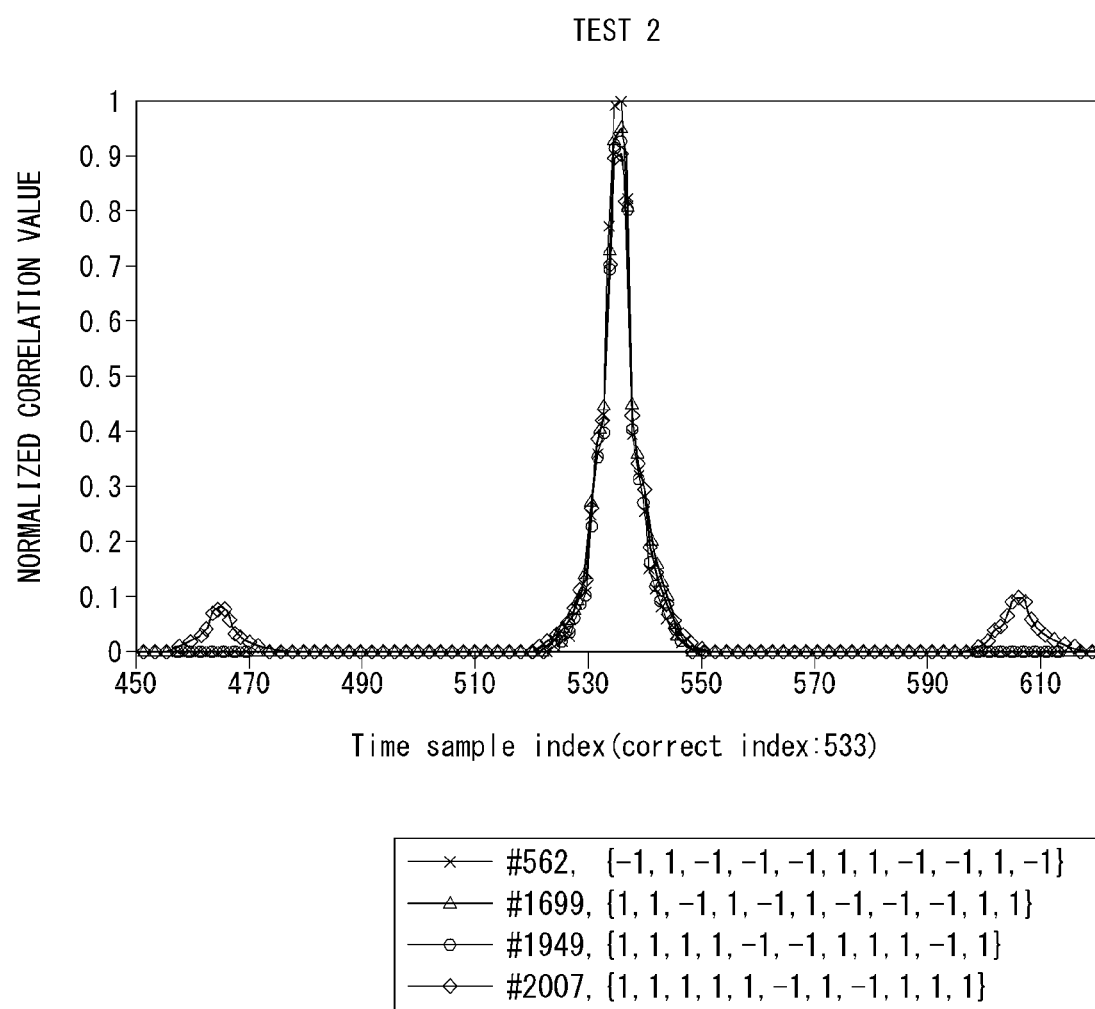

[FIG. 21]
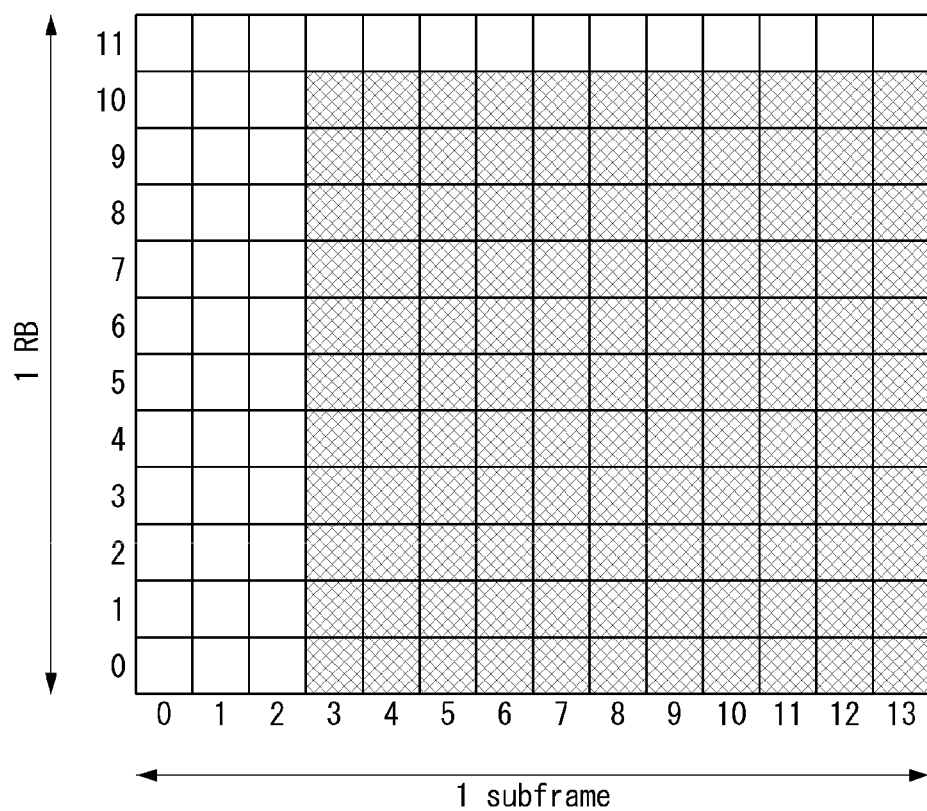

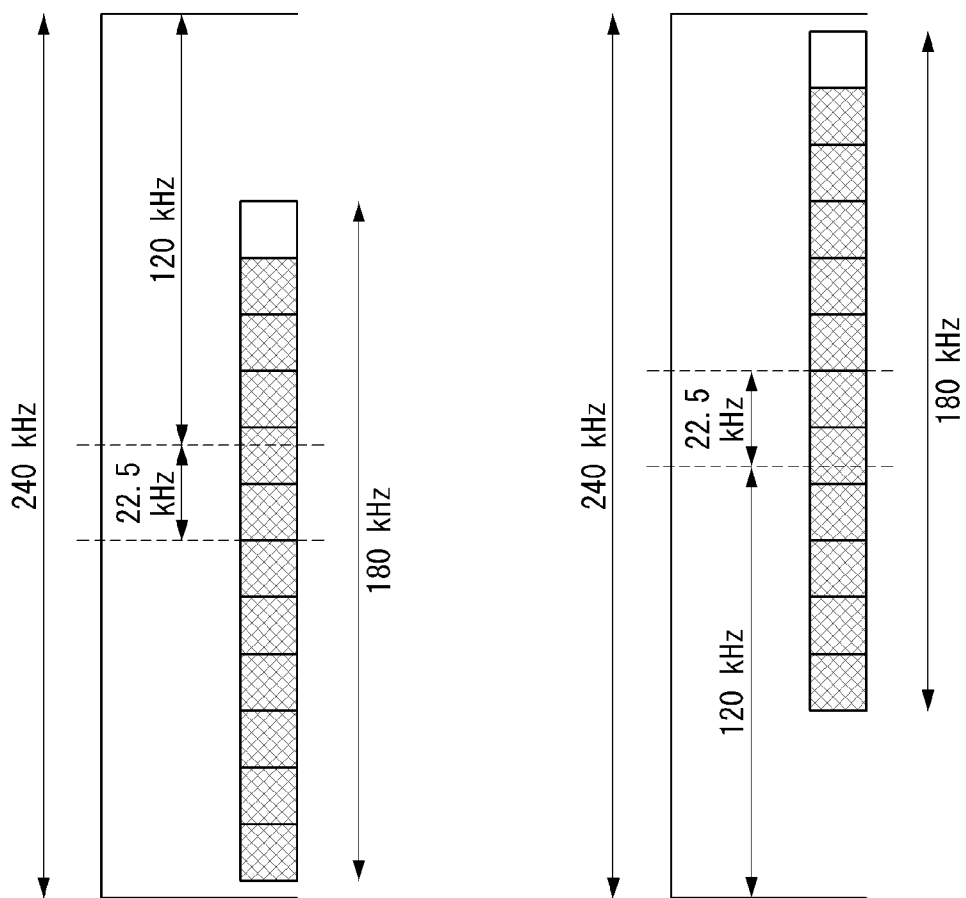
[FIG. 22]

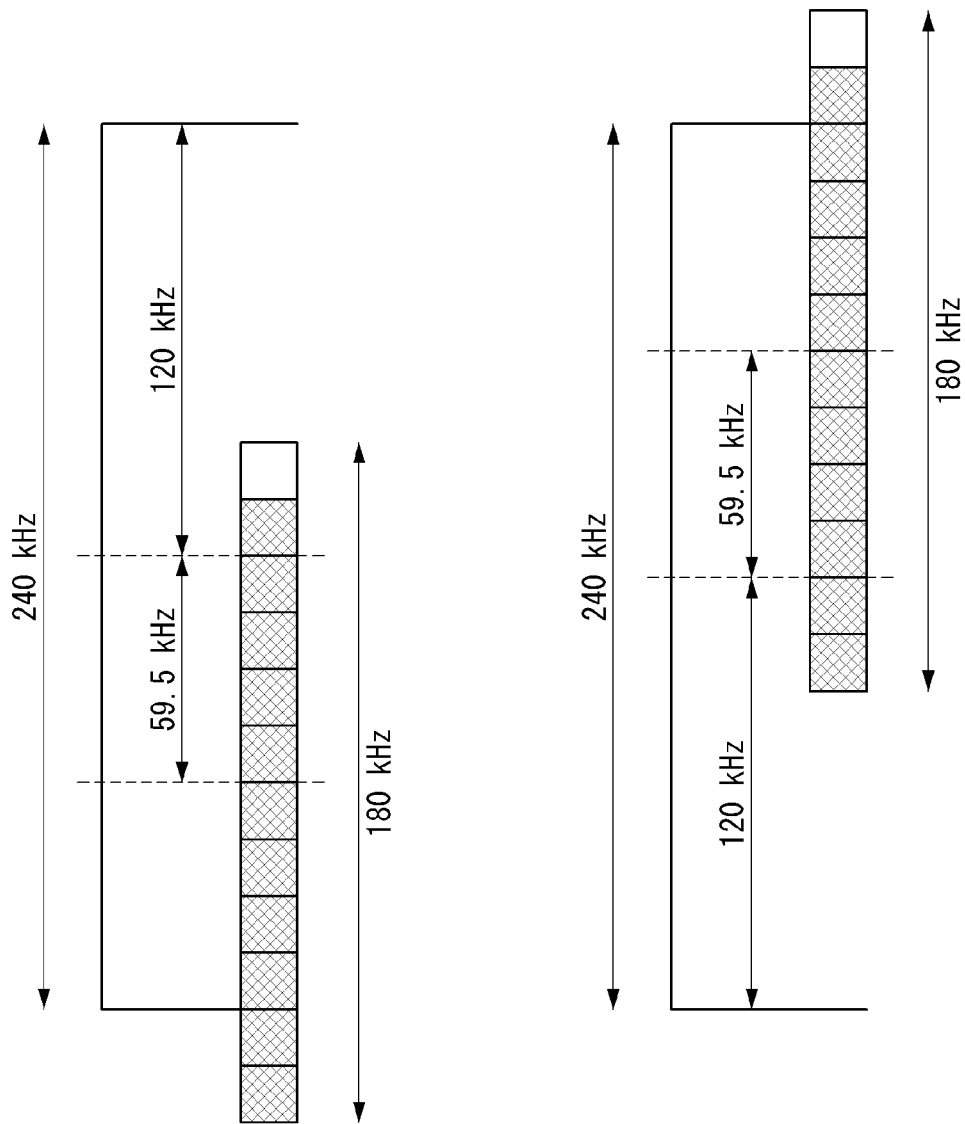
[FIG. 23]

[FIG. 24]
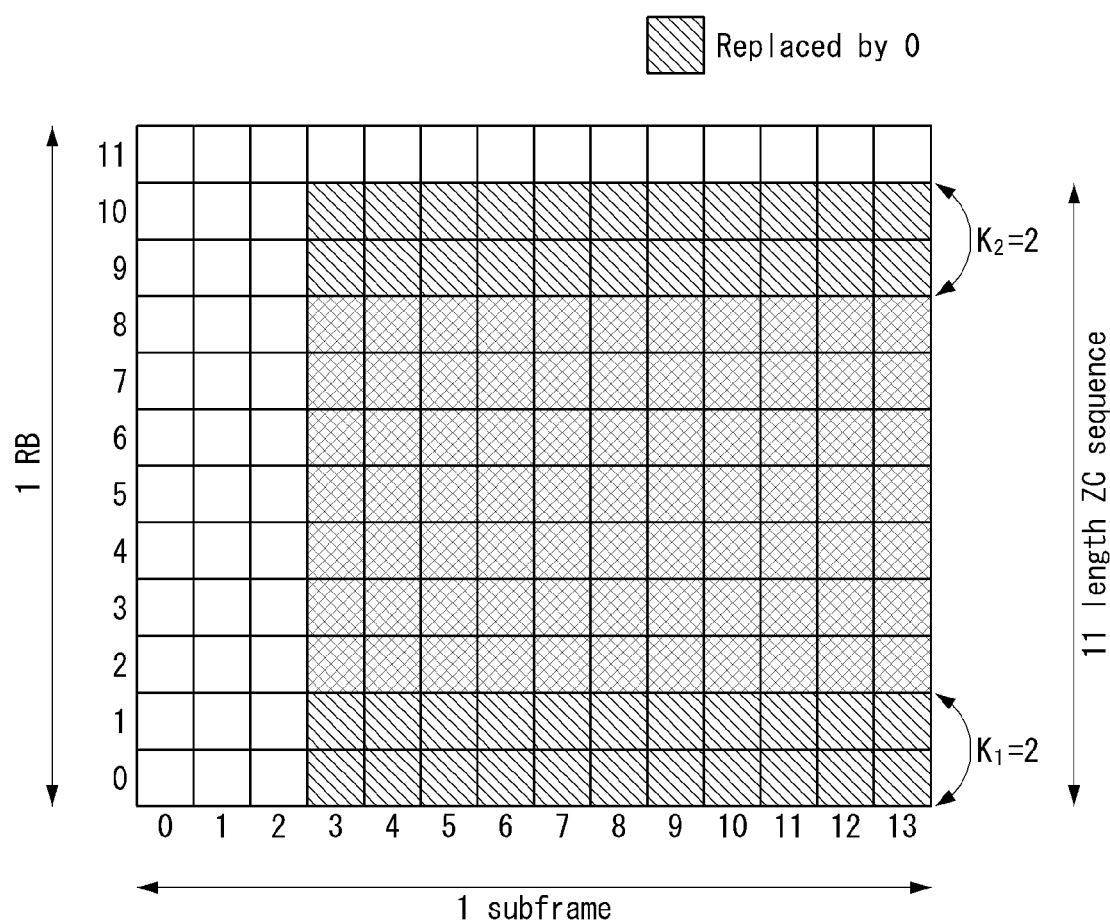

[FIG. 25]
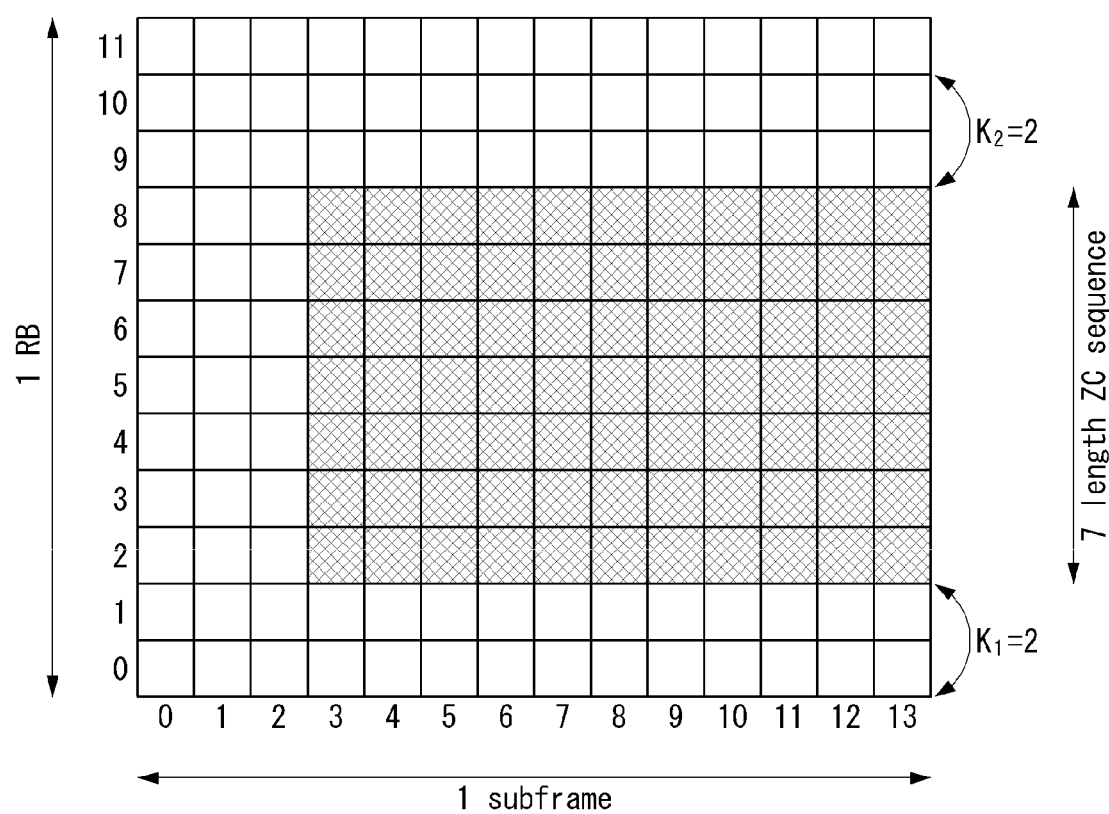

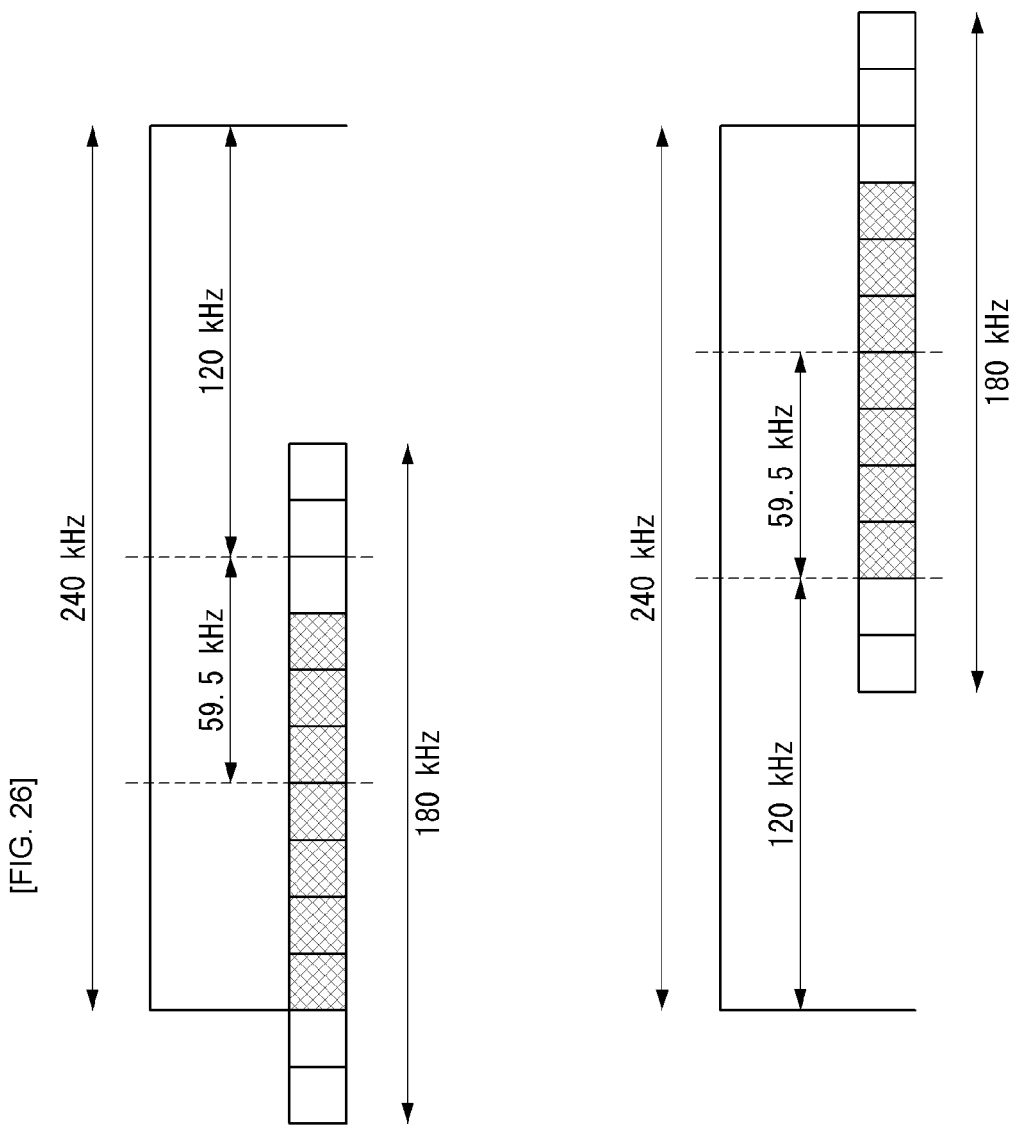
[FIG. 26]

[FIG. 27]
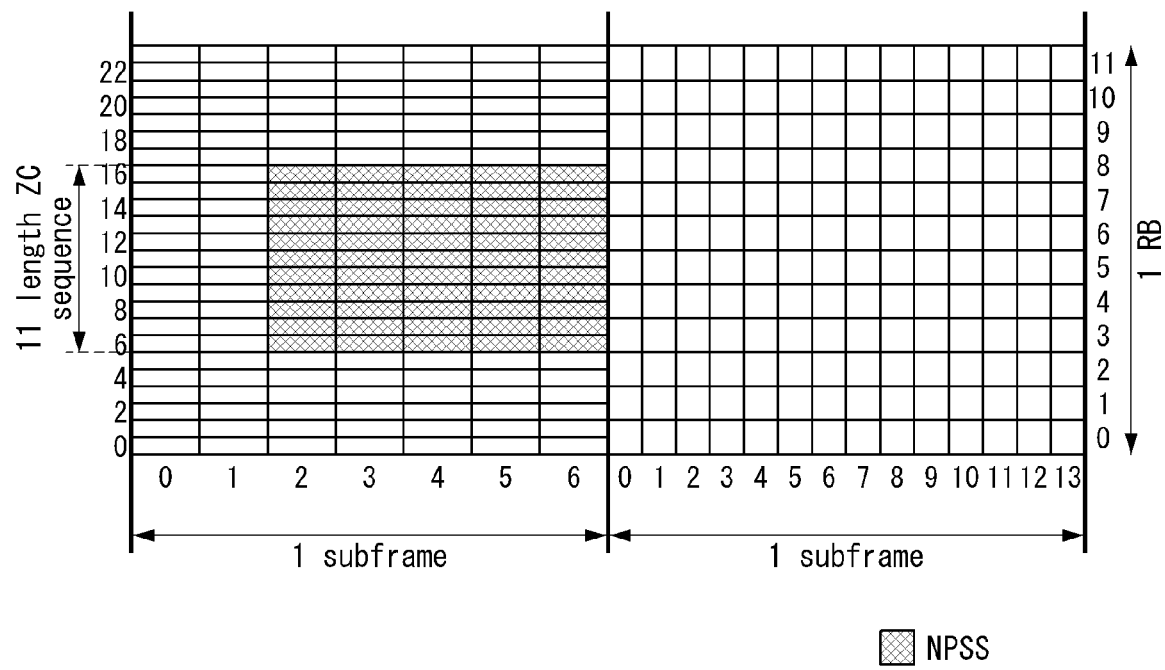

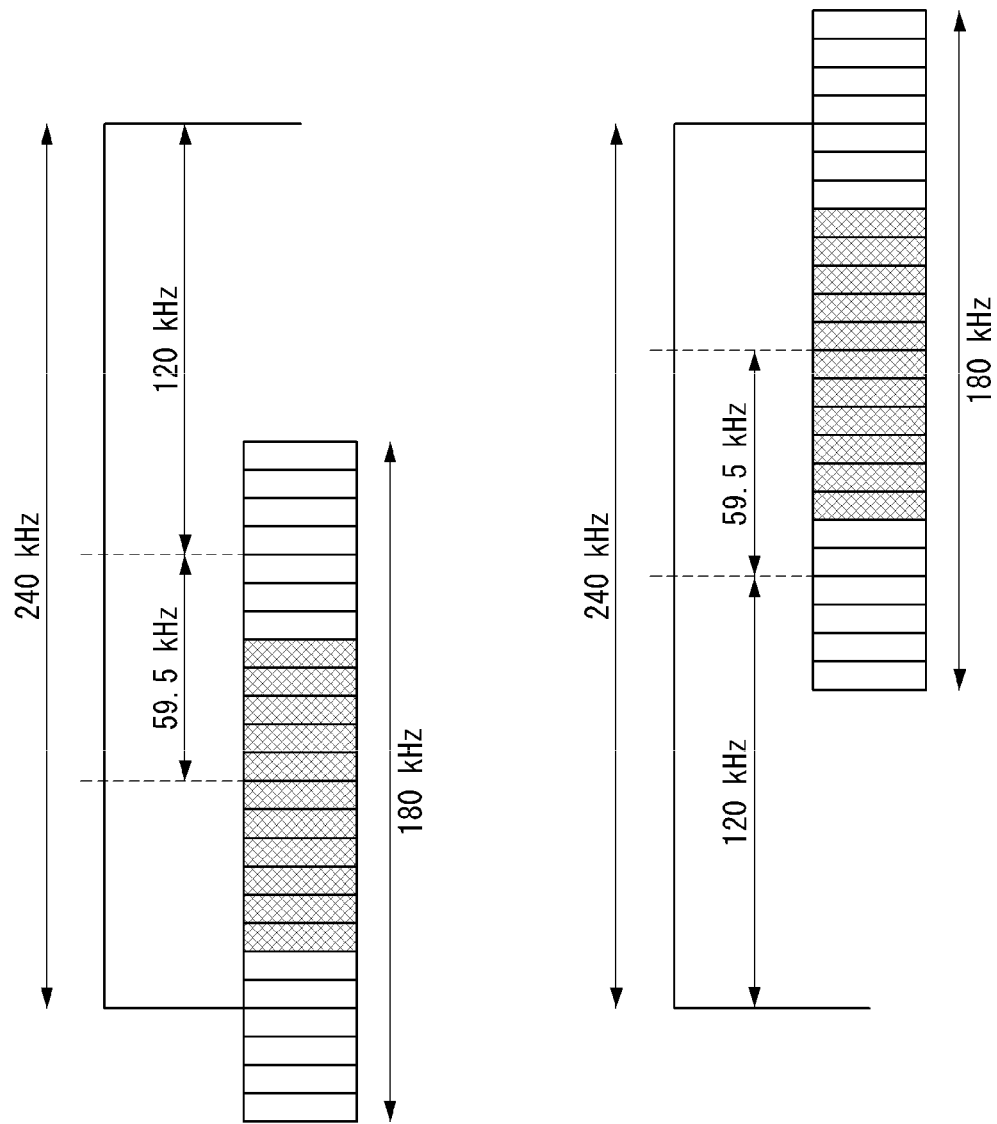
[FIG. 28]

[FIG. 29]
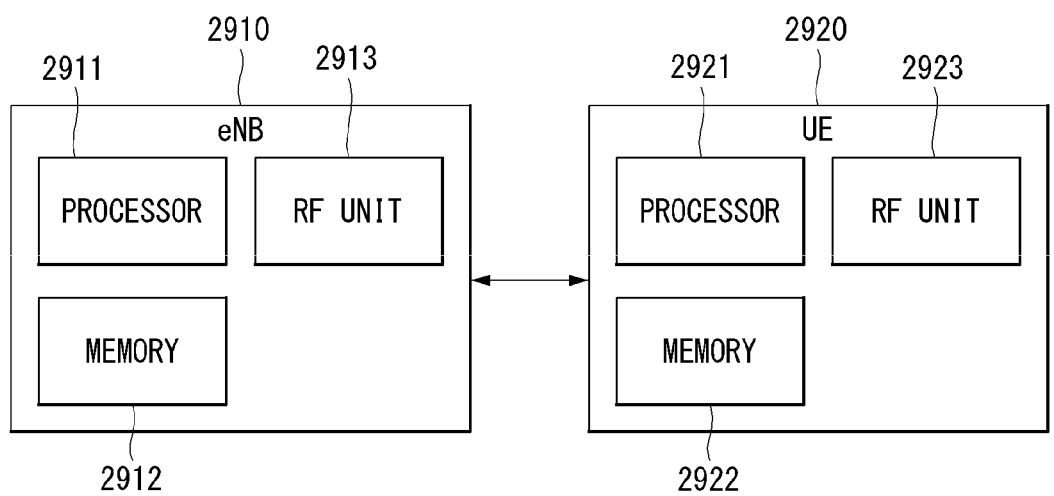

[FIG. 30]
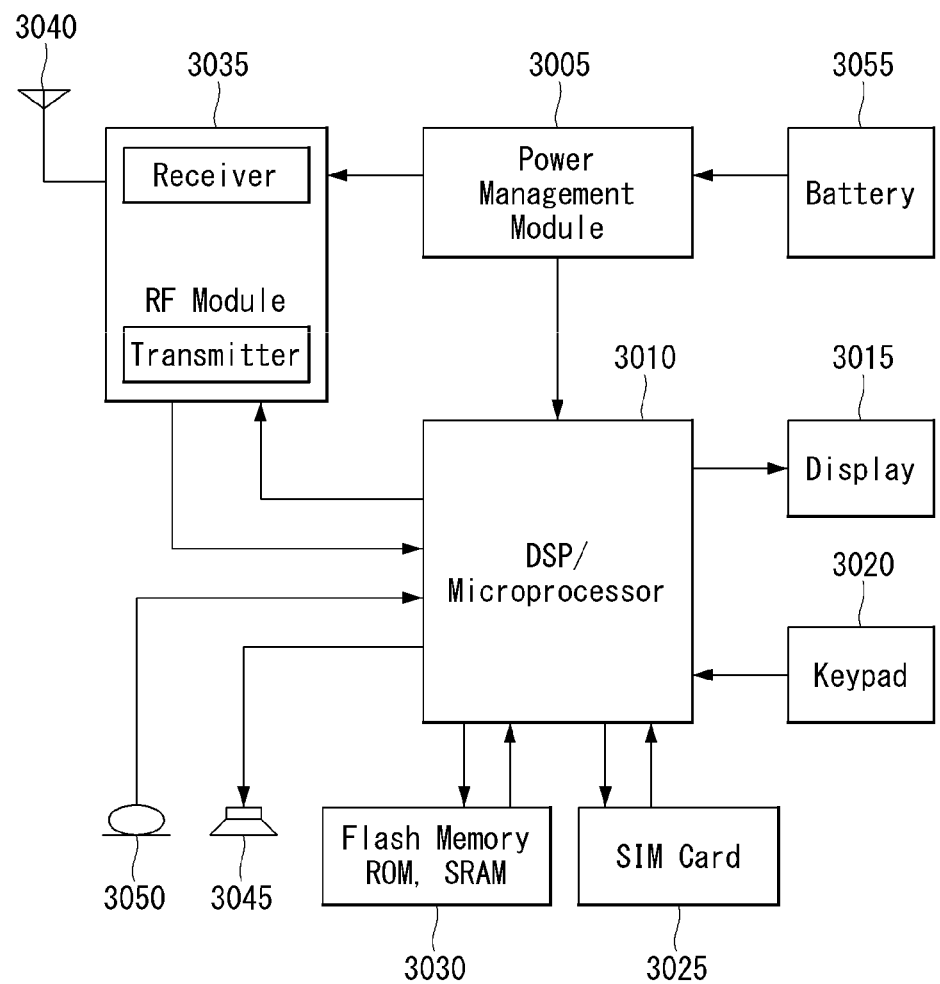

METHOD FOR TRANSMITTING/RECEIVING SYNCHRONIZATION SIGNAL IN WIRELESS COMMUNICATION SYSTEM AND APPARATUS THEREFOR

CROSS-REFERENCE TO RELATED APPLICATIONS

This application is a continuation of International Application No. PCT/KR2018/007039, filed on Jun. 21, 2018, which claims the benefit of U.S. Provisional Application No. 62/523,219, filed on Jun. 21, 2017, No. 62/536,972, filed on Jul. 25, 2017, And No. 62/554,513, filed on Sep. 5, 2017, the contents of which are all hereby incorporated by reference herein in their entirety.

TECHNICAL FIELD

The present disclosure relates to a method for transmitting/receiving a synchronization signal in a wireless communication system, and more particularly, to a method for transmitting/receiving a synchronization signal in a wireless communication system supporting NarrowBand-Internet of Things (NB-IoT) and an apparatus supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

This specification proposes a method for transmitting/receiving a synchronization signal in a wireless communication system supporting NarrowBand-Internet of Things (NB-IoT).

Specifically, this specification proposes a method for differently configuring configurations for NPSS, NSSS, and/or NPBCH in order to distinguish a type of radio frame structure.

Further, this specification proposes a method for configuring a cover code of NPSS to be applied differently according to the type of radio frame structure.

In addition, this specification proposes a method for generating an NPSS sequence and mapping a resource of the corresponding sequence by considering a frequency offset of the NPSS.

Technical objects to be achieved by the present disclosure are not limited to the aforementioned technical objects, and other technical objects not described above may be evidently understood by a person having ordinary skill in the art to which the present disclosure pertains from the following description.

Technical Solution

According to an embodiment of the present disclosure, a method for transmitting and receiving a synchronization signal in a wireless communication system supporting NarrowBand-Internet of Things (NB-IoT) may include: receiving, from a base station, a narrowband synchronization signal; and performing a cell search procedure for the base station based on the narrowband synchronization signal. Here, the narrowband synchronization signal may include a narrowband primary synchronization signal and a narrowband secondary synchronization signal, the narrowband primary synchronization signal and the narrowband secondary synchronization signal may be transmitted in different subframe, and the subframe in which the narrowband secondary synchronization signal is transmitted may be configured differently according to a type of a radio frame structure.

Further, in the method according to the embodiment of the present disclosure, in the case of a radio frame structure for frequency division duplex (FDD), the narrowband secondary synchronization signal may be transmitted in subframe #9 of a radio frame, and in the case of a radio frame structure for time division duplex (TDD), the narrowband secondary synchronization signal may be transmitted in subframe #0 of a radio frame. In this case, the narrowband primary synchronization signal may be transmitted in subframe #5 of a radio frame.

In this case, a transmission period of the narrowband secondary synchronization signal may be configured two times a transmission period of the narrowband primary synchronization signal. For example, the narrowband secondary synchronization signal may be transmitted in even-numbered radio frames among multiple radio frames supported by the wireless communication system.

Further, each of the narrowband primary synchronization signal and the narrowband secondary synchronization signal may be transmitted through 11 Orthogonal Frequency Division Multiplexing (OFDM) symbols of a subframe.

Further, the method may further include receiving, from the base station, a narrowband broadcast channel, in which a subframe in which the narrowband broadcast channel is transmitted may be configured differently according to the type of a radio frame structure. Specifically, in the case of a radio frame structure for the FDD, the narrowband broadcast channel may be transmitted in subframe #0 of a radio frame, and in the case of a radio frame structure for the TDD, the narrowband broadcast channel may be transmitted in subframe #9 of a radio frame.

Further, the narrowband synchronization signal may be generated based on a Zadoff-Chu sequence.

In addition, the method may further include determining a radio frame structure provided by the base station by using a gap between the subframe in which the narrowband primary synchronization signal is transmitted and the subframe in which the narrowband secondary synchronization signal is transmitted.

According to an embodiment of the present disclosure, a terminal receiving a synchronization signal in a wireless communication system supporting NarrowBand-Internet of Things (NB-IoT) ma include: a Radio Frequency (RF) unit for transmitting and receiving a radio signal; and a processor functionally connected to the RF unit, in which the processor may be configured to receive, from a base station, a narrowband synchronization signal, and perform a cell search procedure for the base station based on the narrowband synchronization signal. Here, the narrowband synchronization signal may include a narrowband primary synchronization signal and a narrowband secondary synchronization signal, the narrowband primary synchronization signal and the narrowband secondary synchronization signal may be transmitted in different subframe, and the subframe in which the narrowband secondary synchronization signal is transmitted may be configured differently according to a type of a radio frame structure.

Further, in the terminal according to the embodiment of the present disclosure, in the case of a radio frame structure for frequency division duplex (FDD), the narrowband secondary synchronization signal may be transmitted in subframe #9 of a radio frame, and in the case of a radio frame structure for time division duplex (TDD), the narrowband secondary synchronization signal may be transmitted in subframe #0 of a radio frame. In this case, the narrowband primary synchronization signal may be transmitted in subframe #5 of a radio frame.

Further, the processor may receive, from the base station, a narrowband broadcast channel and a subframe in which the narrowband broadcast channel is transmitted may be configured differently according to the type of radio frame structure. Specifically, in the case of a radio frame structure for the FDD, the narrowband broadcast channel may be transmitted in subframe #0 of a radio frame, and in the case of a radio frame structure for the TDD, the narrowband broadcast channel may be transmitted in subframe #9 of a radio frame.

Advantageous Effects

According to an embodiment of the present disclosure, there is an effect that in an initial access procedure step which a terminal performs for a cell, a type of radio frame structure supported or provided by the corresponding cell can be determined.

According to an embodiment of the present disclosure, there is an effect that the terminal can determine the type of radio frame structure supported or provided by the corresponding cell only by sequence detection other than a blind detection operation for a signal.

Further, according to an embodiment of the present disclosure, there is an effect that even when a center frequency is configured to a high band, a transmission region of NPSS does not deviate from a band of an analog filter.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included herein as a part of the description for help understanding the present disclosure, provide embodiments of the present disclosure, and describe the technical features of the present disclosure with the description below.

FIG. 1a-1b illustrates the structure of a radio frame in a wireless communication system to which the present disclosure may be applied.

FIG. 2 is a diagram illustrating a resource grid for a downlink slot in a wireless communication system to which the present disclosure may be applied.

FIG. 3 illustrates a structure of downlink subframe in a wireless communication system to which the present disclosure may be applied.

FIG. 4 illustrates a structure of uplink subframe in a wireless communication system to which the present disclosure may be applied.

FIG. 5a-5b illustrates examples of a component carrier and carrier aggregation in a wireless communication system to which the present disclosure may be applied.

FIG. 6 is a diagram illustrating division of cells of a system supporting carrier aggregation.

FIG. 7a-7d illustrates an auto-correction characteristic of NPSS or aNPSS when a cover code is applied.

FIG. 8 illustrates cross-correlation values of NSSS or aNSSS according to a cyclic shift value.

FIG. 9a-9d illustrates examples of a resource mapping method for NSSS or aNSSS.

FIG. 10a-10d illustrates an NSSS cross-correlation characteristic of a legacy NB-IoT UE according to a resource mapping scheme.

FIG. 11a-11b illustrates a transmission location of a synchronization signal according to a radio frame structure of an LTE system.

FIG. 12 illustrates an example of a method for transmitting a synchronization signal to which a method proposed in this specification may be applied.

FIG. 13 illustrates another example of the method for transmitting the synchronization signal to which the method proposed in this specification may be applied.

FIG. 14 illustrates yet another example of the method for transmitting the synchronization signal to which the method proposed in this specification may be applied.

FIG. 15a-15b illustrates still yet another example of the method for transmitting the synchronization signal to which the method proposed in this specification may be applied.

FIG. 16 illustrates still yet another example of the method for transmitting the synchronization signal to which the method proposed in this specification may be applied.

FIG. 17 illustrates still yet another example of the method for transmitting the synchronization signal to which the method proposed in this specification may be applied.

FIG. 18 is a flowchart of an operation of a UE which performs a cell search procedure by using a synchronization signal in a wireless communication system to which a method proposed in this specification may be applied.

FIG. 19 illustrates an example of a correlation power graph for cover code values of NPSS to which a method proposed in this specification may be applied.

FIG. 20 illustrates another example of the correlation power graph for the cover code values of NPSS to which the method proposed in this specification may be applied.

FIG. 21 illustrates a resource region occupied by NPSS of an existing NB-IoT system.

FIG. 22 illustrates one example of a frequency offset for the NPSS of the existing NB-IoT system.

FIG. 23 illustrates another example of the frequency offset for the NPSS of the existing NB-IoT system.

FIG. 24 illustrates one example of an NPSS sequence mapping method to which a method proposed in this specification may be applied.

FIG. 25 illustrates another example of the NPSS sequence mapping method to which the method proposed in this specification may be applied.

FIG. 26 illustrates one example of NPSS to which a method proposed in this specification may be applied.

FIG. 27 illustrates yet another example of the NPSS sequence mapping method to which the method proposed in this specification may be applied.

FIG. 28 illustrates another example of the frequency offset for the NPSS to which the method proposed in this specification may be applied.

FIG. 29 illustrates a block diagram of a wireless communication device to which methods proposed by this specification may be applied.

FIG. 30 illustrates a block diagram of a communication device according to an embodiment of the present disclosure.

MODE FOR INVENTION

Some embodiments of the present disclosure are described in detail with reference to the accompanying drawings. A detailed description to be disclosed along with the accompanying drawings are intended to describe some embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present disclosure, and the use of such specific terms may be changed in various forms without departing from the technical sprit of the present disclosure.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A or new RAT (RAT in 5G (5 generation) system) is chiefly described, but the technical characteristics of the present disclosure are not limited thereto.

Overview of System

FIG. 1 shows the structure of a radio frame in a wireless communication system to which an embodiment of the present disclosure may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_{slot}=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2. A type 2 radio frame includes two half frame of 153600*T_s=5 ms length each. Each half frame includes 5 subframes of 30720*T_s=1 ms length.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of T_slot=15360*T_s=0.5 ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | DwPTS | UpPTS Normal cyclic prefix in uplink | Extended cyclic prefix in uplink | DwPTS | UpPTS Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | | — |
| 8 | 24144 · $T_s$ | | | — | | — |

The structure of a radio subframe according to the example of FIG. 1 is just an example, and the number of subcarriers included in a radio frame, the number of slots included in a subframe and the number of OFDM symbols included in a slot may be changed in various manners.

FIG. 2 is a diagram illustrating a resource grid for one downlink slot in a wireless communication system to which an embodiment of the present disclosure may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present disclosure is not limited thereto.

Each element on the resource grid is referred to as a resource element, and one resource block (RB) includes 12×7 resource elements. The number of RBs NADL included in a downlink slot depends on a downlink transmission bandwidth.

The structure of an uplink slot may be the same as that of a downlink slot.

FIG. 3 shows the structure of a downlink subframe in a wireless communication system to which an embodiment of the present disclosure may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH fora paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

The enhanced PDCCH (EPDCCH) carries UE-specific signaling. The EPDCCH is located in a physical resource block (PRB) that is configured to be UE specific. In other words, as described above, the PDCCH may be transmitted in up to three OFDM symbols in the first slot in the subframe, but the EPDCCH can be transmitted in a resource region other than the PDCCH. The time (i.e., symbol) at which the EPDCCH starts in the subframe may be configured in the UE via higher layer signaling (e.g., RRC signaling, etc.).

The EPDCCH may carry a transport format, resource allocation, and HARQ information associated with DL-SCH, a transport format, resource allocation, and HARQ information associated with UL-SCH, resource allocation information associated with Sidelink Shared Channel (SL-SCH) and Physical Sidelink Control Channel (PSCCH), etc. Multiple EPDCCHs may be supported and the UE may monitor the set of EPCCHs.

The EPDCCH may be transmitted using one or more successive enhanced CCEs (ECCEs) and the number of ECCEs per EPDCCH may be determined for each EPDCCH format.

Each ECCE may be constituted by a plurality of enhanced resource element groups (EREGs). The EREG is used for defining mapping of the ECCE to the RE. There are 16 EREGs per PRB pair. All REs are numbered from 0 to 15 in the order in which the next time increases in the order in which the frequency increases, except for the RE carrying the DMRS in each PRB pair.

The UE may monitor a plurality of EPDCCHs. For example, one or two EPDCCH sets may be configured in one PRB pair in which the UE monitors EPDCCH transmission.

Different coding rates may be implemented for the EPOCH by merging different numbers of ECCEs. The EPOCH may use localized transmission or distributed transmission, and as a result, the mapping of the ECCE to the RE in the PRB may vary.

FIG. 4 shows the structure of an uplink subframe in a wireless communication system to which an embodiment of the present disclosure may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Overview of Carrier Aggregatiom

A communication environment considered in embodiments of the present disclosure includes all multi-carrier support environments. That is, a multi-carrier system or carrier aggregation (CA) system used in the present disclosure is a system in which, when a target wide band is configured, one or more component carriers (CCs) having a bandwidth smaller than a target bandwidth are aggregated and used in order to support a wide band.

In the present disclosure, multi-carriers refer to aggregation (or carrier aggregation) of carriers and in this case, the aggregation of the carriers refers to both aggregation of contiguous carriers and aggregation of non-contiguous carriers. Further, the number of components carriers aggregated between the downlink and the uplink may be set differently. A case where the number of downlink component carriers (hereinafter, referred to as DL CC') is equal to the number of uplink component carriers (hereinafter, referred to as 'UL CC') is referred to as symmetric aggregation and a case where the number of downlink CCs is different from the number of uplink CCs is referred to as asymmetric aggregation. Such carrier aggregation may be used interchangeably with terms such as carrier aggregation, bandwidth aggregation, spectrum aggregation, and the like.

Carrier aggregation configured by combining two or more component carriers aims at supporting up to 100 MHz bandwidth in the LTE-A system. When one or more carriers having a bandwidth smaller than the target bandwidth are combined, the bandwidth of the combined carriers may be limited to the bandwidth used in the existing system in order to maintain backward compatibility with the existing IMT system. For example, in the existing 3GPP LTE system, {1.4, 3, 5, 10, 15, 20} MHz bandwidth is supported and in 3GPP LTE-advanced system (that is, LTE-A), a bandwidth larger than 20 MHz may be supported by using only the bandwidths for compatibility with the existing system. Further, the carrier aggregation system used in the present disclosure may support the carrier aggregation by defining a new bandwidth regardless of the bandwidth used in the existing system.

The LTE-A system uses a concept of a cell to manage radio resources.

The aforementioned carrier aggregation environment may be referred to as a multiple-cell environment. The cell is defined as a combination of a pair of a downlink resource (DL CC) and an uplink resource (UL CC), but the uplink resource is not required. Accordingly, the cell may be constituted by the downlink resource along or by the downlink resource and the uplink resource. When a specific user equipment has only one configured serving cell, the specific user equipment may have one DL CC and one UL CC, but when the specific user equipment has two or more configured serving cells, the specific user equipment may have DL CCs as many as the cells and the number of UL CCs may be equal to or smaller there than.

Alternatively, on the contrary, the DL CC and the UL CC may be configured. That is, when the specific user equipment has multiple configured serving cells, a carrier aggregation environment in which the number of UL CCs is larger than the number of DL CCs may also be supported. That is, the carrier aggregation may be appreciated as aggregation of two or more different cells having carrier frequencies (center frequency of the cell), respectively. Here, the term 'cell' needs to be distinguished from a 'cell' as an area covered by the eNB which is generally used.

The cell used in the LTE-A system includes a primary cell (PCell) and a secondary cell (SCell). The P cell and the S cell may be used as the serving cell. In the case of a user equipment which is in an RRC_CONNECTED state, but does not configure the carrier aggregation or does not support the carrier aggregation, only one serving cell configured only by the P cell exists. On the contrary, in the case of a user equipment which is in the RRC_CONNECTED state and configures the carrier aggregation, one or more serving cells may exist and the entire serving cell includes the P cell and one or more S cells.

The serving cell (P cell and S cell) may be configured through an RRC parameter. PhysCellId has integer values of 0 to 503 as a physical layer identifier of the cell. SCellIndex has integer values of 1 to 7 as a short identifier used for identifying the S cell. ServCellIndex has integer values of 0 to 7 as a short identifier used for identifying the serving cell (P cell or S cell). The 0 value is applied to the P cell and SCellIndex is previously granted to be applied to the S cell. That is, a cell having the smallest cell ID (or cell index) in ServCellIndex becomes the P cell.

The P cell refers to a cell operating on a primary frequency (or primary CC). The user equipment may be used to perform an initial connection establishment process or a connection re-establishment process and may refer to a cell indicated during a handover process. Further, the P cell refers to a cell which becomes a center of control related communication among the serving cells configured in the carrier aggregation environment. That is, the user equipment may be allocated the PUCCH only in the P cell thereof and may transmit the allocated PUCCH and may use only the P cell for acquiring system information or changing a monitoring procedure. Evolved Universal Terrestrial Radio Access (E-UTRAN) may change only the P cell for the handover procedure by using an RRC connection reconfiguration message of a higher layer, which includes mobility control information to the user equipment that supports the carrier aggregation environment.

The S cell refers to a cell operating on a second frequency (or secondary CC). Only one P cell may be allocated to the specific user equipment and one or more S cells may be allocated to the specific user equipment. The S cell may be configured after the RRC connection is configured and may be used to provide an additional radio resource. The PUCCH does not exist in remaining cells other than the P cell among the serving cells configured in the carrier aggregation environment, that is, the S cell. When the E-UTRAN adds the S cell to the user equipment supporting the carrier aggregation environment, the E-UTRAN may provide all the system information related to the operation of a related cell which is in the RRC_CONNECTED state through a dedicated signal. The change of the system information may be controlled by releasing and adding the related S cell and the RR connection reconfiguration message of the higher layer may be used at this time. The E-UTRAN may perform dedicated signaling with different parameters for each user equipment rather than broadcasting within the related S cell.

After an initial security activation process starts, the E-UTRAN may configure a network including one or more S cells in addition to the P cell initially configured in the connection configuration process. In the carrier aggregation environment, the P cell and the S cell may operate as respective component carriers. In the following embodiments, the primary component carrier (PCC) may be used in the same meaning as the P cell and the secondary component carrier (SCC) may be used in the same meaning as the S cell.

FIG. 5 illustrates examples of a component carrier and carrier aggregation in a wireless communication system to which the present disclosure may be applied.

FIG. 5(a) illustrates a single carrier structure used in the LTE system. The component carrier includes the DL CC and the UL CC. One component carrier may have a frequency range of 20 MHz.

FIG. 5(b) illustrates a carrier aggregation structure used in the LTE-A system. FIG. 5(b) illustrates a case where three component carriers having a frequency magnitude of 20 MHz are combined. There are three DL CCs and three UL CCs, but the numbers of DL CCs and UL CCs are not limited. In the case of the carrier aggregation, the UE may simultaneously monitor three CCs, and receive a downlink signal/data and transmit an uplink signal/data.

When N DL CCs are managed in a specific cell, the network may allocate M (M≤N) DL CCs to the user equipment. In this case, the UE may monitor only M limited DL CCs and receive the DL signal. Further, the network may allocate a primary DL CC to the user equipment by assigning priorities to L (L≤M≤N) DL CCs and in this case, the UE needs to particularly monitor L DL CCs. Such a scheme may be similarly applied even to uplink transmission.

A linkage between the carrier frequency (or DL CC) of the downlink resource and the carrier frequency (or UL CC) of the uplink resource may be indicated by a higher layer message such as an RRC message or system information. For example, a combination of the DL resource and the UL resource may be configured by a linkage defined by System Information Block Type2 (SIB2). Specifically, the linkage may refer to a mapping relationship between a DL CC in which a PDCCH carrying a UL grant is transmitted and a UL CC that uses the UL grant or may refer to a mapping relationship between a DL CC (or UL CC) in which data for HARQ is transmitted and a UL CC (or DL CC) in which an HARQ ACK/NACK signal is transmitted.

FIG. 6 is a diagram illustrating division of cells of a system supporting carrier aggregation.

Referring to FIG. 6, a configured cell may be configured for each UE as a cell capable of aggregating carriers based on a measurement report among cells of the eNB as illustrated in FIG. 5. The configured cell may reserve resources for ack/nack transmission in advance for PDSCH transmission. The activated cell is a cell configured to actually transmit PDSCH/PUSCH among the configured cells and performs channel state information (CSI) reporting and sounding reference signal (SRS) transmission for PDSCH/PUSCH transmission. The de-activated cell is a cell that prevents the PDSCH/PUSCH transmission by a command or timer operation of the eNB, and may also stop the CSI reporting and the SRS transmission.

Synchronization Signal for NB-IoT

In the NB-IoT system, the synchronization signal may be classified into a Narrowband Primary Synchronization Signal (NPSS) and a Narrowband Secondary Synchronization Signal (NSSS). In this case, 504 unique physical layer identifiers may be indicated by the NSSS.

First, a sequence di(n) used for the NPSS may be generated from a Zadoff-Chu sequence on a frequency domain according to Equation 1.

$$d_l(n) = S(l) \cdot e^{-j\frac{\pi u n(n+1)}{11}}, n = 0, 1, \ldots, 10 \quad \text{[Equation 1]}$$

In Equation 1, a Zadoff-Chu root sequence index u may be 5 and an S(I) value for a different symbol index I may be given by Table 3. Table 3 shows a definition of the S(I) value.

TABLE 3

| Cyclic prefix length | S(3), ..., S(13) |
|---|---|
| Normal | 1  1  1  1  −1  −1  1  1  1  −1  1 |

The sequence used for the NPSS may be mapped to a resource element(s) through the following scheme.

Specifically, the same antenna port may be used with respect to all symbols of the NPSS in the subframe. The UE may not assume that the NPSS is transmitted through the same antenna port as a random downlink reference signal. Further, the UE may not assume that NPSS transmission in a given subframe uses the same antenna port(s) as the NPSS in another random subframe.

In this case, a sequence di(n) may be mapped to a resource element (k, l) in subframe #5 of every radio frame (i.e., frame) and the sequence $d_l(n)$ may be mapped in an order in which an index k increases and then mapped in an order in which an index l increases. In the case of a resource element which overlaps with a resource element in which a cell-specific reference signal is transmitted, the corresponding sequence element d(n) may not be used for the NPSS, but may be counted in a mapping procedure.

Next, a sequence $d_f(n)$ used for the NSSS may be generated from the Zadoff-Chu sequence on the frequency domain according to Equation 2.

$$d(n) = b_q(m) \cdot e^{-j2\pi\theta_f n} e^{-j\frac{\pi u n'(n'+1)}{131}} \quad \text{[Equation 2]}$$

$$n = 0, 1, \ldots, 131$$

$$n' = n \bmod 131$$

$$m = n \bmod 128$$

$$u = N_{ID}^{Ncell} \bmod 126 + 3$$

$$q = \left\lfloor \frac{N_{ID}^{Ncell}}{126} \right\rfloor$$

In Equation 2, a binary sequence $b_q(m)$ is given by Table 4 and a cyclic shift $\theta_f$ in frame number $n_f$ is given by Equation 3.

TABLE 4

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 1 −1 −1 1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 −1 1 1 −1 1 −1 −1 1 −1 1 1 −1 −1 1 1 −1 1 −1 −1 1 1 −1 −1 1 −1 1 1 −1 1 −1 −1 1 −1 1 1 −1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 −1 1 1 −1] |
| 2 | [1 −1 −1 1 −1 1 1 −1 −1 1 1 −1 1 −1 −1 1 1 −1 −1 1 −1 1 1 −1 1 −1 −1 1 1 −1 −1 1 1 −1 −1 1 −1 1 1 −1 −1 1 1 −1 1 −1 −1 1 1 −1 −1 1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 −1 1 1 −1 1 −1 −1 1 1 −1 −1 1 −1 1 1 −1 −1 1 1 −1 1 −1 −1 1 −1 1 1 −1 1 −1 −1 1 1 −1 −1 1 −1 1 −1 1] |
| 3 | [1 −1 −1 1 −1 1 1 −1 −1 1 1 −1 1 −1 −1 1 1 −1 −1 1 −1 1 1 −1 1 −1 −1 1 1 −1 −1 1 1 −1 −1 1 −1 1 1 −1 −1 1 1 −1 1 −1 −1 1 1 −1 −1 1 −1 1 1 −1 1 −1 −1 1 1 −1 −1 1 1 −1 −1 1 −1 1 1 −1 −1 1 1 −1 1 −1 −1 1 1 −1 −1 1 −1 1 1 −1 1 −1 −1 1 1 −1 −1 1 1 −1 −1 1 −1 1 1 −1 −1 1 1 −1 1 −1 −1 1 1 −1 −1 1 −1 1 1 −1 1 −1 −1 1 −1 1 1 −1] |

$$\theta_f = \frac{33}{132}(n_f/2) \bmod 4 \quad \text{[Equation 3]}$$

The sequence used for the NSSS may be mapped to the resource element(s) through the following scheme.

Specifically, the same antenna port needs to be used with respect to all symbols of the NSSS in the subframe. The UE may not assume that the NSSS is transmitted through the same antenna port as a random downlink reference signal. Further, the UE may not assume that NSSS transmission in a given subframe uses the same antenna port(s) as the NSSS in another random subframe.

The sequence d(n) is sequentially mapped to the resource element (k, l) from d(0). In this case, the sequence d(n) may be mapped in an order in which a first index k increases over 12 allocated subcarriers in subframe #9 of the radio frame and mapped in the order in which the index l increases over a last $N_{symb}^{NSSS}$ symbol allocated thereafter. Here, the radio frame corresponds to a radio frame satisfying $n_f \mod 2=0$. Here, a $N_{symb}^{NSSS}$ value may be given by Table 5.

TABLE 5

| Cyclic prefix length | $N_{symb}^{NSSS}$ |
|---|---|
| Normal | 11 |

In the case of a resource element which overlaps with a resource element in which a cell-specific reference signal is transmitted, the corresponding sequence element d(n) may not be used for the NSSS, but may be counted in a mapping procedure.

Further, unlike the NPSS and the NSSS, in the case of an NB-IoT channel structure for cell search enhancement, the following 'aNPSS' and 'aNSSS' may be additionally considered. Here, 'aNPSS' may mean an advanced NPSS and 'sNSSS' may mean advanced NSSS. In this case, 'aNPSS' may correspond to a part of the type of NPSS or may be defined separately from the NPSS. Similarly, 'aNSSS' may correspond to a part of the type of NSSS or may be defined separately from the NSSS.

First, the configuration of 'aNPSS' is described in detail.

If the additionally considered aNPSS is configured by the same signal as the existing NPSS defined by Equation 1 described above, it may be difficult for the NB-IoT UE to distinguish whether the detected sequence is received from the base station that transmits both the NPSS and the aNPSS or whether the NPSS is received from base stations having different transmission time.

Accordingly, the aNPSS needs to be configured differently from the existing NPSS and this needs to be designed by a method that minimizes the increase in implementation and computation complexity of the NB-IoT UE without being higher than the PAPR of the NPSS. In order to achieve the design, a root index and a cover code of the Zadoff-Chu sequence may be changed.

1) Zadoff-Chu Sequence for aNPSS

The aNPSS may be configured so as to use 6 as the u value of Equation 1 described above.

In general, when a root of the Zadoff-Chu sequence having a length of L is u and L-u, since two sequences have a complex conjugate relationship with each other, a correlation may be acquired through one complex multiplication every sample. Further, this may have the same PAPR characteristic as the NPSS and a correlation value with the NPSS has a low value in the sequence having the length of L.

That is, there is a high probability that the legacy (i.e., existing) NB-IoT UE will not detect the aNPSS and the NB-IoT UE using the aNPSS may reutilize a correlation module for the NPSS. This is advantageous in terms of complexity when it may not be known whether the base station of an anchor carrier transmits the aNPSS at the time of initial cell search. Further, since the Zadoff-Chu sequence has the same structure as the existing sequence, it may be advantageous in that the same weight may be applied in accumulating the correlation values for the NPSS and the aNPSS, respectively.

2) Cover Code for aNPSS

The NB-IoT UE may perform auto-correlation characteristic based cell search for detecting the NPSS by using the characteristics of the cover code S(I) defined in Equation 1 described above. When implementation of such a UE is considered, the proposed 'root u=6' may not be distinguished from 'root u=5' of the NPSS.

Accordingly, a new cover code having a cross correlation characteristic with the cover code of the NPSS needs to be applied to the aNPSS.

FIG. 7 illustrates an auto-correction characteristic of NPSS or aNPSS when a cover code is applied.

In particular, FIG. 7a illustrates an auto-correlation characteristic of the NPSS in the case of using the cover code (S=[1 1 1 1 −1 −1 1 1 1 −1 1]) of the NPSS.

Unlike this, FIGS. 7b to 7d illustrate the auto-correlation characteristic of the aNPSS in the case of applying a cover code different from the cover code of the existing NSSS to the aNPSS. Specifically, FIG. 7b illustrates the auto-correlation characteristic in the case of using S=[1 −1 1 −1 1 −1 1 −1 −1 1] as the cover code in the aNPSS, FIG. 7c illustrates the auto-correlation characteristic in the case of using S=[−1 −1 1 −1 −1 −1 1 −1 1 1 1] as the cover code in the aNPSS, and FIG. 7d illustrates the auto-correlation characteristic in the case of using S=[1 1 −1 1 −1 −1 1 −1 1 −1 1] as the cover code in the aNPSS.

In the FIGS. of 7a to 7d, a graph corresponding to the legacy NB-IoT shows a case where the NB-IoT UE estimates the auto-correlation by using the cover code of the existing NPSS and an NB-IoT graph considered in the NR system (e.g., Rel. 15) shows a case where the auto-correlation is estimated by applying a newly added cover code in each figure.

As can be known in FIG. 7a, in the case of utilizing the cover code of the NPSS, an auto-correlation value has a maximum value in specific r which is an accurate timing and has a peak (i.e., narrow peak) in a narrow region based on the corresponding timing. Further, a side peak value other than the peak including the maximum value has a relatively low value.

On the contrary, the cover code used in FIG. 7b does not almost have the side peak value, but has the peak (i.e., wide peak) in a wide region around the accurate timing. This may cause timing estimation performance of the UE to deteriorate.

Further, the cover code used in FIG. 7c has the narrow peak at an accurate timing location, but has a relatively high side peak value over an immediately adjacent region.

In addition, the cover code used in FIG. 7d has the narrow peak similar to that in FIG. 7a at the accurate timing location and has a lower side peak than that in FIG. 7c. In addition, referring to FIG. 7d, it can be confirmed that the aNPSS has an auto-correlation characteristic which may not almost influence detection of the NPSS of the legacy NB-IoT UE. Accordingly, [1 1 −1 1 −1 −1 1 −1 1 31 1 1] may be considered as the cover code S(I) of the aNPSS.

The root (u=6) of the Zadoff-Chu sequence and the cover code (S=[1 1 −1 1 −1 −1 1 −1 1 −1 1]) proposed as described above are not all applied to the aNPSS, but a method may be considered in which the existing NPSS (u=5) and the proposed S=[1 1 −1 1 −1 −1 1 −1 1 −1 1] are combined and applied or the cover code of the existing NPSS and the proposed u=6 are combined and configured.

First, the configuration of the 'aNPSS' is described in detail.

When u and $\theta_f$ are modified in information (e.g., Equations 2 and 3) configuring the sequence of the NSSS to define the aNSSS, the detection of the NSSS of the legacy UE may be influenced. By considering such a point, the aNSSS may be configured by using a method for adding $b_q(m)$ of the NSSS defined in Table 4 described above and a modified resource mapping method. Additionally, the aNSSS may be configured through a method for adding a value of $\theta_f$.

1) $b_q(m)$ for aNSSS

When the aNSSS is configured by changing or adding only $b_q(m)$ without changing the Zadoff-Chu sequence of the NSSS, the legacy NB-IoT UE does not attempt to detect the changed or added $b_q(m)$ and the NB-IoT UE that attempts to detect the aNSSS has an advantage of recycling a result of a complex multiplication used for detecting the NSSS. Accordingly, in $b_q(m)$ used for the aNSSS, columns 16, 48, 80, and 112 which are values other than columns 1, 32, 64, and 128 of a 128-order Hadamard matrix used in $b_q(m)$ of the existing NSSS.

2) Adding $\theta_f$ for aNSSS

As shown in Equation 3, $\theta_f$ may be circulated in 0, 33/132, 66/132, and 99/132 at every 20 msec. On the contrary, in the case of the aNSSS, $\theta_f$ may be circulated in 33/264, 99/264, 165/264, and 231/264 at every 20 msec, circulated in some sets of four values, or fixed to a specific value.

FIG. 8 illustrates cross-correlation values of NSSS or aNSSS according to a cyclic shift value $\theta_f$.

Specifically, FIG. 8 illustrates a cross-correlation value (e.g., Rel.15 NB-IoT w/aNSSS) using the $\theta_f$ value applied to aNSSS and a cross-correlation value (e.g., Rel.15 NB-IoT w/NSSS) using $\theta_f$ of the NSSS when receiving the aNSSS in which a cross-correlation value (e.g., Legacy NB-IoT w/NSSS) $\theta_f$ is selected among 33/264, 99/264, 165/264, and 231/264 in the case of using the NSSS.

Referring to FIG. 8, as can be known from a cross-correlation value distribution, it can be confirmed that the cross-correlation values of the aNSSS using the $\theta_f=\{0,33/132,66/132,99/132\}$ value and another $\theta_f=\{33/264,99/264, 165/264, 231/264\}$ value used in the NSSS do not significantly interfere with each other.

$\theta_f$ of the aNSSS may be selected as a set of values other than $\{0,33/132,66/132,99/132\}$ by observing the cross-correlation values, but more memory may be required in order to generate the sequence in the NB-IoT UE as compared with $\theta_f=\{33/264, 99/264,165/264, 231/264\}$.

3) Resource Mapping for aNSSS

In a frequency selective environment, a sequence cross-correlation characteristic of the NSSS may deteriorate. As a result, a method for randomizing the cross-correlation characteristic between the NSSS and the aNSSS during a resource mapping process may be considered.

FIG. 9 illustrates examples of a resource mapping method for NSSS or aNSSS.

Referring to FIG. 9, FIGS. 9a to 9d illustrate a resource mapping scheme in which the NSSS or the aNSSS is allocated by a frequency first mapping scheme from a $k_s$-th resource element (RE) location of an $l_s$-th OFDM symbol and the NSSS and the aNSSS are sequentially mapped according to solid-line and dotted-line arrows up to a $k_e$-th RE location of an $l_e$-th OFDM symbol.

Specifically, FIG. 9a illustrates a resource mapping scheme for the NSSS and FIG. 9b illustrates a scheme of moving a resource mapping start OFDM symbol location by a specific value in FIG. 9. Further, FIG. 9c illustrates a scheme of performing a resource mapping order of the scheme of FIG. 9a reversely and FIG. 9d illustrates a scheme which has the same start and end locations as the scheme of FIG. 9a, but applies a time first mapping scheme.

FIG. 10 illustrates an NSSS cross-correlation characteristic of a legacy NB-IoT UE according to a resource mapping scheme. Referring to FIG. 10, FIGS. 10a to 10d illustrate the Zadoff-Chu sequence of the NSSS of the legacy NB-IoT UE according to each resource mapping scheme described in FIGS. 9a to 9d.

As can be confirmed in FIG. 10a, when the NSSS Zadoff-Chu sequence cross-correlation characteristics of the legacy NB-IoT UE, u and u' are the same as each other, the NSSS Zadoff-Chu sequence cross-correlation characteristics have a value as large as a sequence length and if not, the NSSS Zadoff-Chu sequence has a relatively low cross-correlation characteristic. On the contrary, it can be confirmed that the scheme of FIG. 10b has a value corresponding to approximately 50% in the existing NSSS Zadoff-Chu sequence and a combination of some u and u'. Further, the scheme of FIG. 10c shows a low cross-correlation value with the existing NSSS Zadoff-Chu sequence in most combinations of u and u', but has a cross-correlation value of approximately 70% or more in a specific u and u' combination. On the contrary, it can be confirmed that the scheme of FIG. 10d has a relatively low cross-correlation value with the existing Zadoff-Chu sequence in all u and u' combinations.

As a result, it may be preferable that as the resource mapping scheme, the time first mapping scheme illustrated in FIG. 10d is considered and start and end RE locations of resource mapping may be circularly shifted by a specific value.

In this case, the method for adding the $\theta_f$ is not particularly applied similarly with the proposed $b_q(m)$ and may be applied in the case of following the resource mapping scheme of a different method other than the proposed resource mapping scheme. Further, column values of the 128-order Hadarmard matrix of the proposed $b_q(m)$ may be simultaneously applied in combination with the resource mapping scheme in FIG. 10d which is proposed. Further, $b_q(m)$ of the existing NSSS and the resource mapping scheme illustrated in FIG. 10d may be combined and applied or the resource mapping scheme of the existing NSSS and the column values of the 128-order Hadamard matrix of the proposed $b_q(m)$ are combined and configured.

In association with the methods, structures and transmission locations of the NPSS and the NSSS may be applied when only the NPSS is additionally transmitted or independently applied even when only the NSSS is additionally transmitted. That is, even when the NPSS and the NSSS having a new sequence other than the NPSS and the NSSS are additionally transmitted, subframe and radio frame locations in which the sequence is additionally transmitted may follow the aforementioned scheme.

Further, when the aNPSS and the aNSSS are detected, the NB-IoT UE may determine that system information (e.g., MIB-NB or SIB1-NB) may also be additionally transmitted. That is, the NB-IoT UE may attempt additional detection of the MIB-NB and SIB1-NB which are additionally transmitted together with the existing detection attempt of the MIB-NB and SIB1-NB according to whether the aNPSS and the aNSSS are detected. In an opposite case, when the NB-IoT UE determines that the cell is a cell in which the system information is additionally provided, the NB-IoT UE may also determine whether to transmit the aNPSS and the aNSSS of the cell.

Further, the base station should not continuously periodically transmit the aNPSS and the aNSSS together with the NPSS and the NSSS and the aNPSS and the aNSSS may be transmitted for a specific time according to a need of the base station. Further, whether the aNPSS and the aNSSS are periodically or aperiodically transmitted may be mutually independently determined and information (e.g., transmission period and interval) related to transmission of the aNPSS and the aNSSS may be configured by the base station for a specific operation such as measurement of the NB-IoT UE. In this case, in the case where the NB-IoT UE may not know whether to transmit the aNPSS and the aNSSS, since the aNPSS and the aNSSS should be blind-detected, the base station may start or stop transmission of the aNPSS and the aNSSS with respect to a case of satisfying a specific condition. However, for a stable operation of the UE, such as performing measurement based on the aNPSS and the aNSSS, start and stop of transmission of the aNPSS and the aNSSS may be notified to some or all UEs in the cell.

Further, the aforementioned contents may be similarly applied even to a system such as enhanced Machine Type Communication (eMTC) utilizing a part of an LTE system bandwidth in addition to an NB-IoT system. In particular, like the aNPSS and/or aNSSS concept, when a new synchronization signal or the existing PSS and/or SSS is modified and transmitted in order to efficiently improve a delay for cell search and acquisition of the system information in the eMTC, this may indicate that the information (e.g., MIB and/or SIB1-BR) related to the system information is also additionally transmitted in the corresponding cell. The same may applied even to the opposite case. That is, even when the UE may not detect a synchronization signal for cell search enhancement during a cell search process, the UE may expect that there will be an enhanced synchronization in the corresponding cell when enhanced system information is additionally transmitted in a subsequent process.

In particular, in a case where the eMTC UE additionally receives the NPSS and/or the NSSS for enhancement of cell search performance, the case may be divided into two cases as described below according to support an NB-IoT service in the corresponding cell.

First, when the eMTC and NB-IoT services are simultaneously supported in the corresponding cell, the eMTC UE may expect the enhancement of the cell search performance by additionally receiving the NPSS and/or NSSS transmitted for the NB-IoT service in the corresponding cell. In this case, in some subframes (e.g., LTE PSS/SSS and NB-IoT NPSS are simultaneously transmitted at a location of subframe #5), a signal for cell search of LTE and a signal for cell search of NB-IoT may be simultaneously transmitted. Accordingly, the eMTC UE may directly select which signal may be selectively received by the eMTC UE or may perform an operation instructed from the base station.

Second, when the eMTC service is supported, but the NB-IoT service is not supported in the corresponding cell, if the base station does not serve the NB-IoT in the corresponding cell, the base station may additionally transmit the NPSS and the NSSS for enhancement of the cell search performance of the eMTC UE. In this case, the base station needs to transmit signals different from the existing NPSS and NSSS in order to prevent misrecognizing that another NB-IoT UE serves the NB-IoT in the corresponding cell by receiving the NPSS and the NSSS.

In this case, the aforementioned aNPSS and aNSSS may be used. In this case, the aNPSS and the aNSSS may be transmitted at a location different from the subframe location and may be transmitted at a non-anchor carrier location other than the anchor carrier location. Further, the aNPSS and the aNSSS may be transmitted by configuring an NB-IoT cell identifier different from an LTE cell identifier and even in such a case, a mapping scheme for the LTE cell identifier and the NB-IoT cell identifier may be defined. However, when the aNPSS and the aNSSS are transmitted not for serving the actual NB-IoT UE, there is a difference in that the aNPSS and the aNSSS may be transmitted without a Narrowband Reference Signal.

Further, the proposed aNPSS and aNSSS may be utilized as an instruction signal such as update of the system information in addition to a purpose such as the cell search performance enhancement of a narrow band system such as the NB-IoT and the eMTC. Here, the update of the system information may mean information (e.g., MIB and SIB) on the cell, which the UE should basically or additionally receive from the cell. When the corresponding information is changed, the base station may generally instruct the UE to update the system information through a paging indication or a paging message.

In general, in the legacy system (e.g., LTE system), whether to update (or change) the system information is indicated through PDCCH, MPDCCH, or NPDCCH scrambled with P-RNTI in a specific interval (paging occasion). This may be not effective in terms of power consumption in a system having characteristics such as low cost and a long battery life, such as the NB-IoT or the eMTC. By such a point, the NPSS and the NSSS designed for synchronization are partially modified and utilized as an indication signal and the aNPSS and/or aNSSS may be used in order to be distinguished from the existing NPSS and NSSS.

In this case, in order to reduce a false alarm of detection of information indicating whether to update the paging indicator or the system information and the cell identifier of the aNPSS and/or aNSSS and radio frame number information are restricted as partial information to be utilized as the paging indicator. In this case, the aNPSS and the aNSSS should not be continuously transmitted to some subframe locations and may be restricted to a specific location in association with the paging occasion and periodically or aperiodically transmitted. Moreover, when the aNPSS and the aNSSS are utilized as the paging indicator, an operation of the UE which detects the utilization as the paging indicator may be defined not to perform an operation related to the update of the system information or the update of the system information during a specific interval.

Further, when the aNPSS and the aNSSS are utilized for such a purpose, the aNPSS and the aNSSS transmitted from the same base station may be the same signal and/or sequence each time. That is, when the aNPSS and the aNSSS are utilized for the purpose of the cell search, the aNPSS and the aNSSS need to transfer the same information (e.g., cell identifier and radio frame number) every transmission, but when the aNPSS and the aNSSS are utilized for the purpose such as the paging indicator, another information may be transferred every aNPSS and/or aNSSS transmission.

Further, the aforementioned aNPSS and aNSSS may be used for distinguishing duplex modes of TDD and FDD. In this case, the aNPSS and the aNSSS may be transmitted at locations different from the aforementioned subframe location. Further, when the aNPSS and the aNSSS are used as the synchronization signal, the route u and/or the cover code of the aNPSS may be used in order to distinguish a UL-DL configuration.

For example, the cover code may be used in order to distinguish the dual modes and the root u may be used in order to distinguish the UL-DL configuration. When a type of root u and/or cover code to distinguish all UL-DL configurations are not sufficient or performance deterioration depending on use of the root u and/or cover code so as to distinguish all UL-DL configurations is expected, the type of root u and/or cover code may be used so as to distinguish only some of the UL-DL configurations. That is, when relative locations of the (a)NPSS and the (a)NSSS may vary depending on the UL-DL configuration, it is sufficient if the (a)NPSS may transfer information to only distinguish the relative location relationship with the (a)NSSS. In this case, the UE may acquire an actual UL-DL configuration through MIB-NB or SIB for TDD after detecting the (a)NPSS and the (a)NSSS.

As described above, Narrowband (NB)-LTE refers to a system for supporting low complexity and low power consumption with a system bandwidth (system BW) corresponding to 1 Physical Resource Block (PRB) of LTE system.

That is, the NB-LTE system may be primarily used as a communication mode for supporting a device (or UE) such as a machine-type communication (MTC) UE and/or an IoT UE in a cellular system. That is, the NB-LTE system may be referred to as the NB-IoT system.

The NB-IoT system does not need to allocate an additional band for the NB-IoT system by using the same OFDM parameters such as the subcarrier spacing used in the existing LTE system, as the LTE system. In this case, 1 PRB of the legacy LTE system band is allocated for the NB-IoT, which is advantageous in using the frequency efficiently.

In this case, the physical channel of the NB-IoT system may be defined as N-Primary Synchronization Signal (N-PSS), N-Secondary Synchronization Signal (N-SSS), N-Physical Channel (N-PBCH), N-PDCCH/N-EPDCCH, N-PDSCH, or the like in the case of downlink. Here, 'N-' may be used for distinguishing from the legacy LTE.

Further, embodiments of the present disclosure described below are described based on the existing LTE system, but may be applied even to the new RAT (NR) system in the same scheme or similarly, of course. For example, a method for generating a sequence and mapping a resource described in this specification is described based on a transmission unit (e.g., subframe) in the LTE system, but may be applied even to a transmission unit (e.g., a short transmission unit, the subframe, a slot, etc.) in the NR system in the same scheme or similarly.

In addition, in the case of the NB-IoT system, since each UE recognizes a single PRB as each carrier, the PRB referred to herein may be interpreted as the same meaning as the carrier.

In addition, DCI format N0, DCI format N1, and DCI format N2 referred to herein may refer to DCI format N0, DCI format N1, and DCI format N2 described above (e.g., defined in the 3GPP specification).

In addition, an anchor-type PRB (or anchor-type carrier) may mean a PRB for transmitting the N-PDSCH for N-PSS, N-SSS, N-PBCH, and/or system information block (N-SIB) for the initial access in terms of the base station. In this case, there may be one anchor-type PRB, or there may be multiple anchor-type PRBs.

In addition, in this specification, when there are one or multiple anchor-type PRBs as described above, the specific anchor-type PRB selected by the UE through the initial access is an anchor PRB or anchor carrier. In addition, in this specification, a PRB allocated from the base station to perform a downlink process (or procedure) after the initial access may be referred to as an additional PRB (or additional carrier).

Method for Distinguishing Radio Frame Structure by using Synchronization Signal of NB-IoT System In the existing LTE system, the UE may be configured to distinguish the radio frame structure due to a difference between the transmission locations of the PSS and the SSS in order for the UE to know the type of radio frame structure provided by the corresponding cell in an initial access step.

Here, the radio frame structure may be divided into a first type to support Frequency Division Duplex (FDD) and a second type to support Time Division Duplex (TDD).

FIG. 11 illustrates a transmission location of a synchronization signal according to a radio frame structure of an LTE system.

Referring to FIG. 11(a), in the case of the FDD in the LTE system, the PSS may be transmitted in symbol #6 of subframe #0 and the SSS may be transmitted in a symbol immediately before the PSS, i.e., symbol #5 of subframe #0.

Unlike this, referring to FIG. 11(b), in the case of the TDD in the LTE system, the PSS may be transmitted in symbol #2 of subframe #1 and the SSS may be transmitted in symbol #13 of subframe #0 which is earlier than the PSS by 3 symbols.

In this specification, '#n' may mean 'n-th'. That is, subframe #0 may mean a 0-th subframe of the radio frame.

When the PSS and the SSS are transmitted as described above, the UE may distinguish whether the corresponding cell provides the TDD or the FDD as the difference in location where the PSS and the SSS are transmitted. As an example, the UE may select one of four candidates (i.e., TDD in the case of the normal CP, FDD in the case of the normal CP, TDD in the case of the extended CP, and FDD in the case of the extended CP) including the normal cyclic prefix (CP) and the extended CP.

Similarly, even when a TDD operation (i.e., an operation using a second type of radio frame structure) of the UE and/or the base station is considered in the NB-IoT of the NR system (or enhanced LTE system), a method for configuring the radio frame structure to be distinguished in the initial access step due to the aforementioned reason may be considered.

Accordingly, this specification proposes a method for configuring the type of radio frame structure to be distinguished in the initial access step by using the NPSS (or the aforementioned aNPSS) and the NSSS (or the aforementioned aNSSS).

However, the embodiments proposed by this specification may be used for distinguish other information in addition to distinguishing the type of radio frame structure. For example, a method(s) described below may be used for distinguishing information such as an operation mode, a CP length, Synchronization Signal Periodicity, etc. Specifically, in distinguishing the operation mode, an in-band mode and/or guard mode may be indicated according to the existing scheme and a standalone mode may be indicated by a new scheme.

Further, by extending the embodiments proposed by this specification, it is possible to configure even the radio frame structure to be distinguished in addition to the TDD or FDD. Here, an additionally considered radio frame structure may be a third type of radio frame structure (frame structure type 3) of the LTE system or a newly introduced radio frame structure.

It is to be understood that the embodiments proposed by this specification described below are just distinguished for easy description and some configurations or features of certain embodiments may be included in other embodiments or may be replaced with corresponding configurations or features of other embodiments.

First Embodiment

First, a method for configuring the TDD or FDD to be distinguished by changing a density of the NSSS or NPSS may be considered. Here, the density of the NSSS or NPSS may be configured by a period in which the NSSS or NPSS is transmitted, i.e., a transmission period.

That is, the corresponding method is a method for distinguishing the radio frame structure by differently configuring the transmission period (i.e., sequence density) of the NSSS or NPSS in the second type of radio frame structure corresponding to the TDD from the transmission period of the NSSS or NPSS in the first type of radio frame structure corresponding to the FDD. Hereinafter, the corresponding method is described only for the case of the NSSS for convenience of description, but this may be extensively applied even to the case of the NPSS, of course.

In the existing NB-IoT system (e.g., NB-IoT system in Rel. 13), the NSSS is configured to be transmitted by occupying one subframe per 20 ms. Specifically, the NSSS is transmitted through 11 symbols among 14 symbols of subframe #9 every 20 ms. Here, three remaining symbols may correspond to a region configured for transmitting a downlink control channel.

In this case, a sequence used for the NSSS is shown in Equation 2 described above and a binary sequence $b_q(m)$ is shown in Table 4 described above. Further, a cyclic shift $\theta_f$ in frame number $n_f$ is shown in Equation 3.

In this case, the cyclic shift value $\theta_f$ may be one value of $\{0, \frac{1}{4}, \frac{1}{2}, \frac{3}{4}\}$ according to the frame number. In this case, four different sequences are used for the NPSSS in order to determine (or check) a boundary of 80 ms by using the NSSS transmitted every 20 ms. In this case, four different sequences may be used every 20 ms within 80 ms.

When the density of the NSSS used for the TDD is configured to a half by comparing with the existing density in order to distinguish the radio frame structure, only two among four cyclic shift values may be configured to be used in order to distinguish the boundary of 80 ms through the NSSS. That is, when the NSSS occupies one subframe (e.g., subframe #9) every 40 ms (e.g., occupies only 11 symbols among 14 symbols), only two among the cyclic shift values $\theta_f \{0, \frac{1}{4}, \frac{1}{2}, \frac{3}{4}\}$ may be used.

For example, the cyclic shift value $\theta_f$ of the NSSS used for the TDD may be configured to one of $\{0, \frac{1}{2}\}$ according to the frame number. In this case, the cyclic shift value $\theta_f$ may be defined as shown in Equation 4 below unlike Equation 3 described above.

$$\theta_f = \frac{66}{132}(n_f/4) \bmod 2 \quad \text{[Equation 4]}$$

As another example, the cyclic shift value $\theta_f$ of the NSSS used for the TDD may be configured to one of $\{\frac{1}{4}, \frac{3}{4}\}$ according to the frame number. In this case, the cyclic shift value $\theta_f$ may be defined as shown in Equation 5 below unlike Equation 3 described above.

$$\theta_f = \frac{33}{132} + \frac{66}{132}(n_f/4) \bmod 2 \quad \text{[Equation 5]}$$

When the corresponding method is used, as the density of the NSSS is reduced to a half, it is advantageous in that a downlink (DL) subframe which is insufficient in the TDD may be secured. However, in terms of an error rate as the cyclic shift value is designated as a subset of values used in the FDD, blind decoding is performed according to the densities of two NSSSs and then, it may be preferable in terms of a burden of the UE by determining the radio frame structure.

By using the aforementioned method, the UE may distinguish whether a cell to which the UE belongs provides the TDD scheme or the FDD scheme according to the period of the received NSSS or NPSS.

Further, in addition to the aforementioned method, a method for distinguishing the FDD/TDD by changing the transmission periods (i.e., densities) of both the NPSS and the NSSS and/or a method for characteristically distinguishing the FDD/TDD even by increasing the transmission period of the NPSS or the NSSS (i.e., decreasing the density) may also be considered.

Second Embodiment

Next, a method for configuring the TDD or FDD to be distinguished by additionally changing even the sequence in addition to changing the density of the NSSS or NPSS described in the first embodiment described above may also be considered. In the case of the corresponding method, it is advantageous in that the error rate aspect may be solved as the cyclic shift value for the TDD is designated as the subset of the values used in the FDD.

That is, the corresponding method is a method for distinguishing the radio frame structure by changing the transmission period and the cyclic shift value of the NSSS or the NPSS in the second type of radio frame structure corresponding to the TDD.

When the density of the NSSS used for the TDD is configured to a half as compared with the existing density in order to distinguish the radio frame structure, two cyclic shift values need to be determined as described in the first embodiment above. That is, when the NSSS occupies one subframe (e.g., subframe #9) every 40 ms (e.g., occupies only 11 symbols among 14 symbols), two cyclic shift values may be used.

In this case, only two among cyclic shift values $\theta_f \{\frac{1}{8}, \frac{3}{8}, \frac{5}{8}, \frac{7}{8}\}$ not used in the FDD may be configured to be used. In this case, six cases which may be considered may be shown in Equation 6 below.

$$\theta_{f1} = \frac{16.5}{132} + \frac{33}{132}(n_f/4) \bmod 2 \Rightarrow \{1/8, 3/8\}$$

$$\theta_{f2} = \frac{16.5}{132} + \frac{66}{132}(n_f/4) \bmod 2 \Rightarrow \{1/8, 5/8\}$$

$$\theta_{f3} = \frac{16.5}{132} + \frac{99}{132}(n_f/4) \bmod 2 \Rightarrow \{1/8, 7/8\}$$

$$\theta_{f4} = \frac{49.5}{132} + \frac{33}{132}(n_f/4) \bmod 2 \Rightarrow \{3/8, 5/8\}$$

$$\theta_{f5} = \frac{49.5}{132} + \frac{66}{132}(n_f/4) \bmod 2 \Rightarrow \{3/8, 7/8\}$$

$$\theta_{f6} = \frac{82.5}{132} + \frac{33}{132}(n_f/4) \bmod 2 \Rightarrow \{5/8, 7/8\}$$

[Equation 6]

Equation 6 shows a case where the cyclic shift value of the NSSS used in the TDD is configured to $\{\frac{1}{8}, \frac{3}{8}\}$, $\{\frac{1}{8}, \frac{5}{8}\}$, $\{\frac{1}{8}, \frac{7}{8}\}$, $\{\frac{3}{8}, \frac{5}{8}\}$, $\{\frac{3}{8}, \frac{7}{8}\}$, or $\{\frac{5}{8}, \frac{7}{8}\}$.

When the corresponding method is used, as the density of the NSSS is reduced to a half, it is advantageous in that a downlink (DL) subframe which is insufficient in the TDD may be secured. Further, it is advantageous in that the UE may distinguish the TDD or the FDD only by the sequence detection without a need to perform the blind decoding according to two NSSS densities. Further, as mentioned above, clear distinguishing between the existing NSSS and the NSSS (i.e., NSSS configurable for the TDD) used for the FDD may be determined through a cross-correlation result. In this case, an additional computation for the NSSS detection of the UE may be required.

The embodiment is described primarily based on the NSSS, but this may be commonly extended and applied even to the case of the NPSS, of course. That is, a method for changing the sequence and the period (i.e., density) of the NPSS in addition to the NSSS may also be considered. As described above, the TDD or the FDD may be distinguished through changing the density of the NPSS in addition to the change of the cover code and/or root index of the NPSS.

Third Embodiment

Next, a method for configuring the TDD or FDD to be distinguished according to the location of the subframe in which the NPSS is transmitted may also be considered. That is, this is a method that configures the NPSS to be aperiodically transmitted in a pre-promised (or configured or defined) specific interval and configure the specific interval to be periodically repeated.

In particular, the NPSS may be configured to be aperiodically transmitted according to a pre-promised pattern within the specific interval. For example, the pre-promised specific interval may be configured to 20 ms and the interval of 20 ms may be periodically repeated. In this case, the NSSS transmitted within the interval of 20 ms may be configured to be transmitted in subframe #9 once every 20 ms (e.g., every even-numbered radio frame) and the NPSS may be configured to be transmitted in subframe #5 in an even-numbered radio frame and in subframe #9 in an odd-numbered radio frame.

FIG. 12 illustrates an example of a method for transmitting a synchronization signal to which a method proposed in this specification may be applied. FIG. 12 is just for convenience of the description and does not limit the scope of the present disclosure.

Referring to FIG. 12, in the case of the FDD (i.e., the first type of radio frame structure), the NPSS may be configured to be transmitted in subframe #5 once every 10 ms (i.e., every radio frame) and the NSSS may be configured to be transmitted in subframe #9 once every 20 ms (i.e., every even-numbered radio frame).

Unlike this, a method may be considered in which in the case of the TDD (i.e., the second type of radio frame structure), the NPSS may be configured to be aperiodically transmitted in a pre-promised specific interval and configured to be periodically repeated in the specific interval. The UE may distinguish the TDD or the FDD through such a method.

For example, as illustrated in FIG. 12, the NSSS may be configured to be transmitted in subframe #9 once every 20 ms (e.g., every even-numbered radio frame) and the NPSS may be configured to be transmitted in subframe #5 in the even-numbered radio frame and transmitted in subframe #9 in the odd-numbered radio frame. In this case, a case where the pre-promised specific interval related to transmission of the NPSS is configured to 20 ms is assumed. In this case, a specific transmission location of the NPSS may be configured differently from that illustrated in FIG. 12.

When the corresponding method is used, since the UE may distinguish the TDD or the FDD through only the location (i.e., a transmission subframe location) of the NPSS, it is advantageous in that it is possible to distinguish the radio frame structure rapidly. However, in this case, the UE may need to configure a detection window for detecting the NPSS to a larger range than the existing range.

Further, in addition to the method, a method for configuring two or more NPSSs transmitted within a pre-promised specific interval to have different sequences may also be considered. As mentioned above, NPSSs in which the covers code or root indexes of the NPSSs are configured to be different each other may be configured to be transmitted in a pre-promised specific interval.

For example, the root index of the NPSS transmitted to subframe #5 of the even-numbered radio frame may be configured to 5 and the root index of the NPSS transmitted to subframe #9 of the odd-numbered radio frame may be configured to a value (e.g., 6) other than 5. In particular, the root index of one NPSS of two NPSSs may be configured to be the same as the root index value of the NPSS used in the FDD and the root index of the other one NPSS may be configured to be different from the root index value of the NPSS used in the FDD.

Fourth Embodiment

In the embodiment, as in the third embodiment, a case is assumed in which in the case of the FDD, the NPSS is configured to be transmitted in subframe #5 once every 10 ms and the NSSS is configured to be transmitted in subframe #9 once every 20 ms (e.g., every even-numbered radio frame).

However, unlike the third embodiment, in the embodiment, a method for configuring the TDD or the FDD to be distinguished by using a transmission subframe interval difference between the NPSS and the NSSS will be described.

Specifically, methods for differently configuring the transmission subframe locations of the NPSS, the NSSS, and/or the NPBCH in the case of the TDD from those of the FDD in order to distinguish the TDD or the FDD may be considered. That is, according to the type of radio frame, the NPSS, the NSSS, and/or the NPBCH may be disposed at different locations (i.e., subframe). Hereinafter, examples therefor will be described in detail through method 1) and method 2).

Method 1)

For example, in the case of the TDD, the NPSS may be configured to be transmitted in subframe #9 and the NSSS may be configured to be transmitted in subframe #5. That is, in order to distinguish the TDD or the FDD, a method for configuring the NPSS to be transmitted in subframe #9 once every 10 ms and the NSSS to be transmitted in subframe #5 once every 20 ms (e.g., every even-numbered radio frame) in the TDD may be considered. A detailed example thereof is illustrated in FIG. 13.

FIG. 13 illustrates another example of the method for transmitting the synchronization signal to which the method proposed in this specification may be applied. FIG. 13 is just for convenience of the description and does not limit the scope of the present disclosure.

Referring to FIG. 13, in order to distinguish the FDD or TDD, the transmission subframe locations of the NPSS and the NSSS in the TDD may be configured differently from those in the case of the FDD. As a result, a distance up to the NSSS transmitted at a closest time after a transmission completion time of the NPSS may be configured differently in the cases of the FDD and the TDD.

Specifically, in the case of the FDD, there may be an interval of three subframe (i.e., 3 ms) from a time when the NPSS transmission is terminated up to a time when the NSSS transmission is started. On the contrary, in the case of the TDD, there may be an interval of five subframes (i.e., 5 ms) from the time when the NPSS transmission is terminated up to the time when the NSSS transmission is started. As a result, the UE may distinguish the TDD or the FDD by using a difference in distance between the NPSS and the NSSS.

When the corresponding method is used, since an NRS may be transmitted in subframe #9 of the odd-numbered radio frame in the case of the FDD, the UE may perform cross-subframe channel estimation between subframe #9 and subframe #0 of a next radio frame at the time of detecting the NPBCH transmitted immediately subsequently. On the contrary, since the NPSS is continuously transmitted and not the NRS is transmitted to subframe #9 in the case of the TDD, the UE may not perform the cross-subframe channel estimation for detecting the NPBCH.

Here, the NRS may mean a reference signal for a narrowband and may be used for estimating the channel in the corresponding subframe. The NRS is configured not to be transmitted in the subframe in which the NPSS or the NSSS is transmitted. Further, the cross-subframe channel estimation may mean performing channel estimation between the subframes.

However, when the NRS is configured to be transmitted to special subframe #1 depending on the UL-DL configuration of the TDD by default, the UE may perform the cross-subframe channel estimation between subframes #0 and #1.

Method 2)

As another example, in the case of the TDD, the NPBCH may be configured to be transmitted in subframe #9 and the NSSS may be configured to be transmitted in subframe #0. In this case, unlike method 1) described above, the cross-subframe channel estimation for detecting the NPBCH may be performed in the case of the TDD.

That is, in order to distinguish the TDD or the FDD, a method for configuring the NPBCH to be transmitted in subframe #9 once every 10 ms and the NSSS to be transmitted in subframe #0 once every 20 ms (e.g., every even-numbered radio frame) in the TDD may be considered. A detailed example thereof is illustrated in FIG. 14.

FIG. 14 illustrates yet another example of the method for transmitting the synchronization signal to which the method proposed in this specification may be applied. FIG. 14 is just for convenience of the description and does not limit the scope of the present disclosure.

Referring to FIG. 14, in order to distinguish the FDD or TDD, the transmission subframe locations of the NPBCH and the NSSS in the TDD may be configured differently from those in the case of the FDD. As a result, a distance up to the NSSS transmitted at a closest time after a transmission completion time of the NPSS may be configured differently in the cases of the FDD and the TDD.

Specifically, in the case of the FDD, there may be the interval of three subframes (i.e., 3 ms) from the time when the NPSS transmission is terminated up to the time when the NSSS transmission is started. On the contrary, in the case of the TDD, there may be an interval of four subframes (i.e., 4 ms) from the time when the NPSS transmission is terminated up to the time when the NSSS transmission is started. As a result, the UE may distinguish the TDD or the FDD by using the difference in distance between the NPSS and the NSSS.

When the corresponding method is used, the NRS may be configured to be transmitted to subframe #0 of the odd-numbered radio frame in the case of the TDD. The reason is that subframe #0 is not always occupied by the NPSS or the NSSS in the corresponding method. Accordingly, the UE has an advantage of performing the cross-subframe channel estimation for detecting the NPBCH transmitted in subframe #9 by using the NRS transmitted in subframe #0.

Fifth Embodiment

Further, a method for configuring the TDD or the FDD to be distinguished by adding a subframe level cover code to the NPSS or the NSSS may also be considered.

FIG. 15 illustrates still yet another example of the method for transmitting the synchronization signal to which the method proposed in this specification may be applied. FIG. 15 is just for convenience of the description and does not limit the scope of the present disclosure.

Referring to FIG. 15, the subframe level cover code may be applied to the synchronization signal in the NB-IoT system. FIG. 15(a) illustrates an NPSS to which the cover code according to the FDD or TDD is applied and FIG. 15(b) illustrates an NSSS to which the cover code according to the FDD or TDD is applied. Here, it is assumed that the transmission period of the NPSS is 10 ms and the transmission period of the NSSS is 20 ms.

In this case, in the case of the FDD, [1, 1, 1, . . . ] may be configured to be used as the subframe level cover code and in the case of the TDD, a subframe level cover code which is different from [1, 1, 1, . . . ] and has excellent detection performance may be configured to be used. For example, as in FIG. 15, in the case of the TDD, [1, −1, 1, −1, . . . ] may be configured to be used as the subframe level cover code with respect to the NPSS and/or the NSSS.

The corresponding method as a simple method which is not high complex for the base station and the UE has an advantage in that the UE detects only the cover code to determine the TDD or the FDD. In this case, the UE may have to detect multiple subframes in order to determine the TDD or the FDD.

Sixth Embodiment

Further, the first to fifth embodiments described above may be used in order to distinguish the TDD or the FDD by two or two or more combinations.

As an example, a method for distinguishing the TDD or the FDD by combining methods 2) of the second embodiment and the fourth embodiment may be considered. Specifically, when the density (i.e., transmission period) used for the TDD is reduced to a half as compared with the existing density, the cyclic shift value $\theta_f$ may be determined by applying the method of second embodiment. That is, when the NSSS occupies one subframe (e.g., subframe #9) every 40 ms (e.g., occupies only 11 symbols among 14 symbols), two cyclic shift values need to be determined. In this case, additionally, other example, like the method of the fourth embodiment, the NPBCH may be configured to be transmitted in subframe #9 and the NSSS may be configured to be transmitted in subframe #0. A detailed example thereof is illustrated in FIG. 16.

FIG. 16 illustrates still yet another example of the method for transmitting the synchronization signal to which the method proposed in this specification may be applied. FIG. 16 is just for convenience of the description and does not limit the scope of the present disclosure. Referring to FIG.

16, a case where the method of the second embodiment and method 2) of the fourth embodiment are combined and applied is assumed.

As illustrated in FIG. 16, in the case of the TDD (i.e., the second type of radio frame structure), the NSSS may be configured to be transmitted once every four radio frames and the interval from the time when the transmission of the NPSS is terminated up to the time when the transmission of the NSSS is started may be configured differently according to the FDD or the TDD. That is, in distinguishing the type of radio frame structure, a sequence difference of the NSSS may also be considered in addition to the difference in distance between the transmission subframe of the NPSS and the transmission subframe of the NSSS.

As described above, when a method configured by the combination of the embodiments is used, it is advantageous in that the UE may obtain an error correction effect.

Further, a method for distinguishing the TDD or the FDD by changing the transmission periods (i.e., densities) of both the NPSS and the NSSS, characteristically increasing the period (i.e., decreasing the density), and changing even respective sequences may also be considered.

For example, it is assumed that in the case of the FDD, the NPSS is configured to occupy one subframe (e.g., occupies only 11 symbols among 14 symbols of subframe #5) every 10 ms and the NSSS is configured to occupy one subframe (e.g., occupies only 11 symbols among 14 symbols of subframe #9) every 20 ms. In this case, in the case of the FDD, the NPSS may be configured to occupy one subframe (e.g., occupies only 11 symbols among 14 symbols of subframe #5) every 20 ms and the NSSS may be configured to occupy one subframe (e.g., occupies only 11 symbols among 14 symbols of subframe #9) every 40 ms. Therefore, additionally, the root index and/or cover code of the NPSS may be configured to be changed and the cyclic shift value of the NSSS may be configured to be changed according to the aforementioned method.

When the type of radio frame structure is distinguished by combining multiple methods as described above, there is an advantage in that the error correction effect of the UE may be obtained.

As another example, it is assumed that in the case of the FDD, the NPSS is configured to occupy one subframe (e.g., occupies only 11 symbols among 14 symbols of subframe #5) every 10 ms and the NSSS is configured to occupy one subframe (e.g., occupies only 11 symbols among 14 symbols of subframe #9) every 20 ms. In this case, in the case of the TDD, the NPSS may be configured to occupy one subframe (e.g., occupies only 11 symbols among 14 symbols of subframe #5) every 20 ms and the NSSS may be configured to occupy one subframe (e.g., occupies only 11 symbols among 14 symbols of subframe #5) every 40 ms. Therefore, additionally, the root index and/or cover code of the NPSS may be configured to be changed and the cyclic shift value of the NSSS may be configured to be changed according to the aforementioned method.

In the case of the corresponding example, the locations of the subframes occupied by the NPSS and the NSSS in the TDD are the same as each other. A detailed example thereof is illustrated in FIG. 17.

FIG. 17 illustrates still yet another example of the method for transmitting the synchronization signal to which the method proposed in this specification may be applied. FIG. 17 is just for convenience of the description and does not limit the scope of the present disclosure.

Referring to FIG. 17, a scheme of transmitting the NPSS and the NSSS in the case of the FDD and a scheme of transmitting the NPSS and the NSSS in the case of the TDD are configured differently from each other.

In this case, in the case of the TDD, both the NPSS and the NSSS may be transmitted in subframe #5. However, as the transmission periods of the NPSS and the NSSS are configured to be different from each other (the transmission period of the NPSS is 2 ms and the transmission period of the NSSS is 4 ms), the NPSS and the NSSS may be transmitted not to overlap with each other.

In this case, since the locations of the subframes occupied by the NPSS and the NSSS are the same as each other, i.e., since the NPSS and the NSSS may be transmitted by using only one subframe, it is advantageous in that the downlink subframe may be secured in terms of the TDD. When it is considered that the number of downlink subframes is limited in the case of the TDD, this is related to more efficiently performing downlink transmission.

Further, since the NRS may be transmitted in every subframe #9 of the radio frame structure for the TDD, it is advantageous in that the UE may perform the cross-subframe channel estimation for detecting the NPBCH transmitted in subframe #0. Further, as mentioned above, the error correction effect of the UE may also be obtained.

FIG. 18 is a flowchart of an operation of a UE which performs a cell search procedure by using a synchronization signal in a wireless communication system to which a method proposed in this specification may be applied. FIG. 18 is just for convenience of the description and does not limit the scope of the present disclosure.

Referring to FIG. 18, a narrowband synchronization signal may mean a synchronization signal (e.g., the NPSS, NSSS, etc.) configured for the NB-IoT system and in particular, the base station and/or the UE may transmit/receive the NPSS, the NSSS, and/or the NPBCH according to the embodiments (in particular, method 2 of the fourth embodiment).

First, the UE may receive a narrowband synchronization signal (e.g., NPSS or NSSS) from the base station (step S1805). In this case, the narrowband synchronization signal may be transmitted according to the aforementioned method.

For example, the UE may receive the NPSS and the NSSS and the corresponding NPSS and NSSS may be transmitted in different subframes. In particular, the subframe in which the NSSS is transmitted may be configured differently from each other according to the type of radio frame structure.

Specifically, in the case of the radio frame structure (e.g., the first type of radio frame structure) for the FDD, the NSSS may be transmitted in subframe #9 of the radio frame and in the case of the radio frame structure (e.g., the second type of radio frame structure) for the TDD, the NSSS may be transmitted in subframe #0 of the radio frame. Further, the NPSS may be transmitted in subframe #5 of the radio frame.

In this case, the transmission period (e.g., 20 ms) of the NSSS is configured two times longer than the transmission period (e.g., 10 ms) of the NPSS and the NSSS may be transmitted in even-numbered radio frames among multiple radio frames supported by a wireless communication system. Further, as described above, each of the NPSS and the NSSS may be transmitted through 11 OFDM symbols in the subframe.

Additionally, the UE may receive a narrowband broadcast channel (e.g., NPBCH) and a subframe in which a narrowband broadcast channel is transmitted may also be configured differently according to the type of radio frame structure. For example, in the case of the radio frame structure for the FDD, the narrowband broadcast channel may be transmitted in subframe #0 of the radio frame and in the case of the radio frame structure for the TDD, the narrowband broadcast channel may be transmitted in subframe #9 of the radio frame (e.g., FIG. 14).

In this case, the UE may determine the radio frame structure provided by the base station by using a gap between the subframe in which the NPSS is transmitted and the subframe in which the NSSS is transmitted like the aforementioned method.

Next, the UE may perform a cell search procedure for the base station based on the received narrowband synchronization signal. Here, the cell search procedure may mean a procedure of acquiring time and frequency synchronization by using the synchronization signal and acquiring a cell ID of the corresponding base station.

Through the aforementioned processes, the UE may rapidly determine or confirm the radio frame structure to be provided thereto by using the synchronization signal (e.g., NPSS, NSSS, and/or NPBCH) while performing the initial access procedure.

New NPSS Cover Code for Distinguishing Radio Frame Structure of NB-IoT System

Referring to Table 3 described above, a length 11 cover code of the NPSS used in the radio frame structure (hereinafter, the first type of radio frame structure) for the FDD may be [1, 1, 1, 1, −1, −1, 1, 1, 1, −1, 1].

In addition to multiple methods for distinguishing the type of radio frame structure by using the NPSS described above, a method for distinguishing the type of radio frame structure by configuring the cover code value of the NPSS used in the radio frame structure (hereinafter, the second type of radio frame structure) for the TDD differently from that in the case of the FDD may also be considered. In this case, the cover code which may be considered in the radio frame structure for the TDD may be configured to have three characteristics described below.

1) An NPSS sequence transmitted by the base station supporting the first type of radio frame structure should not be normally detected by the UE which desires to access the base station supporting the second type of radio frame structure.

2) An NPSS sequence transmitted by the base station supporting the second type of radio frame structure should not be normally detected by the UE which desires to access the base station supporting the first type of radio frame structure.

3) An NPSS sequence transmitted by the base station supporting the second type of radio frame structure should be normally detected by the UE which desires to access the base station supporting the second type of radio frame structure. In this case, normally detecting the NPSS sequence may mean that the NPSS sequence transmitted by the base station supporting the first type of radio frame structure is a sequence similar to a level which may be detected by the UE desiring to access the base station supporting the first type of radio frame structure.

The cover code having such a characteristic may be determined through two tests described below.

First, as a first test, a method may be considered which the NPSS cover code value of the base station is configured to [1, 1, 1, 1, −1, −1, 1, 1, 1, −1, 1] used in the first type of radio frame structure and the UE compares correlation power values calculated for 2047 cover codes in a receiving step to find a cover code in which a peak power value is configured to be a small value.

Here, the 2047 cover codes mean $2^{11}-1$ cover codes other than the cover code used in the first type of radio frame structure in all cover codes having a length of 11. Further the correlation power values may be calculated through several OFDM symbol level differential algorithms.

Through the corresponding test, the cover codes may be listed in an order in which the peak power values are smaller and 15 top cover codes among the cover codes may be shown in Table 6. That is, Table 6 shows indexes of top 15 cover codes having a small peak power value as a result of the first test.

TABLE 6

| Order | Cover code index |
|---|---|
| 1 | 2007 |
| 2 | 2005 |
| 3 | 1792 |
| 4 | 2047 |
| 5 | 2026 |
| 6 | 1962 |
| 7 | 1960 |
| 8 | 1967 |
| 9 | 1744 |
| 10 | 1749 |
| 11 | 1984 |
| 12 | 1706 |
| 13 | 1687 |
| 14 | <u>1699</u> |
| 15 | 1696 |

In Table 6, the cover code index may mean a value which may be acquired when regarding the cover code as a binary number (in this case, −1 is regarded as 0). For example, [−1, −1, −1, −1, −1, −1, −1, −1, −1, −1, −1] may be expressed as cover code index 0 and [1, 1, 1, 1, 1, 1, 1, 1, 1, 1, 1] may be expressed as cover code index 2047. According to such a scheme, cover code index 1699 underlined in Table 6 may mean [1, 1, −1, 1, −1, 1, −1, −1, −1, 1, 1].

Next, as the second test, the NPSS cover code value of the base station may be configured to select one of 2048 cover codes and the UE may compare the correlation power values calculated by using the cover code selected above in the receiving step.

In this case, there may be cover codes in which a peak power value (hereinafter, referred to as an A value) compared with the second peak power of the correlation power acquired by using the selected cover code is equal to or larger than a peak power value (hereinafter, referred to as a B value compared with a second peak power of the correlation power acquired by using the cover code (e.g., [1, 1, 1, 1, −1, −1, 1, 1, 1, −1, 1]) used in the first type of radio frame structure.

Here, the peak power value compared with the second peak power may mean a main peak value compared with a side peak for the correlation power values. For example, when the peak power (i.e., main peak) is 1 and the second peak power (i.e., side peak) is 0.5, the peak power value compared with the second peak power is 2. A case where the peak power value is larger than the second peak power may mean that correlation performance of the corresponding sequence is high.

That is, cover codes may be determined which satisfy a condition in which the A value is equal to or larger than the B and the cover code in which the peak power value among the cover codes is large may be configured as the cover code for the NPSS of the second type of radio frame structure.

Through the corresponding test, the cover codes which satisfy the condition in which the A value is equal or larger than the B may be listed in an order in which the peak power values are larger and 15 top cover codes among the cover codes may be shown in Table 7. That is, Table 7 shows indexes of top 15 cover codes having a large peak power value as a result of the second test.

TABLE 7

| Order | Cover code index |
|---|---|
| 1 | 562 |
| 2 | 178 |
| 3 | 309 |
| 4 | 634 |
| 5 | 109 |
| 6 | 663 |
| 7 | 711 |
| 8 | 1378 |
| 9 | 1850 |
| 10 | 782 |
| 11 | 1738 |
| 12 | 610 |
| 13 | 862 |
| 14 | 1699 |
| 15 | 299 |

Referring to Table 7, cover code index 1699 (i.e., [1, 1, −1, 1, −1, 1, −1, −1, −1, 1, 1]) included in 15 top cover codes in the first test is included in 15 top cover codes even in the second test.

When the results of two tests described above are considered, the cover code suitable for the second type of radio frame structure may be cover code index 1699 (i.e., [1, 1, −1, 1, −1, 1, −1, −1, −1, 1, 1]).

Additionally, results acquired by calculating the correlation power values for the first and second tests by using topmost cover codes (i.e., cover code indexes 2007 and 562) in the result of each test, cover code index 1699 determined to be suitable for the second type of radio frame structure, and the cover code (i.e., cover code index 1949) may be illustrated in FIGS. 19 and 20, respectively.

FIG. 19 illustrates an example of a correlation power graph for cover code values of NPSS to which a method proposed in this specification may be applied. FIG. 19 is just for convenience of the description and does not limit the scope of the present disclosure.

Referring to FIG. 19, the correlation power values may be calculated through several OFDM symbol level differential algorithms based on the scheme of the first test by using the cover codes corresponding to cover code indexes 2007, 562, and 1699 related to the second type of radio frame structure and the cover code used in the first type of radio frame structure.

When the graphs of FIG. 19 are analyzed, cover code indexes 1699 and 2007 have a value close to zero, while cover code index 562 has a peak value close to 0.1 in an inaccurate time sample index.

Accordingly, in the case of the first test, it may be determined that cover code index 562 has lower performance than cover code indexes 1699 and 2007. That is, through the graphs of FIG. 19, it may be derived that cover code index 562 is not included in 15 top cover codes of the first test result.

FIG. 20 illustrates another example of the correlation power graph for the cover code values of NPSS to which the method proposed in this specification may be applied. FIG. 20 is just for convenience of the description and does not limit the scope of the present disclosure.

Referring to FIG. 20, the correlation power values may be calculated through several OFDM symbol level differential algorithms based on the scheme of the second test by using the cover codes corresponding to cover code indexes 2007, 562, and 1699 related to the second type of radio frame structure and the cover code used in the first type of radio frame structure.

Referring to the graphs of FIG. 20, cover code indexes 562 and 1699 may have a sharp main peak, while cover code index 2007 may additionally have side peaks at both sides in addition to the main peak.

Accordingly, in the case of the second test, it may be determined that cover code index 2007 has lower performance than cover code indexes 526 and 1699. That is, through the graphs of FIG. 20, it may be derived that cover code index 2007 is not included in 15 top cover codes of the second test result.

In this case, the main peak may mean a largest output (i.e., correlation power) value acquired through several OFDM symbol level differential algorithms and the side peak may mean a largest output value in which a specific range deviates from the main peak. Here, the specific range may mean an interval (i.e., a sample within a specific range from a peak value) used for additional computation in performing a next operation at a receiving side after detecting the peak value. As an example, the specific interval may be configured to ±16 Ts' and here, Ts' may mean a 240 kHz sampling frequency time unit.

Accordingly, according to the results, as the cover code to be applied to the NPSSS in the second type of radio frame structure, [1, 1, −1, 1, −1, 1, −1, −1, −1, 1, 1] (i.e., cover code index 1699) may be configured. Compared with Table 3 showing the cover code to be used for the NSSS in the case of the FDD, cover code S(I) to be used for the NPSS in the case of the TDD may be expressed as shown in Table 8.

TABLE 8

| Cyclic prefix length | S(3), . . . , S(13) | | | | | | | | | |
|---|---|---|---|---|---|---|---|---|---|---|
| Normal | 1 | 1 | −1 | 1 | −1 | 1 | −1 | −1 | −1 | 1 | 1 |

Further, [1, 1, −1, 1, −1, 1, −1, −1, −1, 1, 1] selected as described above may be configured to be used for the NPSS of another radio frame structure type (e.g., a third type of radio frame structure of the LTE system or a radio frame structure newly introduced in the NR system) in addition to being used for the NPSS of the second type of radio frame structure. Further, the corresponding cover code may be extensively applied even to another signal (e.g., a wake-up signal, a go-to-sleep signal, etc.) other than the NPSS, of course.

In this case, since there is a case where only the first type of radio frame structure is supported among the existing (i.e., legacy) NIB-IoT UEs, when it is considered that an influence exerted on the existing UE should be small at the time of considering that an additional signal is reflected to the standard, it may be preferable to select the cover code according to the methods described above.

Further, when the above selected cover code (i.e., the cover code of Equation 8) is used in the second type of radio frame structure, the existing value (e.g., 5) may be applied or a new value (e.g., 6) different therefrom may be applied as the root index value of the sequence (e.g., ZC sequence) of the NPSS.

Further, in addition to the method for configuring the root index and the cover code, the gap (i.e., a subframe gap) between the NPSS and the NSSS may be configured to be generated according to the type of radio frame structure. For example, a gap between the time when the transmission of the NPSS is terminated and the time when the transmission of the NSSS is started may be configured to four subframes in the case of the first type of radio frame structure, while the gap may be configured to five subframes in the case of the second type of radio frame structure. That is, the method for changing the transmission subframe locations of the NPSS and the NSSS in order to differently configure the gap between the NPSS and the NSSS may also be applied to the NPSS and the NSSS configurations of the second type of radio frame structure.

New NPSS Design of NB-IoT System

As mentioned above, the NPSS of the existing NBI-IoT system (e.g., Rel. 13 NB-IoT system) is designed to occupy 11 OFDM symbols and 11 subcarriers.

FIG. 21 illustrates a resource region occupied by NPSS of an existing NB-IoT system.

As illustrated in FIG. 21, the NPSS is configured to occupy 11 OFDM symbols from OFDM symbol #3 to OFDM symbol #13 in the time domain and occupy 11 subcarriers from subcarrier #0 to subcarrier #10 in the frequency domain.

In this case, in a band (e.g., 900 MHz) in which a centerfrequency is small, the NPSS designed as illustrated in FIG. 21 may have an error which is as large as a maximum of ±25.5 kHz even though a frequency offset and an additional raster offset due to an oscillator error are considered. A detailed example thereof is illustrated in FIG. 22.

FIG. 22 illustrates one example of a frequency offset for the NPSS of the existing NB-IoT system.

Referring to FIG. 22, it is assumed that the bandwidth of the center frequency is configured to be small (e.g., 900 MHz) and the NPSS occupies 11 subcarriers (i.e., 165 kHz). In this case, in the case of the NB-IoT UE, the frequency offset may be 20 ppm and the additional raster offset may be ±7.5 kHz.

In this case, since only the error which is as large as a maximum of ±25.5 kHz occurs even though the frequency offset and the additional raster offset are considered, the resource region occupied by the NPSS does not deviate from an analog filter band (e.g., 240 kHz). The reason is that there is a margin which is as large as 30 kHz at each of upper and lower portions between an analog filter of 240 kHz band and the NPSS occupying 180 kHz.

Unlike this, in a band (e.g., 2.6 GHz) in which the center frequency is high, the NPSS designed as illustrated in FIG. 21 may have an error which is as large as a maximum of ±59.5 kHz when the frequency offset and the additional raster offset due to the oscillator error are considered. A detailed example thereof is illustrated in FIG. 23.

FIG. 23 illustrates another example of the frequency offset for the NPSS of the existing NB-IoT system.

Referring to FIG. 23, it is assumed that the bandwidth of the center frequency is configured to be large (e.g., 2.6 GHz) and the NPSS occupies 11 subcarriers (i.e., 165 kHz). In this case, in the case of the NB-IoT UE, the frequency offset may be 20 ppm and the additional raster offset may be ±7.5 kHz.

In this case, since only the error which is as large as a maximum of ±59.5 kHz occurs when the frequency offset and the additional raster offset are considered, there is a case where the resource region occupied by the NPSS deviates from an analog filter band (e.g., 240 kHz). The reason is that the error value of 59.5 kHz is larger than a margin (e.g., 30 kHz) which exists between the band of the analog filter and the occupation band of the NPSS.

Accordingly, in order to prevent the NPSS resource region from deviating from the analog filter band as described above, this specification proposes a method for configuring the number of subcarriers occupied by the NPSS to be changed to $11-(K_1+K_2)$ from the existing 11 subcarriers and used according to the center frequency value in which the NB-IoT system is operated.

Here, $K_1$ and $K_2$ may mean integers which satisfy $0 \leq L_1 + K_2 < 11$, $0 \leq K_1 < 11$, and $0 \leq K_2 < 11$. In particular, $K_1$ represents the number of subcarriers which may be excluded from a low frequency side and $K_2$ represents the number of subcarrier which may be excluded from a high frequency side.

In this case, since it is assumed that the base station basically knows information on the center frequency, the base station may be configured to select the pre-promised (or configured or defined) $K_1$ and $K_2$ values and transmit the NPSS according to the center frequency value. Further, since it is assumed that the UE currently knows information on a band in which a cell which the UE desires to access is disposed, the UE may be configured to select the pre-promised $K_1$ and $K_2$ values and detect the NPSS according to the center frequency value which may exist in the corresponding band.

Table 9 shows examples of a maximum frequency offset according to the center frequency value, the pre-promised $K_1$ and $K_2$ values, and the number of subcarriers occupied by the NPSS according thereto.

TABLE 9

| Center frequency (MHz) | Maximum frequency offset (kHz) | $K_1$ | $K_2$ | # of subcarrier for NPSS |
|---|---|---|---|---|
| 900 | 25.5 | 0 | 0 | 11 |
| 1500 | 37.5 | 1 | 0 or 1 | 10 or 9 |
| 2000 | 47.5 | 2 | 1 or 2 | 8 or 7 |
| 2600 | 59.5 | 2 | 1 or 2 | 8 or 7 |
| 3500 | 77.5 | 4 | 3 or 4 | 4 or 3 |

When the number of subcarriers which may be occupied by the NPSS is determined as $11-(K_1+K_2)$ as described above, the NPSS sequence may be mapped through the following methods.

First, it is assumed that the existing length 11 Zadoff-Chu sequence (length 11 ZC sequence) configured for the NPSS is similarly used. In this case, a method for mapping the remaining sequences to $11-(K_1+K_2)$ REs by excluding $K_1$ REs from the low frequency in the 11 Zadoff-Chu sequence and excluding $K_2$ REs from the high frequency side may be considered. Here, mapping the remaining sequences may mean mapping 0 to the excluded REs and mapping the existing sequence value to the REs which are not excluded. An example therefor may be illustrated in FIG. 24.

FIG. 24 illustrates one example of an NPSS sequence mapping method to which a method proposed in this specification may be applied. FIG. 24 is just for convenience of the description and does not limit the scope of the present disclosure.

Referring to FIG. 24, it is assumed that $K_1$ applied at the low frequency side is configured to 2 and $K_2$ applied at the high frequency side is configured to 2. In this case, the length of the NPSS sequence may be changed to 7 (i.e., 11−4) and a length 7 sequence may be mapped to 7 subcarriers from subcarrier #2 to subcarrier #8. In this case, '0' other than the existing sequence value may be mapped to the RE to which the sequence is not mapped.

Additionally, with respect to the existing length 11 Zadoff-Chu sequence, the remaining sequences may be configured to be mapped by excluding $K_1+K_2$ REs from any one of the low frequency or the high frequency. For example, the remaining sequences may be mapped from subframe #0 to subframe #6 or mapped from subframe #4 to subframe #10.

A feature of the corresponding method is that the sequence is generated by using root index 5 at the time of initially generating the Zadoff-Chu sequence, but a sequence which is actually mapped to the resource corresponds to a sequence which is as large as length $11-(K_1+K_2)$ among the sequences.

Next, a method for generating a length $11--(K_1+K_2)$ Zadoff-Chu sequence for the NPSS instead of the existing length 11 Zadoff-Chu sequence and mapping the generated Zadoff-Chu sequence to the RE corresponding to the subcarrier which may be occupied by the NPSS may be considered. Due to characteristics of the Zadoff-Chu sequence constituting the NPSS, a sequence having an odd-number length may have excellent performance and the root index may be preferably selected as a medium number of the sequence length.

For example, when the center frequency is 2.6 GHz, the maximum frequency offset is ±59.5 kHz, $K_1$ may be configured to 2 and $K_2$ may be configured to 1 or 2. An example therefor may be illustrated in FIG. 25.

FIG. 25 illustrates another example of the NPSS sequence mapping method to which the method proposed in this specification may be applied. FIG. 25 is just for convenience of the description and does not limit the scope of the present disclosure.

Referring to FIG. 25, it is assumed that $K_1$ applied at the low frequency side is configured to 2 and $K_2$ applied at the high frequency side is configured to 2. In this case, a length 7 Zadoff-Chu sequence generated for the NPSS may be used and the corresponding sequence may be mapped to 7 subcarriers from subcarrier #2 to subcarrier #8.

Considering a performance aspect, performance of a sequence which is a Zadoff-Chu sequence having a shorter length, but uses the entire sequence may be more excellent than the performance of a sequence which generates the length 11 Zadoff-Chu sequence and uses a sequence from which both or one side is excluded.

FIG. 26 illustrates one example of NPSS to which a method proposed in this specification may be applied. FIG. 26 is just for convenience of the description and does not limit the scope of the present disclosure.

Referring to FIG. 26, it may be confirmed that when $K_1$ and $K_2$ are selected as 2, the NPSS does not deviate from the analog filter band (i.e., 240 kHz). That is, when $K_1$ and $K_2$ are selected as 2, the subcarrier to which the NPSS is mapped may exist in the 240 kHz band in spite of considering the maximum error (e.g., ±59.5 kHz).

Further, power boosting may be made at the time of transmitting the NPSS as large as the number of REs reduced through the methods (i.e., $K_1+K_2$). A power boosting effect corresponding to the reduced REs may be expected, which may be applied to the NPSS.

Further, a method for changing the subcarrier spacing for the NPSS instead of changing the number of subcarriers occupied by the NPSS according to the center frequency like the method described above may be considered. That is, instead of using the 15 kHz subcarrier spacing like the existing NPSS, the NPSS may be configured to be transmitted by reducing the subcarrier spacing at a timing (e.g., within 1 ms or within one subframe) for transmitting the NPSS when the center frequency is high (e.g., 2.6 GHz). Here, reducing the subcarrier spacing may mean increasing a symbol length. An example thereof is illustrated in FIG. 27.

FIG. 27 illustrates yet another example of the NPSS sequence mapping method to which the method proposed in this specification may be applied. FIG. 27 is just for convenience of the description and does not limit the scope of the present disclosure.

Referring to FIG. 27, it is assumed that the NPSS is transmitted by using 7.5 kHz acquired by reducing the subcarrier spacing to a half from 15 kHz (i.e., the subframe interval in the existing LTE). As the subcarrier spacing is reduced to a half, the symbol length increases twice. In this case, first two symbols may be configured to be emptied in order to guarantee the control region of the existing LTE system.

Further, in the existing NPSS design, the length 11 Zadoff-Chu sequence and the root index value may be maintained as they are, but the cover code used over 11 symbols needs to be changed to be used over 5 symbols. In this case, a change method may be configured to cut and use up to 5 existing cover codes (cover codes configured according to length 11) from the first or newly introduce and use a cover code corresponding to length 5.

FIG. 28 illustrates another example of the frequency offset for the NPSS to which the method proposed in this specification may be applied. FIG. 28 is just for convenience of the description and does not limit the scope of the present disclosure.

Referring to FIG. 28, it may be confirmed that when the subcarrier spacing is reduced to a half (i.e., the subcarrier spacing of 7.5 kHz), the NPSS does not deviate from the analog filter band (i.e., 240 kHz) in the band in which the center frequency is 2.6 GHz.

The methods described above in this specification are described based on the LTE system, but this may be commonly applied even in the NR system, of course. For example, the methods may be used for a system using a limited bandwidth in the NR system.

Overview of Devices to which Present Disclosure is Applicable

FIG. 29 illustrates a block diagram of a wireless communication device to which methods proposed by this specification may be applied.

Referring to FIG. 29, a wireless communication system includes a base station 2910 and multiple UEs 2910 positioned within an area of the base station 2920.

The base station 2910 includes a processor 2911, a memory 2912, and a radio frequency (RF) unit 2913. The processor 2911 implements a function, a process, and/or a method which are proposed in FIGS. 1 to 28 above. The layers of the wireless interface protocol may be implemented by the processor 2911. The memory 2912 is connected with the processor 2911 to store various pieces of information for driving the processor 2911. The RF unit 2913 is connected with the processor 2911 to transmit and/or receive a radio signal.

The UE 2920 includes a processor 2921, a memory 2922, and an RF unit 2923.

The processor 2921 implements a function, a process, and/or a method which are proposed in FIGS. 1 to 28 above. The layers of the wireless interface protocol may be implemented by the processor 2921. The memory 2922 is connected with the processor 2921 to store various pieces of information for driving the processor 2921. The RF unit 2923 is connected with the processor 2921 to transmit and/or receive a radio signal.

The memories 2912 and 2922 may be positioned inside or outside the processors 2911 and 2921 and connected with the processors 2911 and 2921 by various well-known means.

Further, the base station 2910 and/or the UE 2920 may have a single antenna or multiple antennas.

FIG. 30 illustrates a block diagram of a communication device according to an embodiment of the present disclosure.

In particular, FIG. 30 is a diagram more specifically illustrating the UE of FIG. 29 above.

Referring to FIG. 30, the UE may be configured to include a processor (or a digital signal processor (DSP) 3010, an RF module (or RF unit) 3035, a power management module 3005, an antenna 3040, a battery 3055, a display 3015, a keypad 3020, a memory 3030, a subscriber identification module (SIM) card 3025 (This component is optional), a speaker 3045, and a microphone 3050. The UE may also include a single antenna or multiple antennas.

The processor 3010 implements a function, a process, and/or a method which are proposed in FIGS. 1 to 28 above. Layers of a wireless interface protocol may be implemented by the processor 3010.

The memory 3030 is connected with the processor 3010 to store information related to an operation of the processor 3010. The memory 3030 may be positioned inside or outside the processor 3010 and connected with the processor 3010 by various well-known means.

A user inputs command information such as a telephone number or the like by, for example, pressing (or touching) a button on the keypad 3020 or by voice activation using the microphone 3050. The processor 3010 receives such command information and processes to perform appropriate functions including dialing a telephone number. Operational data may be extracted from the SIM card 3025 or the memory 3030. In addition, the processor 3010 may display command information or drive information on the display 3015 for the user to recognize and for convenience.

The RF module 3035 is connected with the processor 3010 to transmit and/or receive an RF signal. The processor 3010 transfers the command information to the RF module 3035 to initiate communication, for example, to transmit wireless signals constituting voice communication data. The RF module 3035 is constituted by a receiver and a transmitter for receiving and transmitting the wireless signals. The antenna 3040 functions to transmit and receive the wireless signals. Upon receiving the wireless signals, the RF module 3035 may transfer the signal for processing by the processor 3010 and convert the signal to a baseband. The processed signal may be converted into to audible or readable information output via the speaker 3045.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present disclosure by coupling a part of the elements and/or technical features. The order of operations described in the embodiments of the present disclosure may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present disclosure may be implemented by various means, for example, hardware, firmware, software and the combination thereof. In the case of the hardware, an embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present disclosure may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations may be made without departing from the essential features of the inventions. Therefore, the detailed description is not limited to the embodiments described above, but should be considered as examples. The scope of the present disclosure should be determined by reasonable interpretation of the attached claims, and all modification within the scope of equivalence should be included in the scope of the present disclosure.

INDUSTRIAL APPLICABILITY

The method for transmitting/receiving the signal in the wireless communication system of the present disclosure, which supports NB-IoT is described primarily with an example applied to a 3GPP LTE/LTE-A system, but the method can be applied to various wireless communication systems including the new RAT (NR) system in addition to the 3GPP LTE/LTE-A system.

The invention claimed is:

1. A method performed by a wireless device in a wireless communication system supporting a narrowband Internet of Things (NB-IoT), the method comprising:

receiving, from a base station, a Narrowband Primary Synchronization Signal (NPSS) and a Narrowband Secondary Synchronization Signal (NSSS);

performing a cell search procedure for the base station based on the NPSS and the NSSS; and receiving, from the base station, a Narrowband Physical Broadcast Channel (NPBCH), wherein the NPSS is transmitted over 11 orthogonal frequency division multiplexing (OFDM) symbols in subframe #5 of each radio frame, wherein based on each radio frame having a first radio frame structure that is applicable for frequency division duplex (FDD), (i) the NSSS is transmitted over 11 OFDM symbols in subframe #9 of even-numbered radio frames, and (ii) the NPBCH is transmitted in subframe #0 of each radio frame, wherein based on each radio frame having a second radio frame structure that is applicable for time division duplex (TDD), (i) the NSSS is transmitted over 11 OFDM symbols in subframe #0 of even-numbered radio frames, and (ii) the NPBCH is transmitted in subframe #9 of each radio frame, wherein based on each radio frame having the first radio frame structure that is applicable for FDD, a number of subframes between a subframe in which the NSSS is transmitted and a most recent previous subframe in which the NPSS is transmitted is equal to 3, and wherein based on each radio frame having the second radio frame structure that is applicable for TDD, the number of subframes between the subframe in which the NSSS is transmitted and the most recent previous subframe in which the NPSS is transmitted is equal to 4.

2. The method of claim 1, wherein a transmission period duration of the NSSS is configured to be twice a transmission period duration of the NPSS.

3. The method of claim 1, wherein the NSSS is generated based on a Zadoff-Chu sequence.

4. The method of claim 1, wherein:
based on each radio frame having the first radio frame structure that is applicable for FDD, the subframe in which the NSSS is transmitted and the most recent previous subframe in which the NPSS is transmitted are part of a same radio frame, and
based on each radio frame having the second radio frame structure that is applicable for TDD, the subframe in which the NSSS is transmitted and the most recent previous subframe in which the NPSS is transmitted are part of different radio frames.

5. The method of claim 1, wherein for each subframe in which the NSSS is transmitted, there is an adjacent subframe in which the NPBCH is transmitted, and
wherein the adjacent subframe in which the NPBCH is transmitted is in a different radio frame than the subframe in which the NSSS is transmitted.

6. The method of claim 5, wherein:
based on each radio frame having the first radio frame structure that is applicable for FDD, the subframe in which the NSSS is transmitted is arranged before the adjacent subframe in which the NPBCH is transmitted, and
based on each radio frame having the second radio frame structure that is applicable for TDD, the subframe in which the NSSS is transmitted is arranged after the adjacent subframe in which the NPBCH is transmitted.

7. The method of claim 1, wherein the subframe #5 in which the NPSS is transmitted corresponds to a 6th subframe in the radio frame,
wherein for FDD, (i) the subframe #9 in which the NSSS is transmitted for FDD corresponds to the 10th subframe of the even-numbered radio frame, and (ii) the subframe #0 in which the NPBCH is transmitted corresponds to a 1st subframe in the radio frame, and
wherein for TDD, (i) the subframe #0 in which the NSSS is transmitted corresponds to an initial subframe of the even-numbered radio frame, and (ii) the subframe #9 in which the NPBCH is transmitted corresponds to the 10th subframe in the radio frame.

8. The method of claim 1, wherein each of the NPBCH, the NPSS, and the NSSS is transmitted in a last 11 OFDM symbols of the respective subframe.

9. A wireless device configured to operate in a wireless communication system supporting a narrowband Internet of Things (NB-IoT), the wireless device comprising:
a transceiver;
at least one processor; and
at least one computer memory operably connectable to the at least one processor and storing instructions that, when executed by the at least one processor, perform operations comprising:
receiving, from a base station, a Narrowband Primary Synchronization Signal (NPSS) and a Narrowband Secondary Synchronization Signal (NSSS);
performing a cell search procedure for the base station based on the NPSS and the NSSS; and
receiving, from the base station, a Narrowband Physical Broadcast Channel (NPBCH),
wherein the NPSS is transmitted over 11 orthogonal frequency division multiplexing (OFDM) symbols in subframe #5 of each radio frame,
wherein based on each radio frame having a first radio frame structure that is applicable for frequency division duplex (FDD), (i) the NSSS is transmitted over 11 OFDM symbols in subframe #9 of even-numbered radio frames, and (ii) the NPBCH is transmitted in subframe #0 of each radio frame,
wherein based on each radio frame having a second radio frame structure that is applicable for time division duplex (TDD), (i) the NSSS is transmitted over 11 OFDM symbols in subframe #0 of even-numbered radio frames, and (ii) the NPBCH is transmitted in subframe #9 of each radio frame,
wherein based on each radio frame having the first radio frame structure that is applicable for FDD, a number of subframes between a subframe in which the NSSS is transmitted and a most recent previous subframe in which the NPSS is transmitted is equal to 3, and
wherein based on each radio frame having the second radio frame structure that is applicable for TDD, the number of subframes between the subframe in which the NSSS is transmitted and the most recent previous subframe in which the NPSS is transmitted is equal to 4.

10. The wireless device of claim 9, wherein a transmission period duration of the NSSS is configured to be twice a transmission period duration of the NPSS.

11. The wireless device of claim 9, wherein the NSSS is generated based on a Zadoff-Chu sequence.

12. The wireless device of claim 9, wherein:
based on each radio frame having the first radio frame structure that is applicable for FDD, the subframe in which the NSSS is transmitted and the most recent previous subframe in which the NPSS is transmitted are part of a same radio frame, and
based on each radio frame having the second radio frame structure that is applicable for TDD, the subframe in which the NSSS is transmitted and the most recent previous subframe in which the NPSS is transmitted are part of different radio frames.

13. The wireless device of claim 9, wherein for each subframe in which the NSSS is transmitted, there is an adjacent subframe in which the NPBCH is transmitted, and
wherein the adjacent subframe in which the NPBCH is transmitted is in a different radio frame than the subframe in which the NSSS is transmitted.

14. The wireless device of claim 13, wherein:
based on each radio frame having the first radio frame structure that is applicable for FDD, the subframe in which the NSSS is transmitted is arranged before the adjacent subframe in which the NPBCH is transmitted, and
based on each radio frame having the second radio frame structure that is applicable for TDD, the subframe in which the NSSS is transmitted is arranged after the adjacent subframe in which the NPBCH is transmitted.

15. The wireless device of claim 9, wherein the subframe #5 in which the NPSS is transmitted corresponds to a 6th subframe in the radio frame,
wherein for FDD, (i) the subframe #9 in which the NSSS is transmitted for FDD corresponds to the 10th subframe of the even-numbered radio frame, and (ii) the subframe #0 in which the NPBCH is transmitted corresponds to a 1st subframe in the radio frame, and
wherein for TDD, (i) the subframe #0 in which the NSSS is transmitted corresponds to an initial subframe of the even-numbered radio frame, and (ii) the subframe #9 in which the NPBCH is transmitted corresponds to the 10th subframe in the radio frame.

16. The wireless device of claim 9, wherein each of the NPBCH, the NPSS, and the NSSS is transmitted in a last 11 OFDM symbols of the respective subframe.

\* \* \* \* \*